US008788390B2

(12) United States Patent
Jhunjhunwala

(10) Patent No.: US 8,788,390 B2
(45) Date of Patent: Jul. 22, 2014

(54) ESTIMATING VALUES OF ASSETS

(75) Inventor: Manish Jhunjhunwala, Boston, MA (US)

(73) Assignee: Insight Guru Inc., Boston, MA (US)

(*) Notice: Subject to any disclaimer, the term of this patent is extended or adjusted under 35 U.S.C. 154(b) by 403 days.

(21) Appl. No.: 12/859,699

(22) Filed: Aug. 19, 2010

(65) Prior Publication Data

US 2011/0153508 A1    Jun. 23, 2011

Related U.S. Application Data

(63) Continuation-in-part of application No. 11/670,039, filed on Feb. 1, 2007, now abandoned.

(60) Provisional application No. 61/235,164, filed on Aug. 19, 2009.

(51) Int. Cl.
*G06Q 40/00*    (2012.01)

(52) U.S. Cl.
USPC ........................................ 705/36 R

(58) Field of Classification Search
USPC ........................ 705/36 R, 35–40
See application file for complete search history.

(56) References Cited

U.S. PATENT DOCUMENTS

| | | | | |
|---|---|---|---|---|
| 4,674,043 A | * | 6/1987 | Hernandez et al. | 715/209 |
| 7,779,344 B1 | * | 8/2010 | Hao et al. | 715/215 |
| 2002/0116310 A1 | * | 8/2002 | Cohen et al. | 705/36 |

OTHER PUBLICATIONS

Google Finance, web.archive.org, Jun. 18, 2009.*
Do Stock Prices Fully Reflect Information in Accruals and Cash Flows about Future Earnings? Richard G. Sloan, The Accounting Review, vol. 71, No. 3 (Jul. 1996), pp. 289-315, Published by: American Accounting Association.*

* cited by examiner

*Primary Examiner* — Olabode Akintola
(74) *Attorney, Agent, or Firm* — Sunstein Kann Murphy & Timbers LLP

(57) ABSTRACT

A body of information elements is maintained including facts, assumptions, and relationships, at least one element being generated from the others using the relationships and representative of an estimate of a value of, or a market size of a product or service associated with, an asset. The relationships each define how a resulting fact or assumption can be generated from at least one source fact or assumption. The way in which the at least one source fact or assumption can be generated from another source fact or assumption is defined in each of multiple instances by one of the relationships. The body of information is exposed through a publicly accessible communication medium on a non-discriminatory basis. On the communication medium, users are enabled to engage in moderated collective discussion concerning the information elements. Users are enabled to participate financially in contracts having values that are tied to the estimated value of the asset.

21 Claims, 78 Drawing Sheets

Your search for Risperdal Consta  ⟋— 494

About the product Risperdal Consta (RC)       See Contracts traded on Risperdal Consta

| | |
|---|---|
| Estimated Value ($M) to Alkermes | 659 —428a |
| | ⟋—444a |
| Description | Risperdal Consta (RC) is an injectable form of prescription oral drug Risperdal approved for Schizophrenia |
| Market and Indication | Schizophrenia —426a |
| Science | Therapeutic category/ Mechanism of Action, Clinical data |
| Historicals | |
| | Sales |
| | Costs |
| Uniqueness | RC injections administered once every 2 weeks, instead of Risperdal that is taken orally 1 capsule /day, shows better compliance, convenience |

Your search for Schizophrenia  ⟋— 496
About Bipolar Mania/ Schizophrenia      See Contracts traded on Schizophrenia

Description  ⟋— 502
Schizophrenia is a mental illness characterized by symptoms like Hallucinations, delusions, as-well-as withdrawal and lack of motivation

Market  ⟋—504

| Company | Market price | Our estimated price and rating | Drugs on market |
|---|---|---|---|
| 508a Company 1 | $PP —509a | BUY $XX | Seroquel —507a |
| 508b Alkermes and J&J | $QQ —509b | SELL $ YY | Risperdal (Oral and injection) |
| 508c company 3 | $rr —  | BUY $zz | Zyprexa —507b |
| company 4 | $ss —509c | SELL $ ww | Others 507c |
| 508d | 509d | | 507d |

Science
1) Potential causes
2) Therapeutic approaches     }506

500 ⟶  Figure 12

Source for sales of Risperdal Consta in 2005

From year end and 4th quarter 2005 earnings release, Alkermes, 14th February 2006

Excerpt from the release        See complete release

The company's lead drug, Risperdal Consta, with approved indication in Schizophrenia was the largest contributor of sales at $192 Million in 2005. ' The drug has efficacy and safety profiles that are far superior than anything that was available to patients before this', commented Jerry Anderson, M.D., and the chief neurologist at John Hopkins. — 672

— 674
Modify, provide alternate source and value for sales of Risperdal Consta in 2005

Percent of peak sales reached in the last year of fast sales ramp-up        (2008)        90%  — 554

Basis
1 Sales for drugs in similar market environments as Risperdal have been seen to increase more quickly for a period of 4-6 years after launch (fast ramp-up period) until they reach about 90% of the expected peak sales.

← 622

2 After reaching about 90% of the peak the sales increase commonly flatten. Below is a few drugs in a similar market envrionment as Risperdal, with the rationale why we believe there market envrionment is similar, along with their sales ramp-up

| Drug | Reason for similarity in market environment | Sales ramp-up, % of peak sales (years from launch) |
|---|---|---|
| Drug 1 | Patient population size............ Number of drugs in market | Year 1 - 14% ......... Year 4 - 75% Year 5 - 89% Year 6 - 95% |
| Drug 2 | Patient population size............ | Year 1 - 19% ......... Year 5 - 78% Year 6 - 91% Year 7 - 96% |

624

Modify % of peak sales reached in last year of fast ramp-up, and its basis
— 626

Opinion on Estimated % of peak sales reached in the last year of fast sales ramp-up

Estimated % of peak sales reached in the last year of fast sales ramp-up     (2008)   90% ⟋554

Present Basis
Example of drugs in similar markets..................

Enter Your Opinion here ⟋654

Read opinions integrated by our Analyst
Opinion          Basis              Original posting          Analyst comment
Opinion 1 ←— 656
Opinion 2

Raw opinions from users
User Name       Date posted
User 1
User 2  ←—658
User 3
Unknown
.................

3602 Thanks for participating in the Trefis private beta ← 3604

We just need a few pieces of information from you before getting started ← 3606

Your Name [First] [Last] ← 3608

Email Address [_____] ← 3610

Password [_____] ← 3612

Password again [_____] ← 3614

☑ Send me Trefis updates ← 3616
☐ I understand that the content on this site is ← 3618
confidential, and I will keep it to myself How often do you research or collect information on individual public company stocks?
[▼] ← 3620

How many stock trades (individual tickers), not mutuals or index fund trades, do you place per year?
[▼] ← 3622

How many technology, media, or telecom company stocks have you researched in the last year?
[▼] ← 3624

Trefis starts with a rigorous, quantitative model
Lorem ipsum dolor sit amet, consectetuer adipiscing elit, sed diam nonummy nibh euismod tincidunt ut laoreet dolore magna aliquam erat volutpat.

It is fun and easy-to-understand
Lorem ipsum dolor sit amet, consectetuer adipiscing elit, sed diam nonummy nibh euismod tincidunt ut laoreet dolore magna aliquam erat volutpat.

You can play with assumptions
Lorem ipsum dolor sit amet, consectetuer adipiscing elit, sed diam nonummy nibh euismod tincidunt ut laoreet dolore magna aliquam erat volutpat.

Consult with experts
Lorem ipsum dolor sit amet, consectetuer adipiscing elit, sed diam nonummy nibh euismod tincidunt ut laoreet dolore magna aliquam erat volutpat.

3904 3906 3908

Like what you see? Think something could be improved? Send us your feedback!
© Insight Guru, Inc. Terms of Use  Privacy Policy

3902

3910

By using the Site, you agree to be bound by our Terms of Use. Financial Market Data powered by Quotemedia.com. All rights reserved. View the Terms of Use. NYSE/AMEX data delayed 20 minutes. NASDAQ and other data delayed 15 minutes unless indicated.

Lorem ipsum dolor sit amet, consectetuer adipiscing elit, sed diam nonummy nibh euismod tincidunt ut laoreet dolore magna aliquam erat volutpat. Ut wisi enim ad minim veniam, quis nostrud exerci tation ullamcorper suscipit lobortis nisl ut aliquip ex ea commodo consequat. Duis autem vel eum iriure dolor in hendrerit in vulputate velit esse molestie consequat, vel illum dolore eu feugiat nulla facilisis at vero eros et accumsan et iusto odio dignissim qui blandit praesent luptatum zzril delenit augue duis dolore te feugait nulla facilisi. Nam quarto et sea more sexagesimo. Est Consualibus est ut ignium de causauriori per quae huic westerniam.

Lorem ipsum dolor sit amet, consectetuer adipiscing elit, sed diam nonummy nibh euismod tincidunt ut laoreet dolore magna aliquam erat volutpat. Ut wisi enim ad minim veniam, quis nostrud exerci tation ullamcorper suscipit lobortis nisl ut aliquip ex ea commodo consequat. Duis autem vel eum iriure dolor in hendrerit in vulputate velit esse molestie consequat, vel illum dolore eu feugiat nulla facilisis at vero eros et accumsan et iusto odio dignissim qui blandit praesent luptatum zzril delenit augue duis dolore te feugait nulla facilisi. Nam quarto et sea more sexagesimo. Est Consualibus est ut ignium de causauriori per quae huic westerniam.

FIG. 39

Home > Apple >

Apple Overview                                                                 4302

What are your questions or opinions on iPhone pricing? 4304 by The Trefis Team on 7/8/2009 at 9:33PM    Edit This    QA Feedback
                                             4314        4316

VALUATION HIGHLIGHTS ← 4306

1. iPhone constitutes 42% of the Trefis price estimate for Apple's stock price.
2. Macintosh (Notebooks, Software & Services, Peripherals, Desktops) constitute 23% of the Trefis price estimate for Apple's stock price.
3. iPod constitutes only 9% of the Trefis price estimate for Apple's stock price.
         4308

BUSINESS SUMMARY ←

Lorem ipsum dolor sit amet, consectetuer adipiscing elit, sed diam nonummy nibh euismod tincidunt ut laoreet dolore magna aliquam erat volutpat. Ut wisi enim ad minim veniam, quis nostrud exerci tation ullamcorper suscipit lobortis nisl ut aliquip ex ea commodo consequat.

SOURCES OF VALUE ← 4310

Lorem ipsum dolor sit amet, consectetuer adipiscing elit, sed diam nonummy nibh euismod tincidunt ut laoreet dolore magna aliquam erat volutpat. Ut wisi enim ad minim veniam, quis nostrud exerci tation ullamcorper suscipit lobortis nisl ut aliquip ex ea commodo consequat.

Large Mobile Phone Market ← 4312

Lorem ipsum dolor sit amet, consectetuer adipiscing elit, sed diam nonummy nibh euismod tincidunt ut laoreet dolore magna aliquam erat.

4336

RSS

John Smith    Featured | Edit Post | Delete                      50% Agree
              Re: iPhone > iPhone Market Share                   4330  4324
  4318        Lorem ipsum dolor sit amet, consectetuer adipiscing elit, sed diam
              nonummy nibh euismod tincidunt ut laoreet dolore magna aliquam
              magna aliquam erat volutpat.                              4326
   4332 → | Reply | Post Reply John Smith    Featured | Edit Post | Delete                      Unrated
              Re: iPhone > iPhone Market Share                        4334
  4320        Lorem ipsum dolor sit amet, consectetuer adipiscing elit, sed diam
              nonummy nibh euismod tincidunt ut laoreet dolore magna aliquam
              erat volutpat.                                          4328
              | Reply | Post Reply John Smith    Featured | Edit Post | Delete                      50% Agree
              Re: iPhone > iPhone Market Share
  4322        Lorem ipsum dolor sit amet, consectetuer adipiscing elit, sed diam
              nonummy nibh euismod tincidunt ut laoreet dolore magna aliquam
              erat volutpat.
              | Reply | Post Reply

FIG. 43

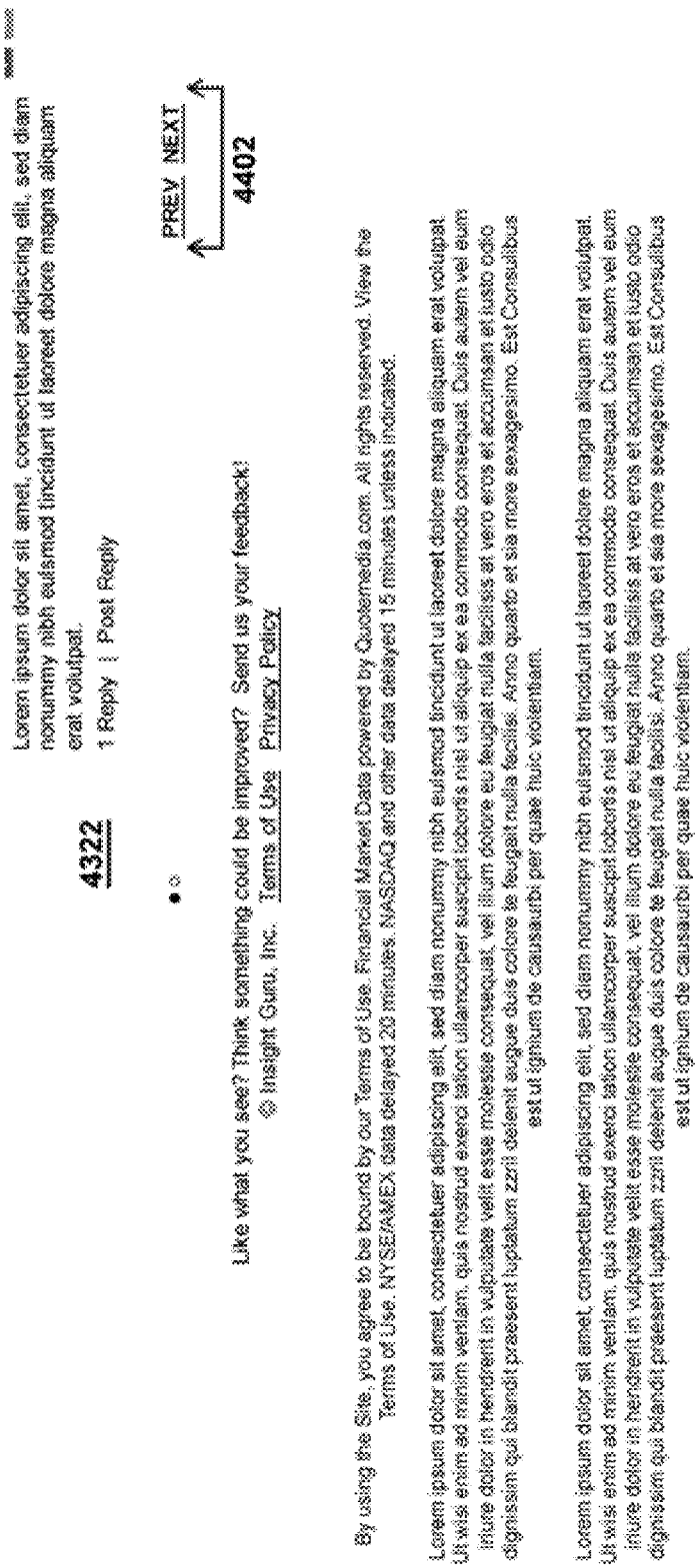

FIG. 46

Competitors: Nokia, RIM/Blackberry and Motorola

What buyers care about:

1. Price of mobile phones
2. Battery usage
3. 3G enabled phones
4. Application development for developers
5. Mobile Phone designs and style component
6. User friendly touchpad and display screen
7. Internet access and data transfer speeds
8. Mobile phones data storage capacity
9. Global roaming facility Apple's top selling point: ← 4702

1. Style and Brand image factor
2. Ease of usability with touch screen interface
3. Application development ease for developers
4. Integration with Apple Store and iTunes for Music and Video usage
5. Compatibility with Mac and iPod too

---

John Smith — Featured | Edit Post | Delete — 50% Agree
4616 — Lorem ipsum dolor sit amet, consectetuer adipiscing elit, sed diam nonummy nibh euismod tincidunt ut laoreet dolore magna aliquam erat volutpat.
No Replies | Post Reply

John Smith — Featured | Edit Post | Delete — 100% Agree
4704 — Lorem ipsum dolor sit amet, consectetuer adipiscing elit, sed diam nonummy nibh euismod tincidunt ut laoreet dolore magna aliquam erat volutpat.
4 Replies | Post Reply

John Smith — Featured | Edit Post | Delete — Unrated
4706 — Lorem ipsum dolor sit amet, consectetuer adipiscing elit, sed diam nonummy nibh euismod tincidunt ut laoreet dolore magna aliquam erat volutpat.
No Replies | Post Reply

John Smith — Featured | Edit Post | Delete — Unrated
4708 — Lorem ipsum dolor sit amet, consectetuer adipiscing elit, sed diam nonummy nibh euismod tincidunt ut laoreet dolore magna aliquam erat volutpat.
No Replies | Post Reply

HISTORICALS & FORECAST

The iPhone was launched in the year 2007. iPhone Pricing decreased from $500 in 2007 to $475 in 2008.

FORECAST RATIONALE 4902

Lorem ipsum dolor sit amet, consectetuer adipiscing elit, sed diam nonummy nibh euismod tincidunt ut laoreet dolore magna aliquam erat volutpat. Lorem ipsum dolor sit amet, consectetuer adipiscing elit, sed diam nonummy nibh euismod tincidunt ut laoreet dolore magna aliquam erat volutpat. Lorem ipsum dolor sit amet, consectetuer adipiscing elit, sed diam nonummy nibh euismod tincidunt ut laoreet dolore magna aliquam erat volutpat.

4904 → Trefis considered the following two factors for it's forecast:

1. Pricing pressure from competitors such as Motorola, Nokia and Research in Motion
   - Lorem ipsum dolor sit amet, consectetuer adipiscing elit, sed diam nonummy nibh euismod tincidunt ut laoreet dolore magna aliquam erat volutpat. Lorem ipsum dolor sit amet, consectetuer adipiscing elit, sed diam nonummy nibh euismod tincidunt ut.

4906 → 2. Smartphones increasing commoditization will bring down prices
   - Lorem ipsum dolor sit amet, consectetuer adipiscing elit, sed diam nonummy nibh euismod tincidunt ut laoreet dolore magna aliquam erat volutpat. Lorem ipsum dolor sit amet, consectetuer adipiscing elit, sed diam nonummy nibh euismod tincidunt ut.

How we got historical data:

John Smith    Featured | Edit Post | Delete    50% Agree
Lorem ipsum dolor sit amet, consectetuer adipiscing elit, sed diam nonummy nibh euismod tincidunt ut laoreet dolore magna aliquam erat volutpat.
No Replies | Post Reply John Smith    Featured | Edit Post | Delete    100% Agree
Lorem ipsum dolor sit amet, consectetuer adipiscing elit, sed diam nonummy nibh euismod tincidunt ut laoreet dolore magna aliquam erat volutpat.
4 Replies | Post Reply John Smith    Featured | Edit Post | Delete    100% Agree
Lorem ipsum dolor sit amet, consectetuer adipiscing elit, sed diam nonummy nibh euismod tincidunt ut laoreet dolore magna aliquam erat volutpat.
4 Replies | Post Reply John Smith    Featured | Edit Post | Delete    100% Agree
Lorem ipsum dolor sit amet, consectetuer adipiscing elit, sed diam nonummy nibh euismod tincidunt ut laoreet dolore magna aliquam erat volutpat.
4 Replies | Post Reply

FIG. 49

How we got historical data: ← 5002

Lorem ipsum dolor sit amet, consectetuer adipiscing elit, sed diam
nonummy nibh euismod tincidunt ut laoreet dolore magna aliquam erat
volutpat. Lorem ipsum dolor sit amet, consectetuer adipiscing elit, sed
diam nonummy nibh euismod tincidunt ut.

Sources: ← 5004

Apple is there a Low Cost iPhone in the Works? ← 5006

Lorem ipsum dolor sit amet, consectetuer adipiscing elit, sed diam
nonummy nibh euismod tincidunt ut laoreet dolore magna aliquam erat
volutpat. Lorem ipsum dolor sit amet, consectetuer adipiscing elit, sed
diam nonummy nibh euismod tincidunt ut.

Information sources include annual reports, quarterly filings and quarterly
earnings transcripts. Company filings are available from the SEC.

John Smith  Featured | Edit Post | Delete                    50% Agree

Lorem ipsum dolor sit amet, consectetuer adipiscing elit, sed diam
nonummy nibh euismod tincidunt ut laoreet dolore magna aliquam
erat volutpat.

No Replies  |  Post Reply

Like what you see? Think something could be improved? Send us your feedback!
© 2009 Insight Guru, Inc. | Terms of Use | Privacy Policy

ESTIMATING VALUES OF ASSETS

This application is based on and claims priority to U.S. Ser. No. 61/235,164, filed Aug. 19, 2009.

This application also contains subject matter protected by copyright, and all rights therein are reserved.

CROSS-REFERENCE TO RELATED APPLICATIONS

This application is a continuation-in-part of Ser. No. 11/670,039, filed on Feb. 1, 2007, and entitled "Estimating Values of Assets."

TECHNICAL FIELD

This description relates to estimating values of assets.

BACKGROUND

Valuing tangible and intangible assets consumes large amounts of human resources, and the valuation estimates that result are relied on for a broad range of economic and other decisions and activities. The assets being valued include, among other things, individual items (and groups of items) of tangible personal and real property, entire enterprises such as corporations, governmental bodies, institutions, financial instruments such as stocks and bonds in public and private companies, and intangible assets such as intellectual property and goodwill. Much of the description here is cast in terms of several specific types of financial instruments, such as stocks, bonds, currencies, commodities, and financial derivatives, like options and futures contract written on stocks, bonds, currencies and commodities. Yet, the concepts put forward here apply broadly to assets of all kinds and to approaches to valuing them.

Some approaches to valuation of an asset are directed to determining what may be called the present intrinsic value of the asset. One classic definition of present intrinsic value is the sum of present values of all future cash flows that are expected (discounted based on some definable risk) to flow from the asset. Such a present intrinsic value represents the price at which a potential owner of the asset would be indifferent between owning the asset or owning a stream of cash flows that have the same risk as the expected cash flows of the asset. As a corollary, when the price of such an asset is below the intrinsic value, potential owners are expected to prefer buying the asset at that price, thus increasing its demand and in turn the price, and to continue to do so until the present price is equal to the present intrinsic value. Conversely, when the present price exceeds the present intrinsic value, owners of the asset will prefer to sell the asset and to continue to do so until the present price (we sometimes refer to the present price as simply the price) drops to the present intrinsic value (we sometimes refer to the present intrinsic value as simply the intrinsic value).

The intrinsic value of an asset and the factors that influence it are important to a wide range of people (including families, and groups of them) and enterprises (we use the term enterprises broadly to include corporations, governments, institutions, and any other kind of legal entity). We sometimes use the term interested parties or parties in the broadest sense to include any people or enterprises that have an interest in the value of assets.

Interested parties can include parties who have time, money, or other assets to invest (we sometimes call them simply investors) and other people who are not investors but are interested in the values of assets for other reasons.

Investors must make decisions about investments of their assets, even if the decisions are to do nothing (for example, by stashing cash) and allow the assets to garner no yield. More typically, though, the goal of interested parties is to maximize value from their assets.

As part of reaching this goal, virtually all interested parties care about the intrinsic value of an asset and the factors on which it depends. As investors develop an estimate of the intrinsic value of an asset, they tend to buy the asset when its price is at or below the estimated intrinsic value, and sell the asset at or above its estimated intrinsic value. Investors may believe that the market traded price of an asset will move towards the intrinsic value. Individuals may commonly expect the market price of an asset at a point of time in future, to be equal to the estimated intrinsic value of the asset at that future time.

Interested parties may also include people who are not themselves direct investors. For example, present and potential managers of a company, its consultants, bankers, and lawyers all strive to understand the intrinsic value of the enterprise and the factors that affect the intrinsic value, for a wide variety of purposes. Among other things, understanding the value and the factors helps them to identify and focus their efforts on actions that can sustain or increase the value (we sometimes refer to intrinsic value simply as value), with the expectation of receiving a part of value because of their involvement.

Interested parties may also include present and potential employees of enterprises, who may want to spend their time and effort in companies and markets offering good opportunities for them to sustain and increase value and capture a portion of it for themselves. An employee of a company that has a shrinking value, or of a department of a company that does little to add value to the enterprise, can hardly expect to thrive personally.

Entrepreneurs are interested parties who use their understanding of intrinsic values of assets within a market, and the drivers of value, to make decisions on where and how to spend their time and effort, planning actions that will enhance the value, allowing them to capture a part of it.

Estimates of values of assets are available from a wide variety of sources in various contexts, including newspapers, magazines, analysts' reports, and other conventional publications, and web sites and proprietary on-line information terminals. Some sources provide detailed expert analysis of an asset's value. Others aggregate information from other sources at a single portal.

Generally, an analyst's report on the stock of a company, for example, is a static publication that an investor may read to gain some understanding of the analyst's reasoning. Other investors may simply refer to the analyst's conclusion about how much a stock is worth without reviewing the basis of his opinion. Some of the raw data that the analyst used in forming his opinion may be repeated in the report, but the report generally does not provide access to raw data and models used by the analyst in its creation. Publications that aggregate information from other sources may provide access back to those sources, but generally do not perform analysis of their own, other than the initial selection of what information to collect and distribute.

Financial analysts use a variety of models and other qualitative and quantitative approaches together with facts and assumptions to research, estimate, and report values of assets.

Values of certain financial instruments depend on the value of an underlying asset or the occurrence of an event.

Examples of such contracts or rights are options, futures, and event contracts. In an American option, for example, an investor purchases a right but not an obligation, to buy (a call option) or sell (a put option) a specific asset at a specified price at some time on or prior to a future date. A futures contract is an agreement to buy or sell a fixed quantity of a specified commodity, currency, or security for delivery at a fixed date in the future at a fixed price. An event contract pays (or does not pay) based on the occurrence or non-occurrence of some future event. It may be binary, for example, paying based on whether or not a company's revenue growth beats inflation, or it may be variable, for example, paying based on the amount by which the company's revenue growth beat inflation.

In the field of asset valuation, some sources charge directly for the information they make available. In some cases (for example, financial websites that aggregate information from other sources), advertising revenue allows a source to provide the information free. Parties that provide users a platform to trade stocks, bonds, and contracts can generate revenue by charging a commission on a per trade basis or on the volume of the transaction.

Independent research and Wall Street firms like Lehman Brothers and Goldman Sachs have analysts who estimate values of assets, for example, the stock of a company. They communicate their estimates and analysis in periodic write-ups shared through electronic files, for example, PDF files, or on paper. They also create additional material to share, for example, spreadsheets. The shared spreadsheets include some of the assumptions, facts, and calculations used in the computation of the value of the asset or other results. The spreadsheets and write-ups can be distributed internally to relevant people at the research firm for comment and use and in some cases for duplication and alteration by others to serve their own purposes. The spreadsheets and write-ups can also be provided to people outside of the firm (e.g., their customers) for the same reasons. Any distribution outside of the firm is, at the first level, controlled by the firm for its own purposes. For that reason, a spreadsheet or write-up that is distributed outside of the firm typically includes only a subset of information useful in understanding the derivation of the value estimate, and other results.

The distribution serves to stimulate inquiries from possible customers. Customers external to the firm may rely on their own ability to synthesize information from various sources to derive insights that are unique and that may allow them to monetize on their unique views. The people to whom the spreadsheet is distributed (either internally or externally) can engage in discussion (commonly with the people within the research firm who are responsible for generating such estimates, the creators) by email, or over the phone, about the models, and those discussions may lead to changes in the model being made by the creator.

Anyone with an account at the research firm (and that could be anyone in the public) may have access to some of these shared models and write-ups on the firm's website.

Discussion websites on topics that relate to values of assets such as stock allow any person who has access to the internet to log on and review comments of others and offer comments himself. These sites thus enable a community of the public to democratically discuss issues around the values of assets. In some cases, the sites are moderated by a central authority. In addition, aggregator websites may have expert opinions on products, markets, companies or stocks. These opinions are a general discussion of some of the issues of interest, or common appeal and are typically directional, qualitative indicators or views.

SUMMARY

In general, in an aspect, a body of information elements is maintained including facts, assumptions, and relationships, at least one of the information elements being a resulting element that is (a) generated from the other facts and assumptions using the relationships, and (b) representative of an estimate of a value of, or a market size of a product or service associated with, an asset. The relationships that belong to the body of information each define how a resulting fact or assumption that belongs to the body of information can be generated from at least one source fact or assumption that belongs to the body of information. The way in which a source fact or assumption can be generated from another source fact or assumption is defined in each of multiple instances by one of the relationships that belong to the body of information. The body of information is exposed through a publicly accessible communication medium on a non-discriminatory basis.

In general, in an aspect, a body of information elements is maintained including facts, assumptions, and relationships. At least one of the information elements is a resulting element that is (a) generated from the other facts and assumptions using the relationships, and (b) representative of an estimate of a value of, or a market size of a product or service associated with, an asset. The relationships that belong to the body of information each define how a resulting fact or assumption that belongs to the body of information can be generated from at least one source fact or assumption that belongs to the body of information. The way in which the source fact or assumption can be generated from another source fact or assumption is defined in each of multiple instances by another one of the relationships that belongs to the body of information. On a medium in which the body of information is exposed to users, users are enabled to engage in collective discussion concerning the information elements.

In general, in an aspect, a body of information elements is maintained including facts, assumptions, and relationships, at least one of the information elements being (a) generated from the other facts and assumptions using the relationships, and (b) representative of an estimate of a value of, or a market size of a product or service associated with, an asset. The relationships that belong to the moderated body of information each define how a resulting fact or assumption that belongs to the body of information can be generated from at least one source fact or assumption that belongs to the body of information. The way in which the source fact or assumption can be generated from another source fact or assumption is defined in each of multiple instances by another one of the relationships that belongs to the body of information. On a medium in which the body of information is exposed to users, a moderator is enabled to participate in collective discussion by users concerning the information elements.

In general, in an aspect, a body of information elements is maintained including facts, assumptions, and relationships, at least one of the information elements being (a) generated from the other facts and assumptions using the relationships, and (b) representative of an estimate of a value of, or a market size of a product or service associated with, an asset. The relationships that belong to the body of information each define how a resulting fact or assumption that belongs to the body of information can be generated from at least one source fact or assumption that belongs to the body of information. The way in which the source fact or assumption can be generated from another source fact or assumption is defined in each of multiple instances by another one of the relationships that belongs to the body of information. Through a medium in which the body of information is exposed to users, users are enabled to participate financially in contracts having values that are tied to the estimated value of the asset.

Implementations may include one or more of the following features. The users are enabled to participate in the contracts on the medium. The users are enabled to enter bids for the contracts on the medium. The body of information is exposed through a publicly accessible communication medium on a non-discriminatory basis. On the medium, users are enabled to engage in collective discussion concerning the information elements. On the medium, a moderator is enabled to participate in collective discussion by users concerning the information elements. On the medium, a moderator is enabled to participate in collective discussion by users concerning the information elements. On the medium, users are enabled to engage in collective discussion concerning the information elements. Other facts, assumptions, or relationships are maintained that are not part of the body of information, the resulting element not being generated from the other facts, assumptions, or relationships. The contracts include financial derivatives defined on events associated with an asset.

A controlled version of the body of information elements is maintained that is not modifiable by users except as allowed by a controlling authority. A user is enabled to modify a copy of at least a portion of the body of information elements. The user is enabled to save the modified copy and share the saved copy with other users on the same medium in which the body of information is exposed.

The medium comprises an online interactive communication medium. The medium comprises a browser.

Maintaining the body of information includes at least one of storing, updating, and retrieving at least a portion of the body of information on a server that is available to users through a publicly accessible communication network. The body of information includes resulting elements representative of estimated values of, or a market size of a product or service associated with, more than one asset.

An initial body of information is generated by experts. The experts comprise financial experts and experts in design or development of information on the communication medium working collaboratively. An electronic data interface enables interactions of the financial experts with the experts in design or development of information. At least some of the facts and assumptions are received electronically from external sources. At least some of the facts and assumptions are received electronically from experts. At least one of the experts is located in a country in which expert costs are lower (e.g., India). The body of information is updated by the experts over time. The body of information is updated based on new facts and assumptions relevant to the resulting element. The body of information is altered to improve the ability of users to study, discuss, and use the body of information. The altering is done continuously as information becomes available. The altering is done automatically in real time using electronic feeds. The altered body of information includes archived information about the body of information prior to alteration. The financial experts control the substance and structure of the updated body of information and the experts in the design or development of information maintain and update the implementation of the substance and structure. The experts derive assumptions from discussions with other experts and company managers.

At least one of the relationships comprises a mathematical operator or mathematical relationship. Each of the relationships comprises a mathematical operator or mathematical relationship. At least one of the relationships comprises a calculation in which a level of one of the facts or assumptions is used to derive a level of another of the facts or assumptions. Each of the relationships comprises a calculation in which a level of one of the facts or assumptions is used to derive a level of another of the facts or assumptions. The levels of facts and assumptions are numerical. At least some of the relationships comprise a calculation in which the sensitivity of one of the facts or assumptions is determined with respect to another of the facts or assumptions. At least some of the relationships comprise an opinion of a user about one of the facts or assumptions.

One of the facts or assumptions comprises an opinion on another one of the facts or assumptions. At least one of the assumptions comprises at least one of the following with respect to a company in a future time period: revenue expected to be generated in aggregate or from a product, service, or an offering associated with stock of the company; cash flow; earnings per share; or net income. The resulting element comprises a possible range for the value of the asset, or the market size of a product or service associated with an asset. The resulting element comprises a possible range for expected values or expected market prices of the asset, or the market size of a product or service associated with an asset, at a future time.

An investment vehicle associated with the asset may be made available for trading by one or more of the users, the body of information comprising an estimated value of the investment vehicle. The asset comprises common stock of a publicly traded company. The investment vehicle comprises a contract between a buyer and a seller based on the value of the investment vehicle. The investment vehicle comprises a financial derivative defined on events associated with an asset. The asset comprises a security. The asset comprises stock of a company. The asset comprises stock of a public company. The asset comprises stock of a company that intends to raise new capital, and the body of information enables users to study an estimated value of the stock to be issued to raise the capital. Users are enabled to apply for ownership of at least a part of the capital by entering bids for the stock to be issued to raise the capital. The new capital is to be raised in an Initial Public Offering (IPO). Users are enabled to enter bids for the asset.

Exposing the body of information includes providing an interactive navigational environment to enable the user to explore the facts, assumptions, and relationships. Exposing the body of information includes displaying portions of the body of information to a user. Exposing the body of information includes displaying a portion of less than all of the body of information and displaying a navigational element that can be invoked to have another portion of the body of information displayed. The navigational element comprises a link representing at least one of the relationships. More than one navigational element can be invoked with respect to a given one of the portions of the body of information.

The exposing includes enabling users to engage in discussions about at least some of the elements. The discussions include proposed alterations to at least one of the facts or assumptions or relationships. Specific users are barred, based on their conduct, from engaging in the discussions. The discussions are accessible to other users. At least some of the discussions are incorporated as part of the body of information. The body of information is updated based on the discussions. The discussions are arranged based on an estimated skill of users with respect to the discussions. The exposing includes posting questions on topics of interest to users and enabling users to post opinions or answers in response. The user responses are analyzed to derive useful information and the generated information is incorporated into the body of information elements. The exposing includes enabling users to understand sensitivities of facts and assumptions to changes in other facts and assumptions. The exposing includes enabling users to understand sensitivities of the estimated value of the asset to facts and assumptions. The exposing comprises making the body of information available to the users electronically by an electronic feed to a website host. The exposing comprises displaying. The exposing comprises enabling a user to navigate through the relationships, facts and assumptions. The exposing comprises displaying portions of the body of information and providing navigational features to enable a user to study the multiple instances of relationships, the resulting facts and assumptions, the source facts and assumptions used to generate them using the relationships, and the other relationships used to generate the source facts and assumptions.

The exposing comprises enabling users to study the facts, assumptions, and relationships, by displaying portions of the body of information, each of the portions including at least one of the resulting facts or assumptions and a navigational element that is associated with one of the relationships and, when invoked, causes display of another of the portions that includes a fact or assumption that is a source fact or assumption with respect to the resulting fact or assumption and the relationship associated with the navigational element. In each of multiple instances, the one other portion includes (a) the source fact or assumption which is also a resulting fact or assumption and (b) an interactive navigational element that is associated with another one of the relationships and, when invoked, causes display of a third portion that includes a fact or assumption that is a source fact or assumption with respect to the resulting fact or assumption of the one other portion, and the relationship associated with the navigational element. The exposing includes exposing essentially all of the elements of the body of information that a user would need to know in order to understand how the resulting element is generated. The exposing includes exposing all of the elements of the body of information without withholding any.

Among the advantages of the concepts described here are one or more of the following. The particular interests, knowledge, and skills of individuals that may relate to at least some aspect of an asset can be used effectively to enable (and encourage) the user to participate in evaluating, discussing, and learning about assets, their values, and factors that drive their values. A person can buy and sell interests in contracts that are tied to estimates of values of assets, key parameters that influence values of assets, and parts of assets and in that way to profit from his personal interests, knowledge, and skills. How a single asset may be divided into parts that people may invest in is discussed in detail below. Hosts of online services can profit from providing an interactive forum and offerings of contracts available to individuals. A medium can be provided for advertisers to place effective advertising associated with assets and their values. The paradigm under which people view valuations of assets may develop a focus based on concepts such as technology, or market, or geography, or politics, or events that influence values of assets, instead of on assets themselves in their entirety. The information can be made transparent down to the lowest level for anyone to use, contribute to, and view.

These and other aspects and features and combinations of them may be expressed as methods, apparatus, systems, program products, means or steps for performing functions, and in other ways.

Other advantages and features will become apparent from the following description and from the claims.

DESCRIPTION OF THE DRAWINGS

FIGS. 4, 5, and 8-32 show user interface screens.

FIGS. 34-84 are screenshots of a representative user interface.

DETAILED DESCRIPTION

Overview

Figure 1:
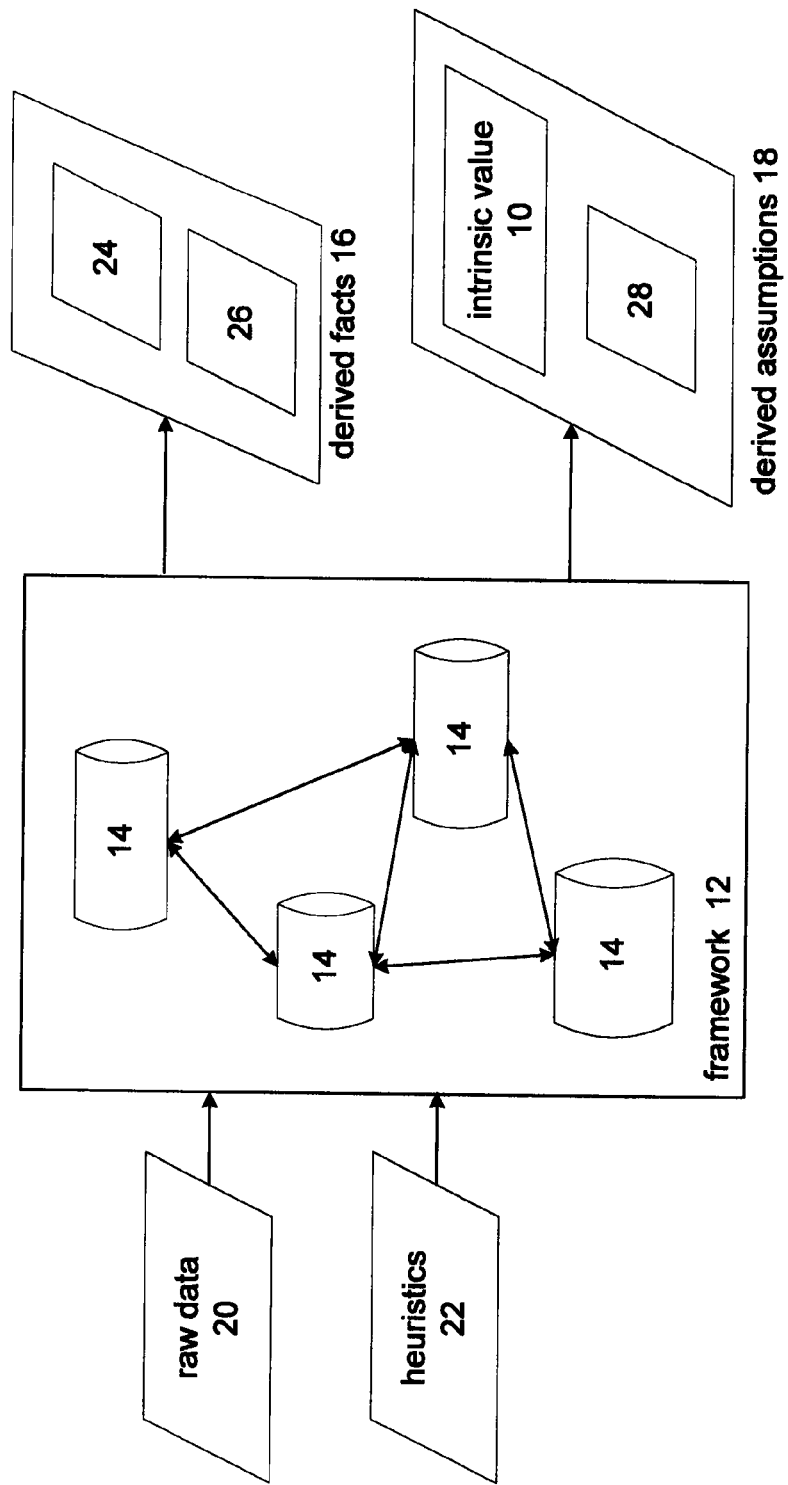
FIGS. 1, 2A, 2C, 6, 7, and 33 show block diagrams of asset valuation systems.

As shown in FIG. 1, a present intrinsic (sometimes called true) value of an asset 10 can be determined using a framework 12 that is a set of rules 14 (for example, a model or other analytical or computational approach) that identifies facts 16 and assumptions 18 that are to be derived (the estimated value of the asset 10 is one of the assumptions to be derived) and how they are to be derived from underlying raw inputs 20 and heuristics 22. We sometimes refer to rules as relationships. The outputs of the framework are derived facts 16 and assumptions 18, which may include supporting facts 24, calculated facts 26, and estimates (calculated assumptions) 28.

The raw inputs and heuristics are themselves facts and assumptions. The term heuristic includes any kind of expert opinion or commonly accepted assumption. Together the rules or relationships and the raw and derived facts and assumptions make up a body of information and are sometimes called elements of the body of information.

The term fact includes any piece of information describing a past or present circumstance, for example, the price per kg of Ti yesterday or the current membership of the board of directors of a company. A fact may be derived from another fact using a defined relationship, e.g., fact2=f(fact1).

The term assumption includes a piece of information that is not presently objectively verifiable, for example, tomorrow's price of Ti, or that a product will be released on time. An assumption may be derived from facts and other assumptions using a defined relationship or chain of relationships, e.g., assumption41=f(fact1), assumption42=f(fact1,assumption41), as sumption42=f(assumption41). For example, the statement that ABC stock will be worth $10 on December 1, based on its current price of $5 and the expectation that the new product will launch by November 23, is an assumption derived from a fact and another assumption. This derivation may be a heuristic (an expert thinks new products double stock prices) or a functional calculation (the expected additional cash flows from the new product when discounted to December 1 amount to a $5/share value.) As mentioned earlier, the present intrinsic value of an asset is an assumption and is sometimes called a resulting element of a body of information.

Estimating the intrinsic value of an asset (which we sometimes call a resulting element of a body of information) requires collecting information from many sources. In addition, the estimation commonly requires exercise of judgment on the information to be used, the facts and assumptions needed, and calculations employed. Calculations are then performed on the facts and assumptions, and on results of these calculations, to ultimately arrive at an estimate of intrinsic value.

Due to the judgment involved, estimates derived by different interested parties are commonly different for a given asset. Moreover, since calculation of intrinsic value commonly involves predictions into the future, the intrinsic value cannot be known for certain. As a result, in order to make decisions on the allocation of their time and assets, it is useful for interested parties to develop an understanding of the estimate of the intrinsic value and of the factors that it depends on. Involvement of significant judgment in estimations of expected cash flows from an asset, and in estimating risk of individual cash flows, makes it non-trivial to estimate asset value. Individuals may commonly be interested in an estimated range for the intrinsic value of assets, to better reflect the uncertainty involved and judgment employed in the estimations. The system described here may provide an estimated range of intrinsic value of assets. In addition, individuals are often interested in the expected market price at a future time period, for example, over a 6 month, 1 year, or 5 year timeframe. Commonly, individuals may expect the market price at a future time to be equal to the estimate of intrinsic value at that future time. The system described here may provide estimates of the expected market price or value of an asset, at a future time point, for different assets.

Additionally, individuals commonly are interested in a company due to certain products, markets, or events they are familiar with or have read about. Estimates of the size of the overall market for the markets within which the product or service may exist are of significant interest to users. Such estimates provide an indication of the size or the value of the product or service of interest and help individuals understand the value of the company in context of the product or service. The system described here can provide such estimates.

Price movements in the financial markets may also occur due to imbalances between demand and supply for the asset. These imbalances are commonly transient, however, they could be more frequent for some assets than others. Due to such imbalances, the expectation of future prices may differ from the expectation of the intrinsic value of an asset. In addition to supply and demand imbalances, there may be other forces that affect the value of an asset. The system described here may also incorporate these supply and demand imbalances and other forces in models or frameworks in deriving the estimate of the expected price of the asset at a future time.

Interested parties who care about the intrinsic value of an asset and the factors that depend on it may develop their own estimates or use estimates provided by others. Because of the work involved in searching, collecting information, performing calculations, and making judgments about information and calculations to use, this is time consuming and requires skill Estimates provided by others are most useful to interested parties if they can understand the estimates and the factors that they depend upon, which helps them to develop confidence in the estimates.

When estimates of intrinsic value are provided to interested parties, they are made more useful if they are disclosed in a transparent way, that is, by exposing to the recipient without reservation all of the facts, assumptions, heuristics, and other bases for the estimates and the details of the framework that was used to derive the value from the base information. For example, it is helpful to enable the interested parties to have the option to see each of the calculations performed, the explanation for each calculation, the information used in each calculation, the origin of such information, and the judgments made in selecting the information and the calculations used. For example, if an asset is stock in a company that intends to raise capital, possibly in an initial public offering (IPO), the interested parties may want to study an estimated value of the stock to be issued in the IPO. Being able to provide a variety of such options, without cluttering the content, can be used to cater to a large audience.

By enabling easy access to such transparent information, and organizing the information in hierarchical layers, interested parties can quickly form and refine views, compare their opinions with those presented, and develop confidence in the developed estimate, without being overwhelmed by the comprehensiveness or complexity of the presented information. Users across organizations, and even strangers may be able to collectively discuss the presented content on the medium itself. While viewing the content, users may also be offered the opportunity to invest in the assets they are examining, for example, by directly purchasing traded assets or entering bids, as appropriate.

There is value in not discriminating between users in deciding whether to allow them access to information, and how much information to allow access to different individuals or groups, based on difference in expected financial benefits from them.

Such content may be presented along with user surveys, or even stand-alone questions on products, markets, and events, allowing users to participate in them. Questions may be integrated within the content at relevant points to help users better engage with the related content by asking them questions relevant to the content they may be interested in. Information collected and analyzed from the surveys and questions may be used to update the model.

A wide variety of techniques can be used to enable an interested party (we sometimes will refer to interested parties simply as users) to navigate quickly and easily within a hierarchically organized body of valuation information (we sometimes use the term content to refer to the information). For example, web browsing links can be provided within the content. Numbered options may be integrated at different places within the content without cluttering the visibility and readability of the main content or the flow of the content for estimating intrinsic value.

Users may also be provided with options to see explicitly the effect of a change in any information displayed, calculations used, or judgments employed, on the intrinsic value estimate and other derived or calculated information. In addition users may be provided options to alter the information and calculations used, and insert their own judgments about information and calculations used at selected places in the framework, as well as save the changes introduced for later access or sharing with other users. This will allow the users to leverage the existing content while developing their own estimate for intrinsic value. Users may also be provided options to share their opinions or pose questions on specific information, calculations, and judgments used. The in-house analyst can answer questions and participate in and steer discussions originating from such exchanges of opinions in the right direction.

By developing transparent intrinsic value estimates for a wide variety of assets, and an easily navigated medium in which users can contribute to, review, analyze, understand, and modify the content (facts and assumptions, for example) and frameworks (relationships and chains of relationships, for example) underlying the estimates, the system described here will enable the development of a broadly accepted, widely used value-centric view of the world. By value-centric view of the world, we mean, for example, a broad understanding of what value is and how it is explained at any level of the hierarchy, rather than simply at the top level of an asset or enterprise. The system described here is a powerful tool (one that matches more closely the real world) for understanding and investing in the results of human activity.

A value-centric view of the world provides a value-based lens into various different disciplines ranging from science, technology, markets, consumer behavior, and human psychology. It considers value creation as the central goal of human endeavor, and attempts to understand value and the factors that drive value by primarily asking and answering the questions: what are the assets whose value a discipline or concept impacts or is expected to impact, how, and by how much. It analyzes the parameters, facts, and assumptions within a discipline that affect values of different assets and tries to quantify them. Such a view of the world allows individuals to explicitly see, assess, question, and compare various disparate disciplines of human activity with respect to their estimated worth and their influence on values of different assets of interest.

This is achieved through a network of structured information, where information at any level may be accessed to understand its usefulness in estimating values of different assets. In this way information from different disciplines may be brought together while laying out clearly what is useful, in which contexts, and how, and separating out other or similar information that may be less useful. Other categories of information may include gossip or other information of questionable quality. By selecting information that is expected to be most useful and then structuring and placing it in context of the 'so what,' the system described here addresses the information overload problem.

Users are able to see from the lens of a certain technology, or any other area, directly into the assets that it impacts, how, and by how much. For example, when someone searches for stents, he sees as results the top companies that make stent products, the present market price of these companies, and estimates of their value. In addition, users can see the specific products that use stents and estimates of relative market share (a metric that can be more easily measured and tracked and is an indicator of relative value) of these products, and the reasons for the difference. Further, for a specific type of stent technology, the user will see the products that use that technology and the aggregate of the estimated market share of the products.

Owing to the inherent nature of uncertainty, estimates of value or price commonly turn out to be different from the realized price. Due to this, in sharing views on asset value or price, it can be most useful to explicitly lay out, without cluttering, the complete set of relevant facts, assumptions, and relationships used in estimating asset value or price. The system can be built to provide users options to navigate through different portions of the content based on their present knowledge level, curiosity, interests, and skill, to easily understand the content and leverage to their best advantage and without being overwhelmed. Further, users can be allowed to collectively discuss the content at specific granular levels of facts, assumptions, and relationships within products, markets, and events they understand and are close to. Stand-alone questions or surveys can also be placed within the context of relevant content at different points within the content. Such questions can be centered around different products, markets, or events with which individuals are familiar and to which they are close in order to further engage the users, help better understand the content itself, and allow the users to share their views. An in-house analyst (who can serve, for example as a moderator of the body of information) can refine the content based on the on-going discussion and responses to the questions, making it more attractive for additional users. Over time, because of the openness and structure of such a system, allowing complete participation from all users to their desired level, such a platform can grow into a gold standard for sharing views on asset value.

Such a transparent, value-centric, view of the world may change the way interested parties make decisions about their time and asset allocation. Interested parties with an understanding of value, and its drivers, will be better equipped to create and appropriate value. An understanding of markets and drivers of value may also enhance entrepreneurship and create additional opportunities for value creation in the economy. Over time it will change the way interested parties participate in capital and labor markets, and how corporations raise capital and share information with the public.

As shown in an idealized form in FIG. 3A, described in greater detail below, an asset 202 can be viewed as comprising an aggregation 200 of components 204, 206, 208 at multiple hierarchical levels 210, 212. Each component may have a value 210$n$, 212$n$ that contributes to an aggregated value of a component at higher levels of the hierarchy (i.e., in FIG. 3A, value 210$a$=value 212$a$+value 212$b$). These values may be actual or intrinsic financial values, or they may be abstract parameters, for example, the probability of a favorable decision on a lawsuit. As one example, the value (200$a$) of a share of stock of General Motors (company 202) could be viewed as an aggregation of the values of the automotive divisions (204$a$), and the non-automotive divisions (204$b$), and the value (210$a$) of an automotive division could be viewed as an aggregation of the values (212$a, b$) of the specific operations (206$a, b$) of that division, while the value (210$b$) of a non-automotive division could depend on the value (212$c$) of an investment (208), for example, in automobile financing. Some frameworks may use models other than hierarchies, depending on the interrelationships between components in the type of asset being valued.

Transparently exposing to users all of the content and framework details associated with the components of an asset, enhances the users' ability to understand value and factors that influence value at all levels of the hierarchy. Among other things, it is possible to define investment vehicles whose values depend explicitly and primarily on specific key parameters that affect the value of an asset. Thus, a user who has deep knowledge about the market for Corvettes may be able to invest in a contract whose payoffs are explicitly and primarily linked to the value of the Corvette model within the Chevrolet automotive division of General Motors. Further, contracts may be defined with payoffs explicitly linked to other key parameters that influence the value of the Corvette model or that are believed to be predictors of the value of the Corvette model, for example, the number of units of the car expected to be sold within the next year. The value of such an investment vehicle is affected by factors that the user understands, and is interested in. By transparently providing all the underlying information associated with that component the user can invest or make other decisions about the value more confidently because he can evaluate the value using his own expertise.

Figure 2A:
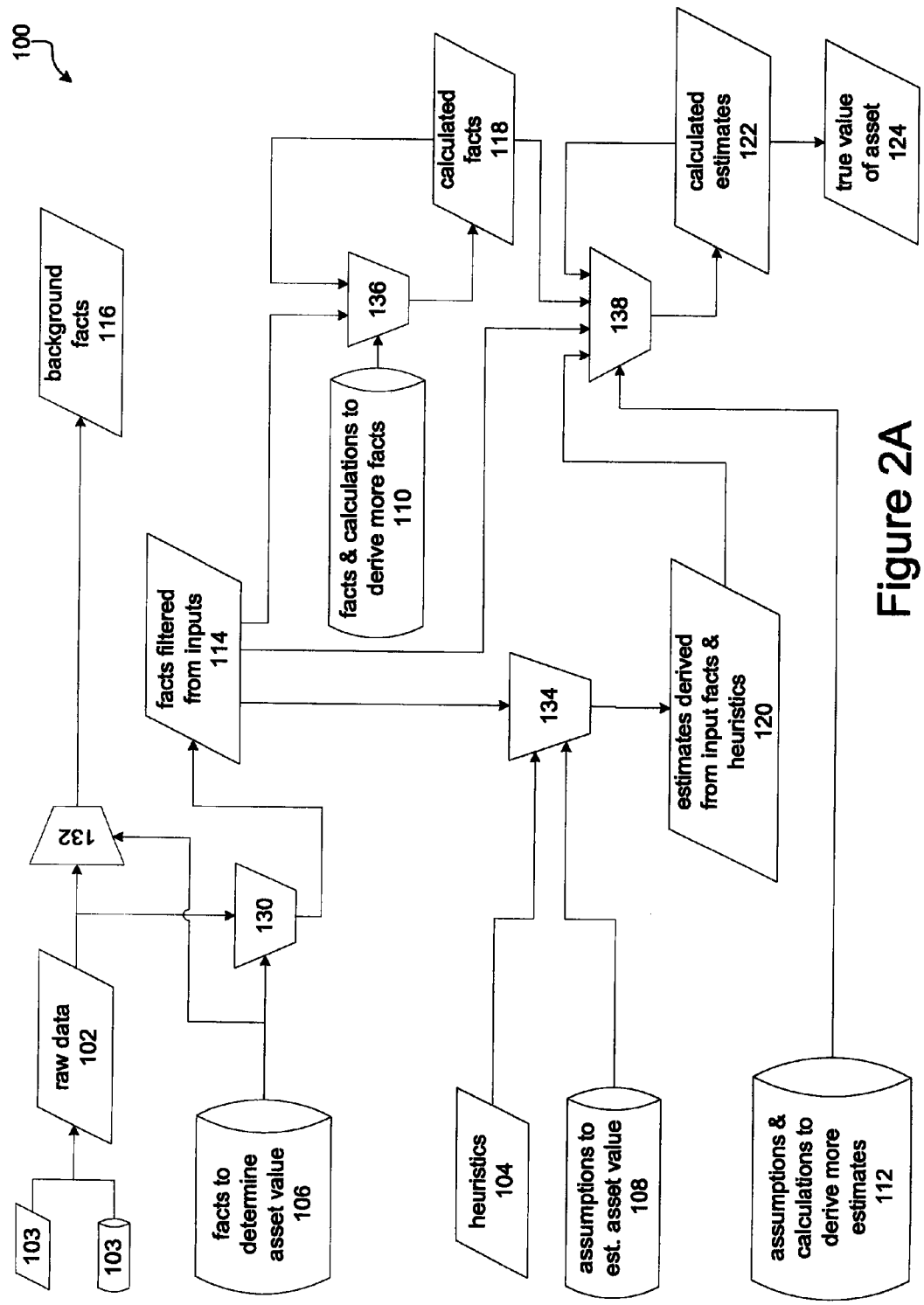

FIG. 2A shows an overall view of an asset value estimation system 100. This system implements a more-complicated version of the framework in FIG. 1, with, among other things, multiple feedback loops, outputs re-used as inputs, and multiple paths from the inputs to the outputs. One input to the system is raw data 102, which may include news and information releases, such as company press releases and regulatory filings, commonly known information in different fields of science, technology, markets, finance, consumer behavior and others which are expected to be meaningful for the value of assets. The raw data may also include information from surveys, expert opinions or comments from discussions conducted in-house or externally, privately or publicly. The raw data can be drawn from electronic feeds, printed materials, and a wide variety of other sources 103.

Another input may be heuristics 104. These are rules derived from the experience of analysts or external experts, or are commonly understood assumptions relevant to the estimate of value of an asset. For example, a heuristic could be that if the economy grows more than 4 percent in a year, automobile prices rise the next year. This may be based on the fact that in the past, automobile prices have always risen in the year after a year in which the economy grew more than 4 percent. Heuristics are commonly based on relevant facts and are best understood when placed in the context of such facts. The platform can include heuristics in context with the facts relevant to the heuristic to allow individuals to better understand the content and its context.

Other inputs 106, 108, 110, and 112 are used by the system 100 and collectively characterize a given framework. An identification 106 of facts from the raw data 102 controls, through a filter 130, which facts 114 can be used in subsequent calculations to determine asset value. Identification of assumptions 108 is used in combination with the identified facts 114, in a computation 134 to generate estimates 120 directly from the heuristics 104. These are referred to as direct estimates. Some of the raw data 102 may also be identified by the inputs 106 as background information 116 (filter 132), such as an explanation of different scientific or financial terms or models underlying the framework. One framework input is an identification 110 of facts and calculations that can be used to calculate (136) additional facts 118 from the filtered facts 114 and other calculated facts 118. In some examples, the derivation of some outputs does not use all the inputs enumerated, for example, some additional facts 118 may not use other additional facts 118 in their calculation. Another framework input is an identification 112 of assumptions and calculations that can be used to calculate (138) additional estimates 122 from the input facts 114, the direct estimates 120, the calculated facts 118, and previous calculated estimates 122. One of the calculated estimates 122 is a resulting element that is the estimate of intrinsic value 124 of the asset. The framework inputs, outputs, and calculations may be referred to generically as parts or elements of the framework. Thus the framework, in some examples, can be viewed as a body of information elements (facts, assumptions, and relationships).

The framework inputs 106, 108, 110, and 112 include not only the identification of the facts, assumptions, and calculations (e.g., relationships) useful to generate outputs from the inputs, but also information on the specific relationships between the different inputs and the outputs. The information about these relationships is useful in understanding how an output fact or assumption is generated from the different input facts and assumptions.

For example, inputs 106 include information on different relationships between the raw data 102 and facts 114 that are useful in understanding how the different facts 114 are generated. Inputs 106 also include information on different relationships between the raw data 102 and background information 116 that are useful in understanding how the different background information element 116 are generated. Inputs 108 include information on different relationships between the facts 114, heuristics 104 and the direct estimates 120, that are useful in understanding how the different direct estimates 120 are generated. Inputs 110 include information on different relationships between the facts 114, other calculated facts 118 and the calculated facts 118, that are useful in understanding how the different calculated facts 118 are generated.

Inputs 112 include information on different relationships between the facts 114, calculated facts 118, direct estimates 120, other calculated estimates 122 and the calculated estimates 122 that are useful in understanding how the different calculated estimates 122 are generated. Expressing (e.g., explicitly laying out, displaying, and permitting navigation with respect to) these input and output facts and assumptions, including the relationships, allows users an option to completely understand how the asset value estimate or other resulting element has been derived. Such information on different relationships may itself consist of facts and assumptions that are logical or mathematical, or may describe other commonly known relationships. This information may include mathematical or logical operators or other symbols that represent the relationship between the different elements.

Within the system 100, facts and assumptions used to generate other facts and assumptions may be referred to as source facts and assumptions, while the facts and assumptions generated may be referred to as the resulting facts and assumptions. The resulting facts and assumptions may also serve as source facts and assumptions within other instances when they are used to generate other facts and assumptions. Similarly, the source facts and assumptions may actually be resulting facts and assumptions in instances where yet other facts and assumptions are used to generate them. In some examples, source facts and assumptions are used within relationships to generate resulting facts and assumptions and the different resulting facts and assumptions can progressively be used multiple times, within other relationships, to generate additional facts and assumptions. We sometimes refer to relationships used in progression to generate resulting facts and assumptions which are subsequently used to generate additional facts and assumptions as relationship chains.

Exposing users to the network of such facts, assumptions, and relationships between the different source and resulting facts and assumptions, while using a hierarchical structure, can cater to users of a range of skill sets. It also caters to users with interest in different types of information or in different parts of an asset. Leveraging web-based tools of browsing and access and incorporating information within links can allow inclusion of such a variety of information without cluttering the content while making it completely transparent.

In different instances of system 100, the output 124 (one of the calculated estimates 122) may be represented by other estimates that are of interest as an output or as a result. Examples of such output elements include an estimate of a range for the intrinsic value of an asset, an estimate of a range for the expected intrinsic value of an asset at a future time, or an estimate of a range for the expected market price of an asset at a future time. Such output elements of interest may sometimes be referred to as the resulting element. Other examples of output elements include estimates of the size of a market for a product or service at a present or a future date and ranges for such estimates. A framework may include multiple resulting or output elements representative of values of more than one asset.

There may be multiple versions of these framework input facts and assumptions 106, 108, 110, 112 corresponding to different available frameworks. Each of these framework inputs can be based on a variety of available information. Well-known principles of finance and asset valuation, expert opinions, established or experimental models, external or in-house research, and similar information all go in to determining what facts and assumptions to use in a framework and how to combine them.

To apply a different framework and arrive at a different estimate of the same intrinsic value 124 and other values of outputs 114, 116, 118, 120, and 122, the system 100 loads other framework inputs 106, 108, 110, and 112. Several example frameworks are discussed below. The raw data 102, heuristics 104, and framework inputs 106, 108, 110, and 112 may be organized into several categories. Some facts may be variables that change over time, automatically or under the control of some entity.

Figure 2B:
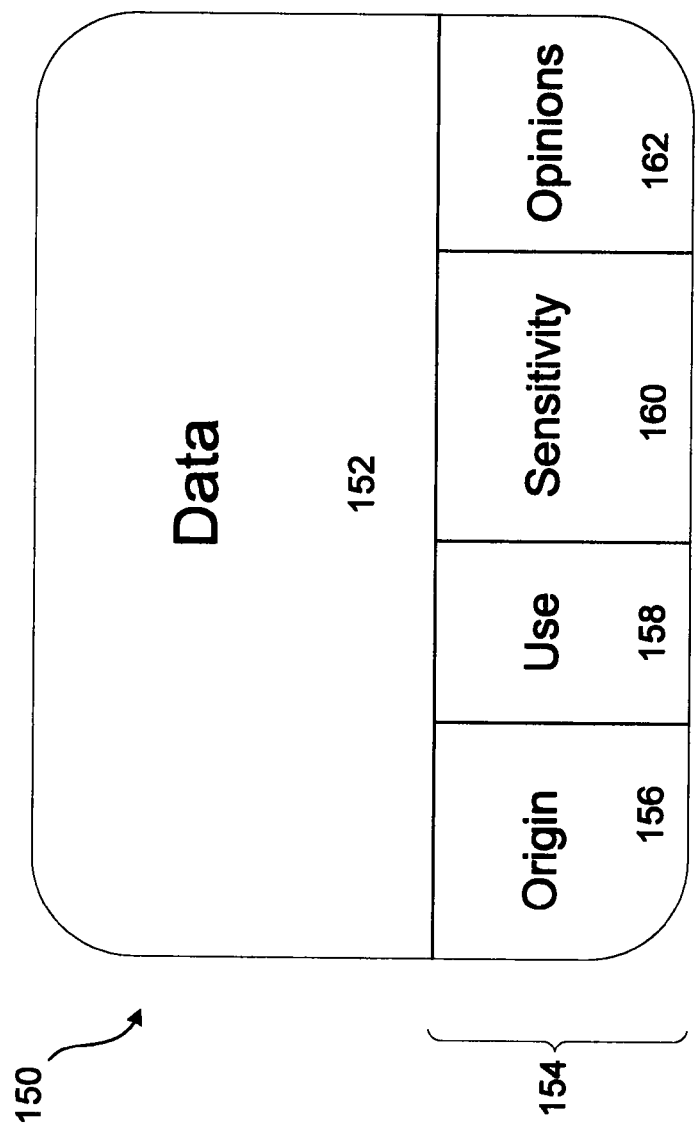
FIG. 2B shows a block diagram of a data structure in an asset valuation system.

Within the system 100, data (raw data 102, heuristics 104, framework input facts and assumptions 106, 108, 110, 112, output facts and assumptions 114, 116, 118, 120, 122, 124) can be represented as a combination of underlying data and metadata, as shown in FIG. 2B. The underlying data 152 of an item of data 150 may be a formula, an assumption, or any other piece of information. The metadata 154 has four components, the origin 156, use 158, sensitivity 160, and opinions 162. These may be embedded data that exist within the data structure encoding the item of data 150, or they may be rich information linked from other data sources. For example, the use and sensitivity may depend (as described below) on what other facts and assumptions reference or depend on the data. Rather than maintain a list in each item of data of everywhere else that data is used, a relational database may allow the metadata to deliver the appropriate information when needed without storing redundant copies throughout the system. Some items of metadata, for example, opinions, may themselves be data with their own linked metadata.

The origin (also called the basis) 156 of a piece of information, whether fact, assumption, or otherwise, is an identification of where it came from. This could be a simple thing, like "the stock price came from the NYSE," or it could be an explanation of the calculations used to derive a value. The basis or origin for some facts or estimate could be calculation, measurement, or observation, while others will be derived heuristically. Going in the other direction, we refer to the use 158 of a piece of information when we mean an identification of what will be done with it, i.e., which other facts or estimates depend on it, and how.

Sensitivity 160 is a measure of how significant a fact, an assumption, or an estimate is in a model, that is, how much does a unit change in the fact, assumption or an estimate impact the estimate of output element, or other facts and assumptions that depend on it. Sensitivity also measures how much does a fact, assumption or an estimate change for a unit change in other facts, assumptions, or estimates. The sensitivity of facts and assumptions to other particular facts or assumptions could be part of one or more of the framework inputs 106, 108, 110, or 112, or it could be provided by users as part of the input heuristics 104.

Opinions 162, like facts, may be received as inputs, but are essentially assumptions made by people, as opposed to the assumptions on which the model (we sometimes use the word model to refer to a framework or other analytical tools for making valuations) is based. An opinion that proves to be especially valid or useful could be integrated into the assumptions used by the model. Other opinions may be treated as facts on which the model operates, while others may simply be provided to the user (e.g., as background facts 116) to assist him in making an informed decision.

A common framework used in estimating the values of assets is a discounted cash flow model. Using this model, the value of a company may be evaluated as equal to the present value of cash flows expected from different annual time periods, P1 through Pn. The present value of cash flows expected from a period, Pm, may be obtained by estimating the expected cash flows and discounting them with an average discount factor. The cash flows expected in any period Pm, may in turn be evaluated as the difference between the cash inflows, for example, inflows from revenues expected in that period, and the cash outflows, for example, outflows from costs expected to be incurred in that period. The different contributors of inflows and outflows are suitably adjusted to evaluate the cash components of all the flows. The revenues may further be obtained as a sum of revenues from different divisions, D1 through Dn, each with products P1 through Pn. Similarly the costs may be evaluated as those related to different activities of research and development, manufacturing, sales and marketing, distribution, general and administrative expenses, within the divisions, for different products. Some of the cash inflows and outflows are distinguishable at the product level, while others may only be separable at the division level, while still others may only be distinguishable at the level of the particular annual time period, or even the overall asset. In some examples, various parameters related to the value of different parts of an asset are calculated, but the values of the parts themselves are not calculated. Other commonly used frameworks for estimating values of a company include a comparables valuation framework, sum-of-the-parts valuation, economic value added framework. These frameworks are based on commonly known principles of finance, but other unconventional frameworks may also be used.

For a company, many different parameters at the level of a product, a division, a specific operation, or other activity, for example a significant lawsuit that the company might be involved in, influence the value of a company. However, most individuals, including sophisticated investors, may commonly have opinions, interests or understanding only about the parameters relating to a particular product, a division, a lawsuit, or an operation, instead of the entire company. In addition, many individuals may only be interested in certain parameters or events expected to influence the value of the company. Investment vehicles with payoffs explicitly and primarily dependent on parameters related to such a product, division, lawsuit, operation, or events expected to happen in the future, may allow investors to invest in issues they understand and feel most comfortable about, rather than assume risks related to the entire company. It may also allow individuals interested in the entire company, but unwilling to assume risks due to certain products, divisions, lawsuits, operations or events, to hold a position in the entire company and hedge the risk due to the specific products, divisions, lawsuits, operations or events they are uncomfortable with, using such investment vehicles.

Other investment vehicles may be created with payoffs explicitly and primarily linked to more than one of the specific products, divisions, lawsuits, operations or events of a company, and/or across different companies. These investment vehicles may be offered along with transparent, hierarchically structured frameworks for estimating values of the companies, the investment vehicles themselves, and the numerical levels of the parameters. This will allow individuals to efficiently compare their understanding of the underlying issue, the parameter levels estimated, and estimated values of the investment vehicles against the market prices of the investment vehicles and engage in areas of interest to them. Individuals may then feel more comfortable assuming positions to profit from such investment vehicles.

Figure 3A:
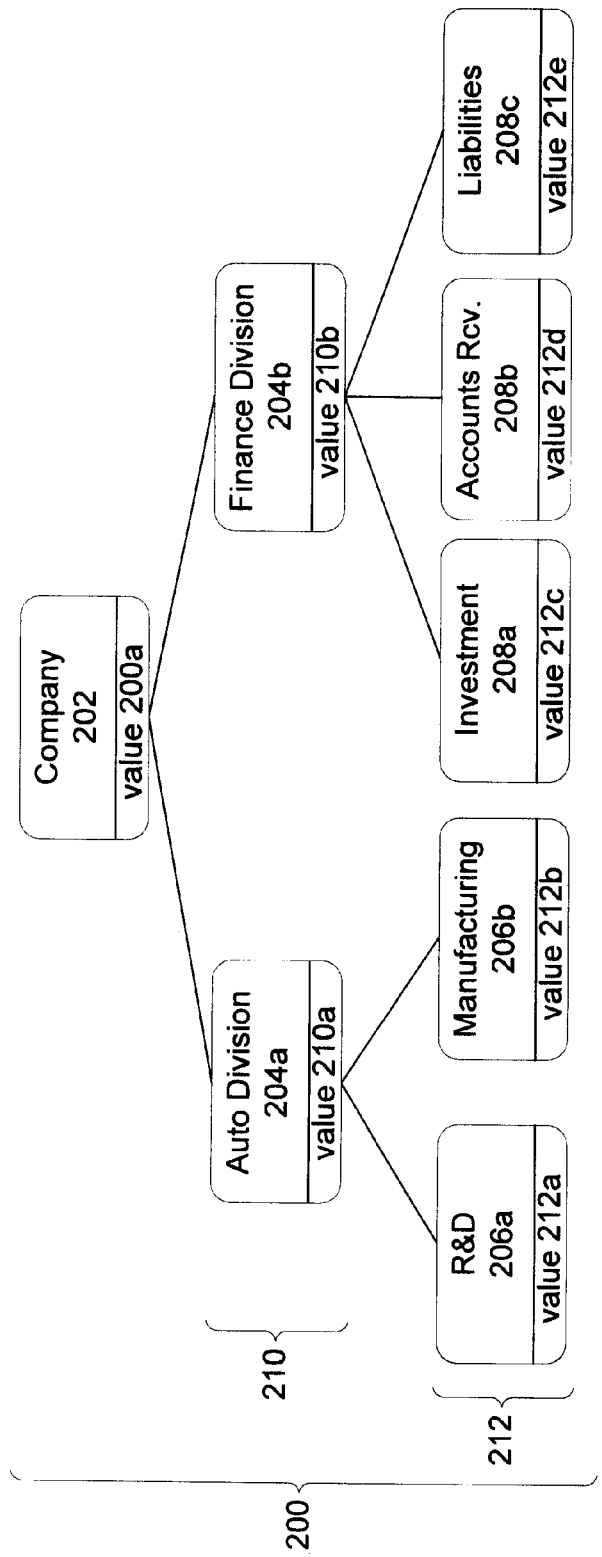
FIGS. 3A-3C show hierarchies of data.

As noted above, some frameworks may use a hierarchical model of a real-world entity (company, commodity, etc.) underlying the asset being evaluated, as shown in FIG. 3A. A hierarchical model for a framework may be structural. For example, a car company 202 has an automotive division 204a and a finance division 204b. The automotive division 204a has an R&D operation 206a and a manufacturing operation 206b. The financing division has a value based on investments 208a, accounts receivable 208b, liabilities 208c, and other features (not shown). The manufacturing operation has a value based on such things as the factories it owns, the cost of operating them, the value of the cars manufactured, and how much profit it makes from selling them. The R&D operation has a value based on the cost of employing engineers, the infrastructure for their research, etc. The values of these components or the parameters that characterize them are combined to find a value of the division, and the values of the divisions are combined to find a value of the company. Values of components may include placeholders, abstract numerical values, or actual or intrinsic values. Some components may not have intrinsic values. How combinations of components' values are defined is the subject of differing opinions among analysts, as is how the estimated value of the company as a whole should relate to its stock price or the price of a bond issued by the company. In some examples, hierarchies are based on financial and accounting metrics that may not correspond directly to real-world entities.

Figure 3B:
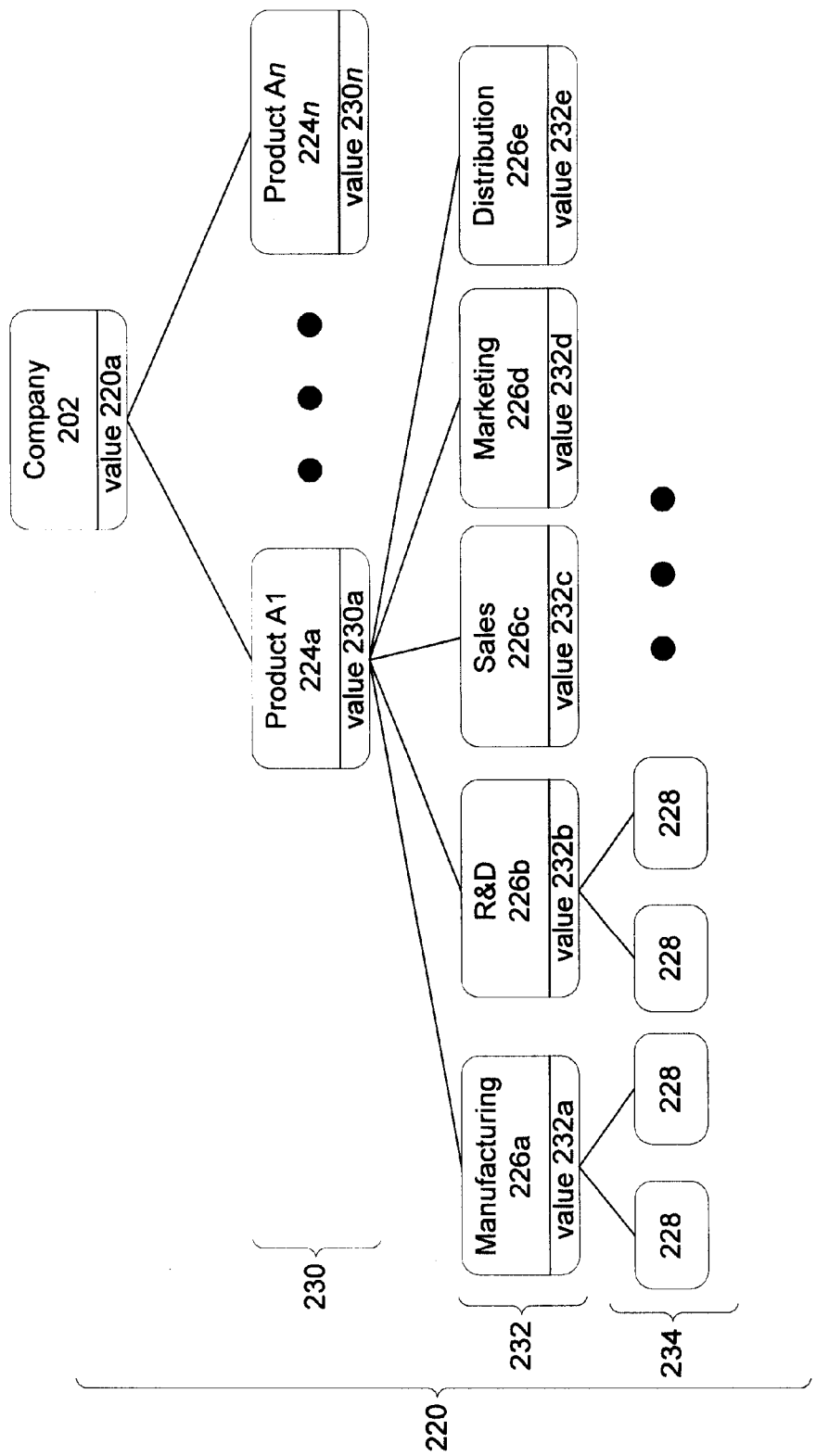

Other hierarchies are possible. As one example, shown in FIG. 3B, a model 220 may relate the value of the company 202's stock to the value of its different products. Thus the company may be divided into its products $A_1$ 224a through $A_n$ 224n. These can be further divided into specific components of manufacturing 226a, research and development, sales, marketing and distribution, needed to generate income. At the lowest level 234 of the hierarchy 220 are facts or basic assumptions 228. Stepping up the hierarchy and combining the values ascribed to these facts and assumptions 228, based on additional facts and assumptions defining the model, the framework assembles an estimate of the company 202's value. The facts and assumptions defining the model along different paths of the hierarchy, may be provided by experts in different areas, for example, the knowledge of an expert in a market for product $A_k$ may be combined with that of an expert in market for product $A_j$.

Once an asset's valuation has been reflected by such a hierarchy, components of the hierarchy can be used to define new assets with values based only on that component of the hierarchy. In effect, assets or components and values of them can all be viewed hierarchically. We sometimes refer to a marketable asset based on a component as a fractional asset. For example, in the framework of FIG. 3B, a fractional asset may be created based only on the product $A_k$. The value of this fractional asset may depend on the present value of future cash flows expected from such a product. In some examples, the fractional asset is basically a derivative contract defined on some parameters that influence an asset. More specifically, the value of such a fractional asset may depend on the current and future market demand for the product, its cost of production, and the ultimate decision on an ongoing lawsuit against the intellectual property on such product. A potential investor who is familiar with such issues, but unfamiliar with other aspects or products of the company's business, may be comfortable investing in such a fractional asset based on his own evaluation of the underlying factors and a comparison of his evaluation to the model used in the framework, but would not be willing to invest in the company as a whole. Such fractional assets can be created at any level of the hierarchy, and tracking the real prices at which such fractional assets are traded can further refine the overall model. Providing such fractional assets allows a far broader class of investors to participate in a much more subtle, rich, diverse, and comprehensive set of markets. The components themselves on which fractional assets are based may not have clear values. When we refer to fractional assets, we sometimes are actually describing a contract on the outcome of an event pertaining to the asset.

Figure 3C:
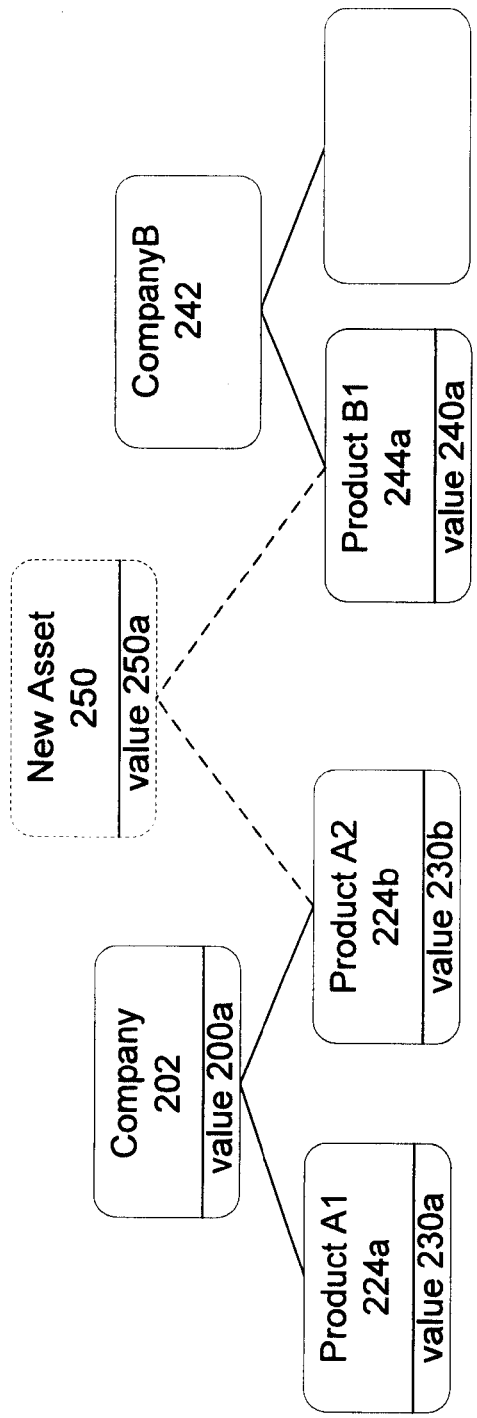

In some examples, as shown in FIG. 3C, fractional assets spanning different top level assets may be combined to create additional new asset types. For example, the product $A_2$ fractional asset may be combined with a product $B_1$ fractional asset for other products in the same market, produced by different companies, e.g., CompanyB 242 in FIG. 3C, to create an aggregate fractional asset 250 with a value 250a derived from the values 230b, 240a of the fractional assets it combines. Such an asset 250 could have its own selection of hierarchical models, for example, one divided first by company and another divided first by geographic region where the constituent products 224b and 244a are sold. Fractional assets may also span categories within a single top-level asset, for example, a fractional asset may be based on all products in developmental phase for all the divisions of a company.

Figure 2C:
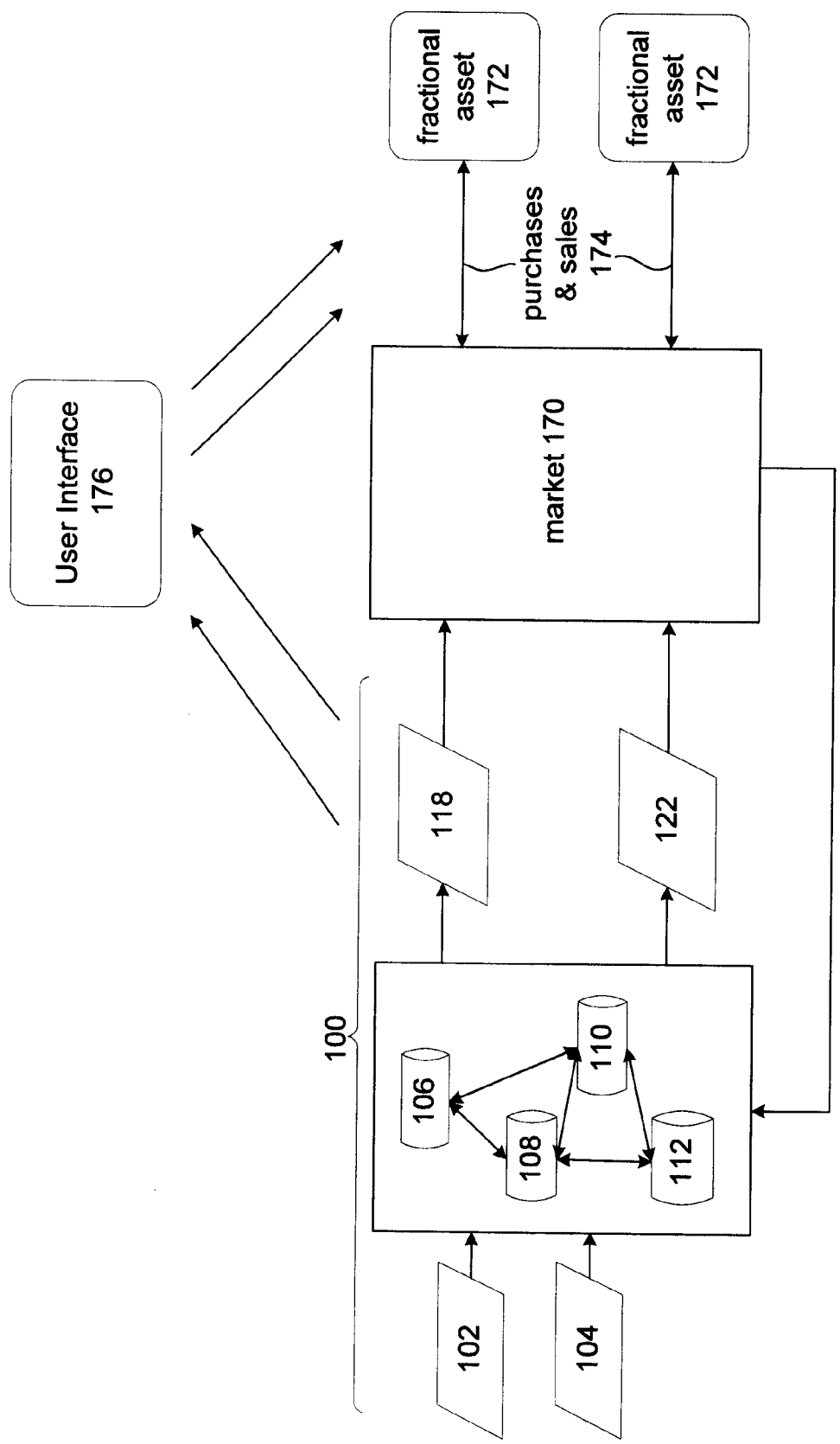

A comprehensive system to gather, analyze, and provide this information will also facilitate creating markets in which contracts for such fractional assets can be traded. As shown in FIG. 2C, participants using the information made available from the system 100 through a user interface 176 can be directed by that interface to the appropriate markets, e.g., a market 170 where they can buy and sell fractional assets 172, and the trades 174 taking place on the market 170 can feed back into the system 100 as new input facts and to provide improved assumptions for the frameworks. The user interface is discussed in detail below.

Various techniques can be used to increase the transparency of the data available to potential investors and other interested parties.

Figure 4:
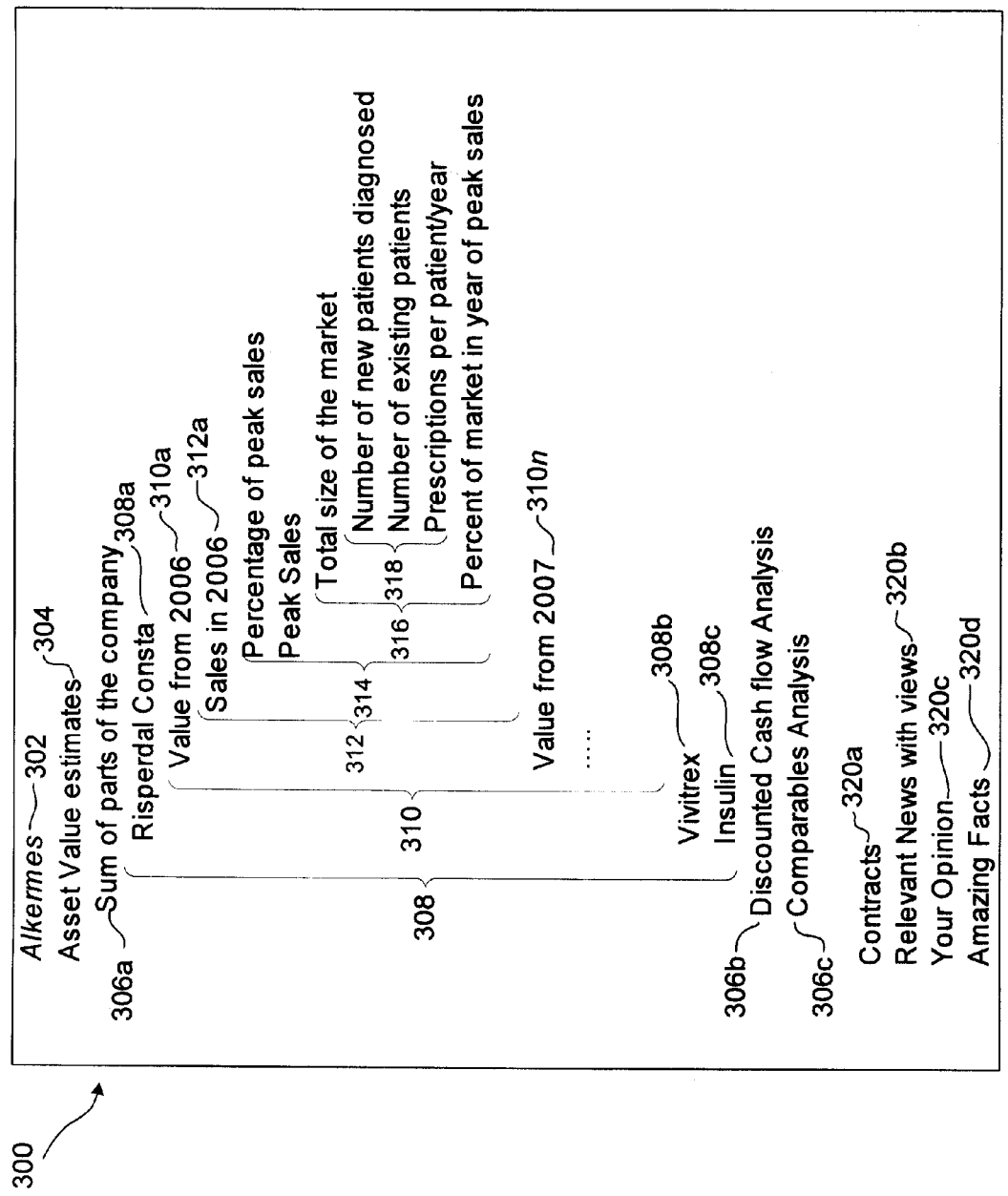

In some examples, as shown in FIG. 4, an interactive interface allows the user to explore the hierarchy, facts, assumptions, relationships, and relationship chains of a particular framework. As the user clicks on an element at one displayed tier or portion of the hierarchy, the elements at the next tier down or another portion that explain that element are shown. In the example of FIG. 4, a user interface 300 is shown displaying attributes of a company called Alkermes. The company name 302 is shown at the top of the display. Three different frameworks (referred to as Asset Value Estimates 304 in the user interface of this example) are offered for this company: Sum of parts of the company 306a, Discounted cash flow 306b, and Comparables 306c. In this case, the user has selected the Sum of parts framework 306a, so the hierarchy 308 of that framework is shown. The top level of components are product lines 308a-n. The user has selected Risperdal Consta (one of Alkermes's products) 308a, so the elements that this framework 304a uses to estimate a value of a product, its value in each of several years, are shown as the components 310a-n at the next level 310 of the hierarchy. In turn, one of these components 310a has been expanded to show one sub component 312a at the next level 312, and that has been expanded to three deeper levels 314, 316, and 318 of the hierarchy. Separate from the frameworks, other features 320a-d are displayed at the bottom of the interface. Contracts 320a links to the contracts market described above.

In some examples, as shown in FIGS. 29-32 and discussed below, news releases and other information releases including interviews, surveys, conducted internally or externally, can be gathered and analyzed to find information relevant to asset valuation at all levels of the frameworks. These can be linked to by the news link 320b in the interface 300 of FIG. 4. This news can be delivered to the users, annotated to show what effect the models predict it will have on any relevant part of affected assets or the entire asset. This could include identifying fractional asset contracts that can be expected to gain or lose value as a result of the news, and links to other relevant information.

Figure 5:
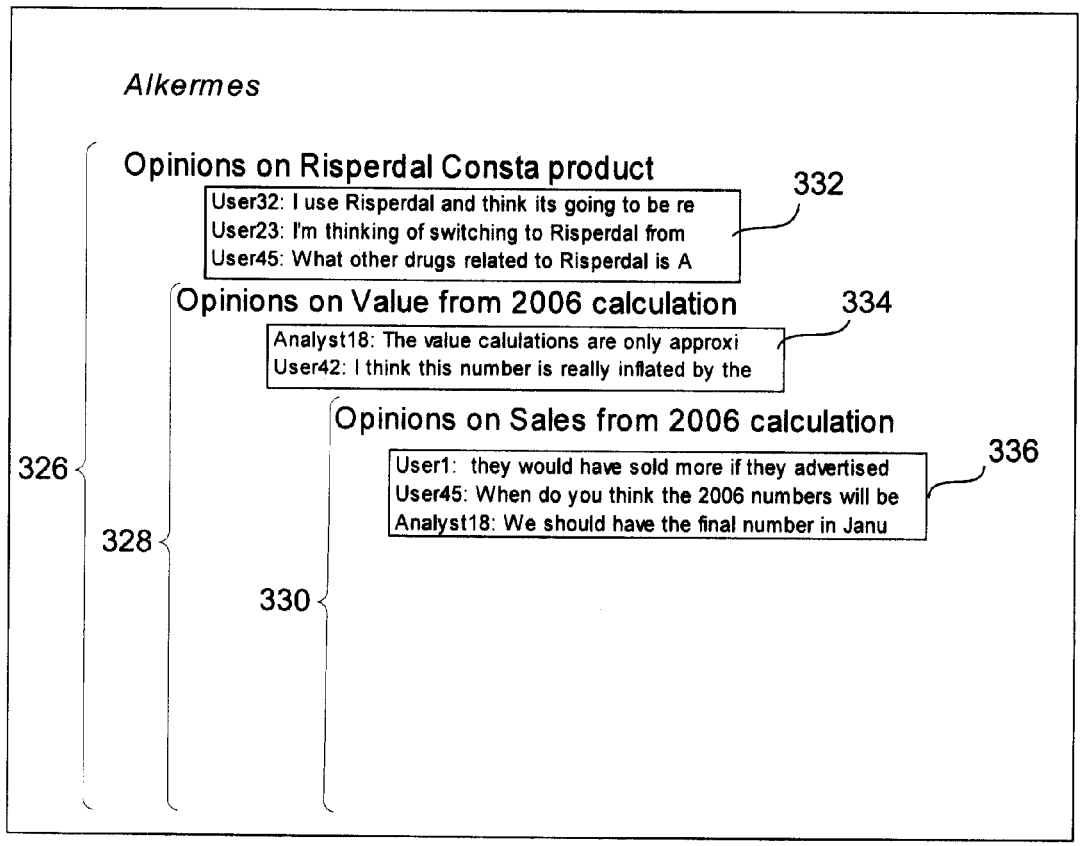

The "Your Opinion" link 320c may take users to an interactive forum. Many web sites have forums that allow participants to discuss topics of interest. For investments, forums may be focused on particular stocks or particular classes of investments. This concept can be extended to all levels of the system described here, providing a network of forums following the same structure as the hierarchies underlying the frameworks, as shown in FIG. 5. At each level 326, 328, 330, the discussion 332, 334, 336 can be focused on just the component considered at that level, and participants can discuss the relationships, calculations, facts and assumptions used. The system can automatically filter, divide, and combine the discussions to provide relevant discussion and opinions at each level, even in overlapping hierarchies. This allows a first participant to take part in a discussion narrowly tailored to his expertise, while allowing participants at other levels to see comments by the first participant relevant to their chosen level, as selected by the system. Such a forum allowing discussion at different levels of the hierarchy, with an automatic capability for filtering, division, and combination, may allow such discussions to be more meaningful than unstructured or non-hierarchical discussions involving broad generalities offered without useful and reasonable rationale. Discussions with substantiation and rationale may also draw a larger audience and over time continue to grow in attractiveness to a larger population.

To further provide transparency, when viewing a comment or opinion, a user can also see why the system selected that comment or opinion for inclusion in the forum at the present level—that is, the origin metadata for the opinion, as mentioned above. The community facilitated by such a forum will benefit from increased participation—as more people participate, the quality of information will increase, and even more users will be drawn in.

Additional benefits can be achieved by employing in-house research analysts (in-house with respect to the party that creates, operates, or manages the platform) to aid the discussion, steering it in positive directions, and answering questions posed by participants. The in-house research analyst can also benefit from such forums as they can use the information exchange to refine the facts, assumptions, calculations and judgment used in estimating the intrinsic value of assets, thus making it more attractive for users. To enable efficient analysis of ongoing discussion at different levels, the analyst (we sometimes use the term analysts as one example of a moderator of the platform) can cause the discussion to be fed through a program that helps arrange the different discussions based on hierarchy, topic, or the expected skill level of the users. In addition, monitoring the discussion can allow identification of users who may engage in disruptive behavior on the platform and taking steps to prevent damage or future participation of such users.

As data is evaluated though the various frameworks, the system may be configured to identify some facts as interesting to likely users. The user can reach this from the "Amazing Facts" link 320d in the main interface 300. These facts may include, for example, news articles, changes in analysts' ratings, or product announcements. Such facts can be highlighted when the user accesses the system and linked back to the source material, including an identification of why the fact was highlighted and what effect it has on the model.

A platform for communicating asset value or future price estimates can be built by combining transparent, hierarchical, interactive frameworks with quality research. Such a platform may provide a solid backbone of information that users may be able to understand and discuss freely with other users at a meaningful level of facts and assumptions within products, markets, events, and topics of interest, within assets, and across assets. Users may be provided an option to modify the content to incorporate their own views and share them with others, to make the platform more attractive. In some examples, users are not allowed to modify elements of the body of information, or user modifications must be authorized by a controlling authority.

Another part of the platform, may include popular content such as 'Amazing facts,' 'Your opinion,' and commoditized content of broad interest such as market data, news feeds, and personal finance sections that may allow users to feed their interest in asset parts (products, markets, operations) or events by reading about them in a structured framework, within different relevant contexts. Through contracts users may actually be able to act on their views on asset parts or events of interest. Users may also be able to additionally branch off into understanding, participating in, and acting on other aspects of an asset or other related assets.

In another part, different news stories that may be categorized within topics, companies, products, markets, or events of expected interest to users, is expected to act as a hook for a large base of users. Estimates of impact of assets influenced by a news event may be provided along with the news to attract users to read the complete 'impact story' along with the news story. The news with impact may be linked with estimates, frameworks, and contracts for additional usefulness.

Using these different sections of interlinked content, a unique, meaningful, online financial community can be organized for sharing and trading views on financial assets. Offering parts like 'interesting facts,' 'your opinion,' and 'news with impact' well-integrated with the asset value estimates, and contracts, may appeal to a broad range of users. Users may be attracted initially to sections of direct interest to them and may also be able to transition smoothly to other sections outside of their current familiarity and financial sophistication. As a result, they may be able to develop familiarity, interest, or comfort to understand content within such sections and participate more actively in them, for example, through discussions and contracts. Combining best-in-class research with content that may be accessible free of charge may allow and encourage broad involvement. Such a financial community may appeal to users with a broad range of financial sophistication. Interlinking the different types of content and presenting users with different contexts may be implemented to allow users to transition smoothly between different sections, increasing the appeal. Constant refinement of the content, structure, framework, functionalities, contracts, and advertisements of the platform, using data on user activity and from user surveys, may be used to update or improve the usefulness of platform to users. Data on user activity on the transparent valuation market can also be collected and analyzed to identify the traffic drivers and refine the marketing, publicity content, and efforts to attract additional users to the transparent valuation market.

Different sections of the content, including the asset value estimates, facts, and assumptions, may be updated by the experts over time as new and relevant facts and information become available. This is expected to help users better study, discuss, and use the body of information. The updating may be done continuously as information becomes available, and some of it may happen automatically through data received from electronic feeds. When updating the content, the older information may also be stored and made available to users for reference.

Advertising can serve as both a source of revenue and as additional information for the models and platform. Advertisements for products and services can be narrowly tailored for the specific components of an asset's value, according to a particular model, that a user is looking at, and can direct a user to investment opportunities focused on that area. See, for example, the sample advertisements 322 in FIG. 13. The success of such advertisements can be fed back to the model to evaluate the value of the advertised service and the relevance of the information with which the advertisement was associated, among other things.

Participants in the Transparent Valuation Market

Figure 6:
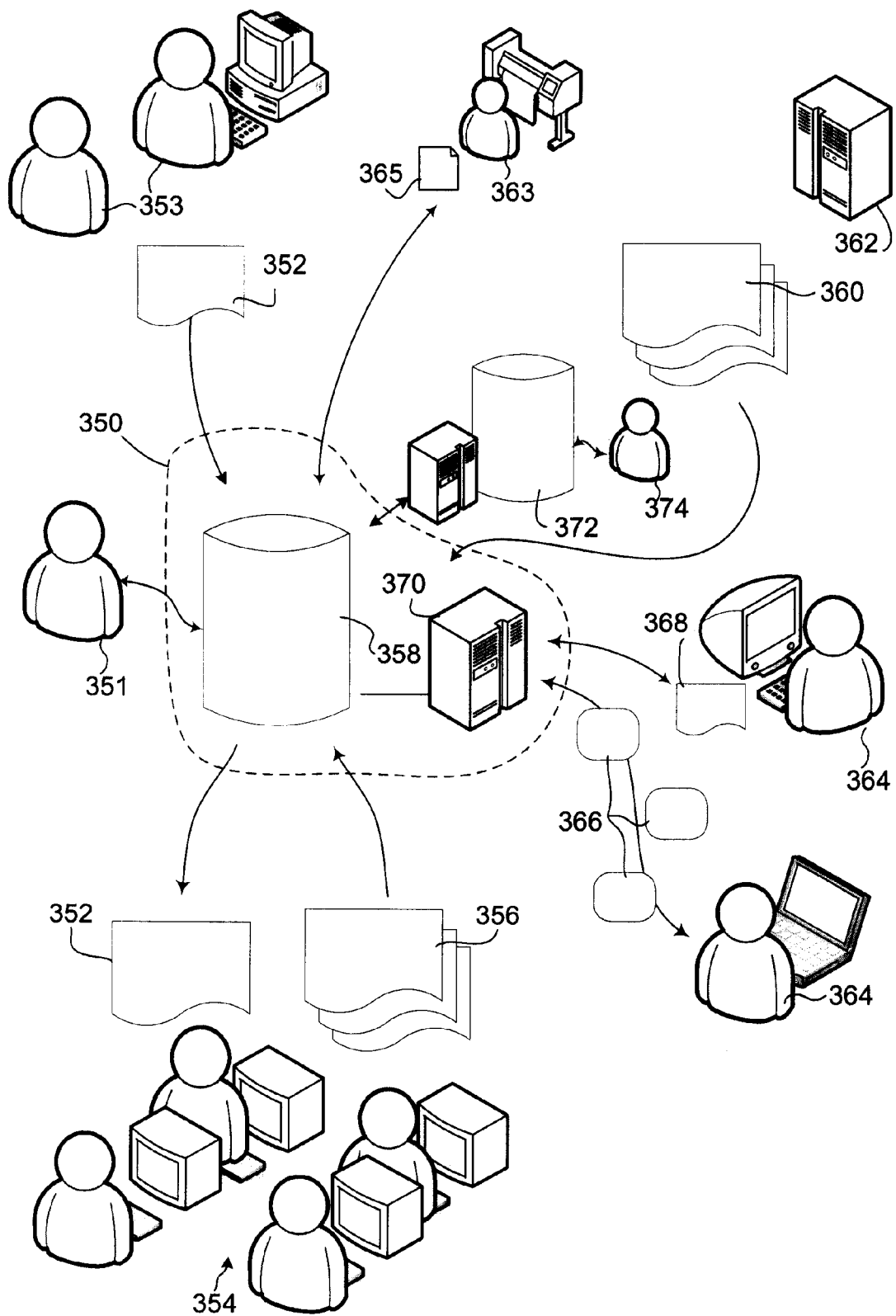

The overall operation of a transparent valuation market that can be created with such a detailed body of information is shown in FIG. 6. Various individuals and entities can be involved in creating, maintaining, and using such a transparent valuation market. The computer system 350 underlying the transparent valuation market is operated by one or more operators 351 or host. The frameworks used to estimate asset values based on the available facts and assumptions are formulated by market and financial experts and others with experience in the needed analysis, as selected by the operator 351, and may also be based on commonly known concepts for asset valuation and principles of finance. Other experts within the transparent valuation market may include experts in design or development of information on the communication medium, who may work in close collaboration with experts in finance, markets, and other experts. An electronic data interface may enable interaction of the financial experts with the experts in design or development of information.

In some examples, general frameworks 352 broadly describing how the available facts correspond to the parts of a hierarchy and how they relate within the hierarchy (the assumptions) are assembled by a first group of analysts 353, who may provide some example frameworks applied to specific assets. A second group 354 of analysts then can use this framework 352 to develop similar frameworks 356 for other assets.

For example, an expert 353 in analysis of pharmaceutical company stocks may create a general framework for estimating the value of stock of a pharmaceutical company and a specific framework applying that general framework to a first pharmaceutical company. These model frameworks 352 are then provided to a team of researchers 354 who create a similar framework 356 for valuing stocks for each of the other pharmaceutical companies to which such a framework may apply. Experts 354 may additionally be supported by another set of experts (not shown) who may primarily be engaged in data collection and the first level of analysis.

As another example, an expert 353 in investment banking may create a general framework for estimating the value of bonds issued by an investment bank and a specific framework applying that general framework to a first bank. These model frameworks 352 are then provided to a team of researchers 354 who create a similar framework 356 for each other bank that issues bonds on the relevant market. All the frameworks are stored in a central database 358 controlled by a server 370 which implements the system 100 (FIG. 2B) and makes the analysis available to users.

The operator 351 of the transparent valuation market may purchase commercial content 360—news feeds, market reports, expert analysis, frameworks for estimating asset values—to integrate into the system according to the frameworks 352, 356 developed by its own experts 353, 354. The providers 362 of this content 360 may simply treat their product as a commodity, charging flat prices for their goods regardless of their use, or they may negotiate more sophisticated arrangements, such as sharing revenues generated by advertising published on the same web pages as their content. The system 350 may also output data back to external providers 362 to include on whatever sites they operate. The operator 351 may also arrange with an advertiser 363 to provide advertisements 365. Advertisements may serve as both a source of revenue and as an additional information source, as described in more detail below. Advertisers may also be interested in the data collected from user activity and user surveys to help improve the usefulness of advertisements.

End users 364 of the system may serve multiple roles—beyond viewing advertisements 365, and viewing, buying and selling, or bidding on whatever contracts, investments, other content, or services 366 are offered, advertised, or linked to by the transparent valuation market, users may contribute inputs 368 in the form of their own opinions entered into discussion forums or other feedback systems. Through the discussion links or through answers to stand-alone or questionnaires, users may also be able to offer suggestions for offering of new contracts that may be of interest to them. Users also provide information through their usage habits, which can be monitored by the system 350. Such data can be analyzed to refine understanding of user needs and to improvise the content and frameworks, increasing their appeal for the users. Such data can also be analyzed to better understand user response to advertising and improving the usefulness of advertising to both users and advertisers. Data on user activity and surveys may also be of interest to third parties and the operator 351 may share such information with the third parties with or without charges.

A market for contracts on fractional assets may be operated on a separate system 372 or it may be integrated into the transparent valuation market system 350. Market makers 374 who provide liquidity for the contracts market will be essential participants. In some examples, the contract market is directly integrated with the transparent valuation market and its backers 374 will work closely with the operators 351 of the transparent valuation market. In other cases, the two operate independently, with the transparent valuation market referring customers 364 to the contract market in exchange for commissions and information about their participation. Certain other legal or regulatory experts may be involved either in-house within the transparent valuation market or externally to provide expert advice on contracts or other parts of the market.

The transparent valuation market system 350 may be hosted somewhere on a network. In some examples, standard internet hosting technology is used. This could be provided by a third-party vendor or could be operated in-house by the operator 351 using a direct connection to the internet. Proprietary networks could also be used, in some examples overlaid on an existing information infrastructure but separated from the other content communicated on it.

Advertisers may participate through a variety of models. Some advertisers may simply purchase advertising space on the information pages for certain assets, while others may wish to be more integrated, basing their advertisements on usage patterns and detailed relationships between pieces of information, receiving feedback from which they can refine their own models and providing similarly valuable information to the market operators.

The Database that Underlies the System

Figure 7:
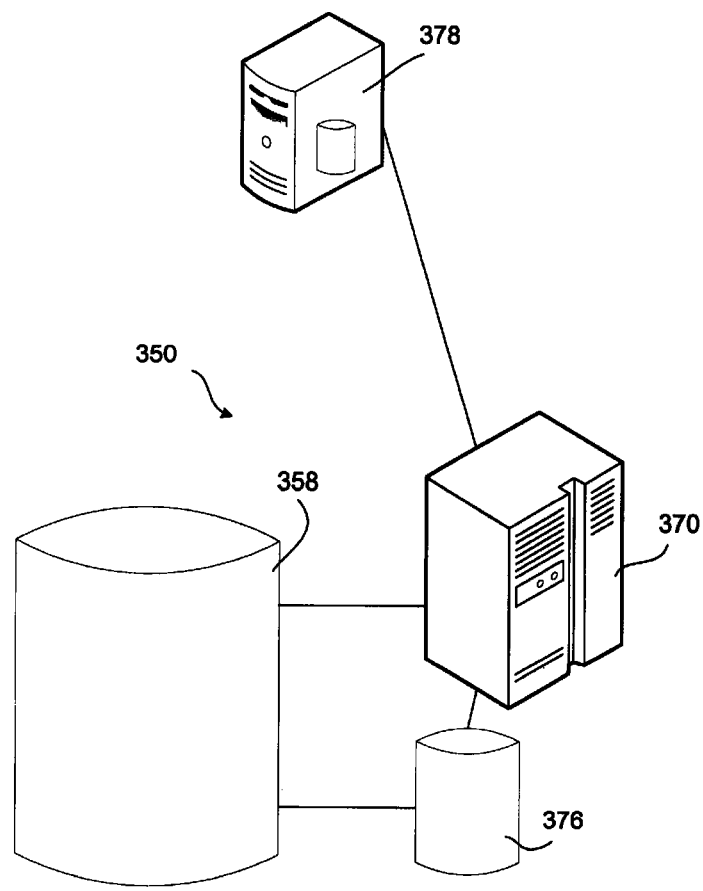

The database 358 used to store the frameworks and data may be implemented as shown in FIG. 7. As noted above, a framework is not a single piece of information but is, for example, a collection of facts, assumptions, relationships, and relationship chains, some of which are calculations to be performed on other facts and assumptions, on input data, or on the output of other calculations. All the facts and assumptions in a given framework may be stored in a single database 358. This could be, for example, a massive table or a set of relational databases. The data could be spread among a variety of separate database systems, e.g., 358, 378. In some examples, each framework is a unique set of data, while in others, a framework is metadata representing a selection of facts and assumptions from other sources and to be retrieved as needed. These different examples are not mutually exclusive, and different features from different database implementations may be mixed and combined as needed to provide the robustness and transparency needed to operate the transparent valuation market.

In some examples, a server 370 with which users 364 interact maintains a store 376 of content that is regularly updated from a master database, e.g., the database 358. In some examples, the server 370 provides direct access to at least a subset of the data in the master database 358. The master database 358 can contain the raw data that is available to users 364 and to the frameworks, definitions of the frameworks themselves, including assumptions, facts, and relationships that are part of each framework, the current values calculated for any of the outputs or intermediate values produced by the frameworks, and additional information useful to its operators 351 to maintain the entire system 350. The information contained in the master database 358 may come from a variety of sources, and what we describe as a master database may, in some examples, be a set of databases linked together by information contained in one or more of those databases or in another location. In addition to the data directly used in the frameworks, the master database or a secondary database may store additional information such as user profiles and development tools for the analysts 353, 354 generating frameworks.

Information about assets could be collected from the markets on which they are traded, gathered from websites or through interviews with experts, or generated by analysts, to name a few examples. This information may be purchased by the maintainer of the database or it may be gathered from free sources. Whether and how much the maintainer paid for the data may also constitute additional data on which the frameworks can base valuations, but business agreements may prevent disclosure of that information. Metadata for a given fact, within a chosen framework, may indicate its origin, how it is used within that framework or calculations within the framework, how sensitive other facts and assumptions are to that fact, how sensitive the fact is to other facts within that framework, and links to other metadata about the fact, such as user opinions related to it. Similarly, metadata for a given assumption, within a chosen framework, may indicate its origin, how it is used within that framework or calculations within the framework, how sensitive other facts and assumptions are to that assumption, and how sensitive the assumption is to other facts and assumptions, and links to other metadata about the assumption, such as user opinions related to it. Each of these elements of a record may be directly stored with the fact or the assumption or may be linked to the fact or assumption through other parts of the master database, such as the framework definitions. Any standard approach to database architecture could be used to construct and maintain the database, depending on the actual implementation.

The master database may be housed at a central location or may be distributed according to any database topology. To assure transparency of the information provided, it may be beneficial for the database to be maintained by the same entity that provides the interface to the information, but other arrangements are possible.

Changes to the database—additions, deletions, edits, restructuring, etc.—are carefully managed and documented. This serves several purposes. As noted for other features, it enhances the transparency of the data and can itself serve as an input to frameworks. For example, an evaluation of stock price may consider how recently the underlying data were changed, and may find it more efficient to get that from the database's metadata than from the raw data itself.

The in-house analysts will perform the valuation of assets with data retrieved from the first database 358 and the outputs stored there. Web-designers and system developers will have to access this data and ensure conversion to a format suitable for publication on the web and suitable arrangement on multiple web pages. An intermediate system program may convert the relevant content for estimates of asset value from the format generated by the frameworks to a format that is easier for web designers to use, to ultimately publish it online. In-house analysts may work closely with web-designers, system developers, and IT personnel to ensure the content has appropriate format and desired usefulness.

The User Interface

In some examples, the user interface for the platform is as shown in FIGS. 8-32. The information displayed in the user interface corresponds to framework parts or elements including the framework inputs 102, 104, 106, 108, 110, and 112, framework outputs 114, 116, 118, 120, and 122, and calculations 130, 132, 134, 136, and 138 in the system 100 of FIG. 2A. This information may come directly from the databases 358 discussed above or may be retrieved from other sources based on links to it found in the framework outputs. Some of the information, for example, advertisements, that is not directly part of the frameworks may also be loaded from sources external to the transparent valuation system. In some examples, any item of information displayed in the user interface is connected, for example, by hyper linking, to related information including its origin, its use, and other metadata. The extent to which this is applied to every object in the interface may depend on the resources of the computer systems supporting it and those developing the system.

Figure 8:
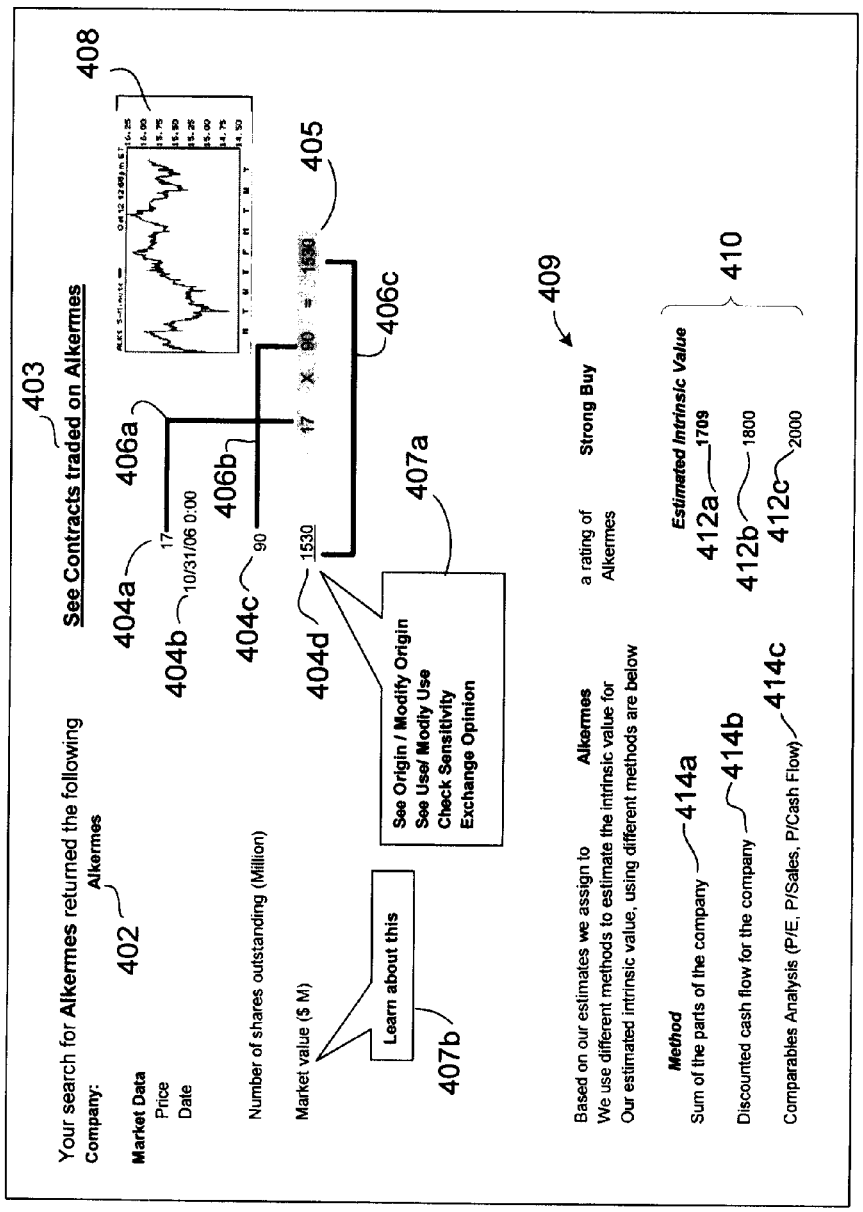

FIG. 8 shows a home page 400 for a particular asset, identified by its name 402 at the top of the page. In this example, the asset is a publicly traded company, so the page includes market data such as the stock price 404a, when that price was last updated 404b, the number of outstanding shares 404c (in millions, in this example), and the market value 404d. As one example of the transparency of information in the transparent valuation market, when the user positions a mouse cursor over the computed value 404d or when he clicks on that value, a pop-up menu 407a appears. On clicking the 'See Origin/Modify Origin' link within the pop-up menu 407a, a box 405 appears along with lines 406a-c indicating how the market value 404d was calculated from the stock price 404a and the number of outstanding shares 404c, and illustrated by lines 406a-c. The pop-up menu has additional links, including 'See Use/Modify Use,' 'Check Sensitivity' and 'Exchange Opinion.' By selecting these respective links the user is offered additional relevant options, similar to those explained elsewhere. Another pop-up menu 407b appears when the user positions a mouse cursor over the term 'Market Value' or when he clicks on the term. The menu 407b includes a link 'Learn about this,' which the user can select to be transferred to another screen showing the explanation of the term. Similar pop-up menus can be provided for any data in any of the user interface screens, but may not be shown in each figure below.

Other information in the asset home page 400 includes a graph 408 of recent stock performance and a rating summary 409. In this example, the summary 409 indicates that the in-house analyst has assigned a rating of "strong buy" to the asset. Clicking on that rating could bring up an explanation of how that rating was computed. In some examples, as here, part of that explanation is provided up-front, in the indication 410 of estimated intrinsic values 412*a-c* computed by three different frameworks 414*a-c*, respectively.

The user sees a similar pop-up menu (not shown here) as 407*a* when the user positions the mouse cursor over or clicks on any the computed values 412*a, b*, or *c*. By selecting the 'See origin/Modify Origin' link within any pop-up menu (not shown here), the user is shown the origin of the computed value. Unlike the computed value 404*d* that was computed with information 404*a* and 404*c* that was shown on the same screen 400, the information from which the estimated intrinsic values 412*a, b*, or *c* is computed is displayed on a different screen where it can be explained in greater depth. Upon selecting this option for the sum of the parts value 412*a*, for example, the user is taken to a second screen 420 in FIG. 9 displaying the origin of the computed value 412*a*. In this example, this is the calculation 422 immediately preceding the computed value 412*a* in the hierarchy of the framework. This calculation shows how the value 412*a* was calculated. In the screen 420, some information is repeated from the home screen 400, such as the stock price 404*a*, the time it was last updated 404*b*, the number of outstanding shares 404*c*, and the market value 404*d*. The fair market value 412*a* computed by the present framework is shown with the indication 422 of how it was calculated. We sometimes refer to the intrinsic value as the fair market value of the asset.

For this framework, the company is hierarchically decomposed into components 424*a-g*, some of which correspond to products—in this example, drugs. Because the company being displayed produces pharmaceuticals, the version of the "Sum of the parts" framework for this company considers the indications for the company's drugs to be a relevant fact, so that is included and the user can find related information by clicking on any of the listed drugs 424*a-f*, indications 426*a-f*, or their values 428*a-f* to the company. Other operations of the company make up a seventh component 424*g* with a value 428*g*. Lines 430*a-g* connect each value 428*a-g* and the output 412*a* to the corresponding element 432*a-h* in the computation 422. The lines could be differentiated using different patterns or colors in order to further enhance the clarity or visual appeal of the display.

A link 434 at the bottom of the page allows the user to edit the calculation, for example, if the user is familiar with this company or its industry and thinks that one of the drugs 424*a-f* is too risky and should not be included in the estimate of the intrinsic value, they can remove it from the calculation. Such a link can be provided on any page that includes a calculation. A similar link (not shown) may allow a user to modify facts or assumptions that are not calculated but are derived from any given source.

Additional screens, such as those shown in FIGS. 10-33, may present additional details about each element in the first two screens 400 and 420. These are discussed briefly, and it should be understood that the specific facts shown, highlighted, and explained in these screens may be specific to the particular type of asset, stock in a pharmaceutical company, used for this example. Similar screens detailing different information may be used for other types of assets and other types of companies.

Once the user modifies a calculation, or any other part of content, there is an option to save his work, once he logs-in to his account. In addition, the user has an option to switch back to his saved version or the default version for the estimate of asset value. He can also make his saved versions available for sharing with friends or colleagues.

The link 434 from the detail screen 420 allows the user to change how the value is estimated within the present framework. This link leads to a screen 440 in FIG. 10. Here, each of the components 424*a-g* is listed with their corresponding values 428*a-g*. The user can add or remove components 424*a-g*. The user can also alter any of the mathematical operations (here the summation operators). In addition, the user can follow links from each of the values 428*a-g* to explore or modify how the individual values 428*a-g* are calculated. An array 436 of variables influenced shows the user what other variables will be affected by the changes he has made, and by how much.

In screen 420 (FIG. 9), each of the drugs 424*a-f* or their indications 426*a-f* could link to additional information about those items, as shown in screens 460 and 500, in FIGS. 11 and 12, respectively. These screens could also be reached by searching within the content of the platform specifically on the corresponding drug (Risperdal in FIG. 11) or symptom (Schizophrenia in FIG. 12) rather than through information about the company that makes the drug. In screen 460, the value 428*a* of Risperdal Consta to Alkermes is shown—if other companies also produced this product, its value to each could be included. The indication 426*a* is also shown again, and links to the Schizophrenia search results screen 500 in FIG. 12. Additional information 446 such as scientific and market information is provided, and this could also link to additional screens (not shown). A link 494 offers contracts traded specifically on the Risperdal Consta product. In screen 500, information about Schizophrenia is displayed, including a description 502, information 504 about the market, and scientific information 506. The market information 504 includes an identification of drugs 507*a-d* used to treat the disease, companies 508*a-d* that produce them, and the market prices 509*a-d* of those companies. The identifications 508*b* of Alkermes and 507*b* of Risperdal link to the corresponding screens 400 and 460 already discussed. A link 496 offers contracts related to Schizophrenia (e.g., contracts on multiple drugs related to the disease or companies that produce them).

Figure 13:
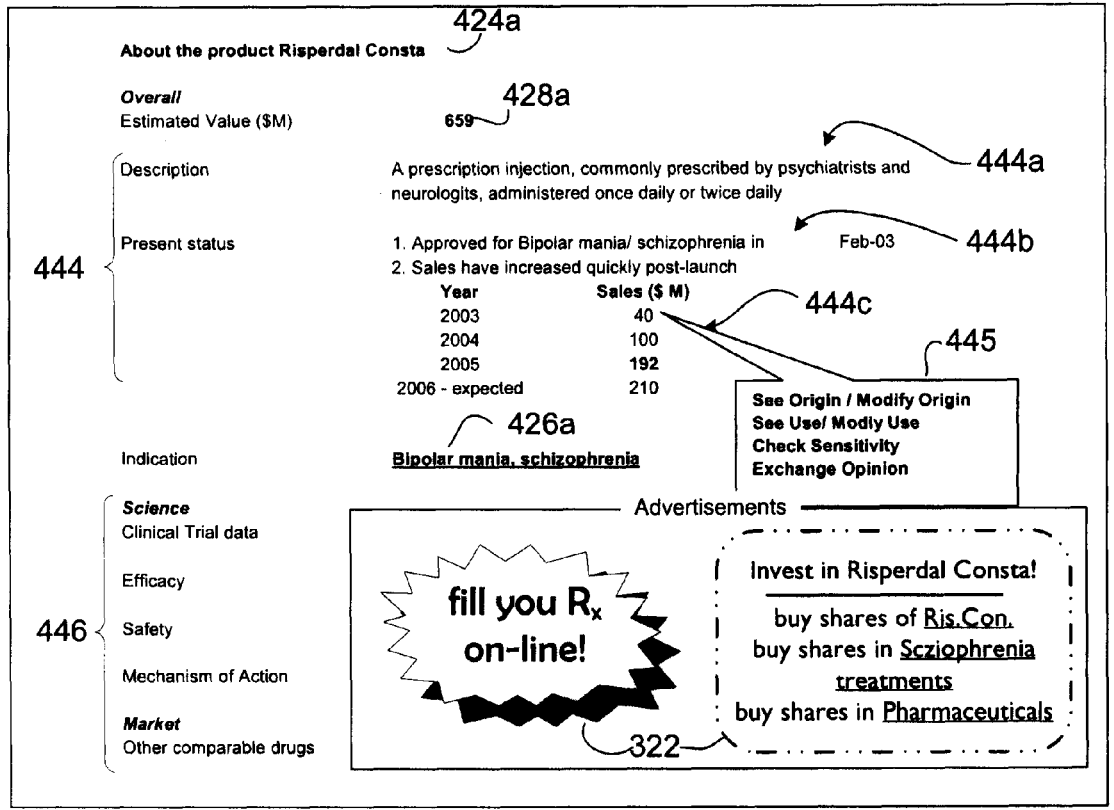
Figure 14:
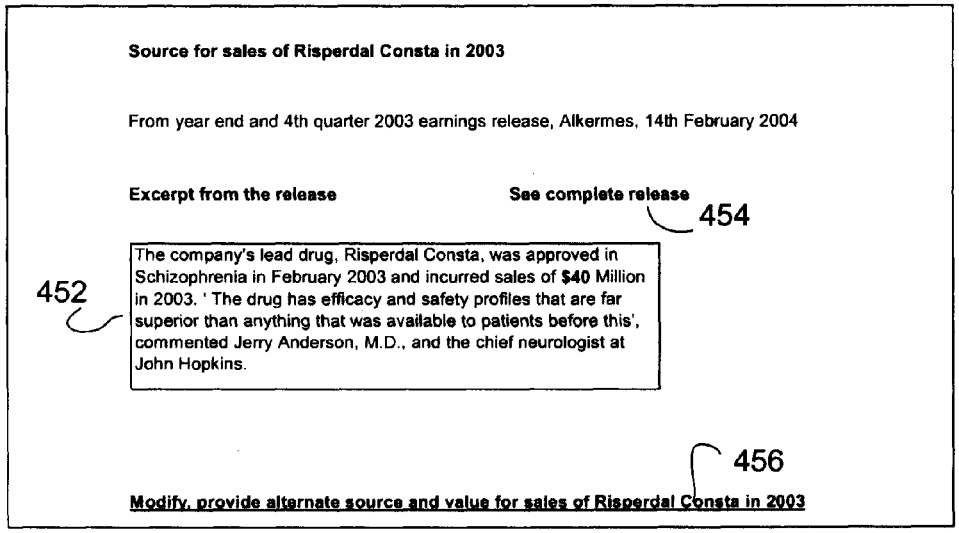

In FIG. 13, further details about Risperdal Consta (FIG. 11), are shown in another screen 442. This screen could be reached from the calculation modification screen 440, the value detail screen 420, or the search results screen 500, depending on the implementation and the user's actions. In this screen, the estimated value 428*a* is repeated, and a description 444 of the product 424*a* including its use 444*a*, approval status 444*b*, and sales FIGS. 444*c* are shown. The indication 426*a* is also repeated. Each of the sales FIGS. 444*c* in turn links to a more-detailed screen, such as screen 450 in FIG. 14, which includes an excerpt 452 of an earnings release, a link 454 to the complete release, and a second link 456 to edit the source. This may be controlled through a pop-up menu 445 like the menu 407*a* shown in FIG. 8. The indication 426*a* again links to a detail screen 500 in FIG. 12. Additional information 446 such as scientific and market information is again provided, and again could link to additional screens (not shown).

Figures 15, 16:
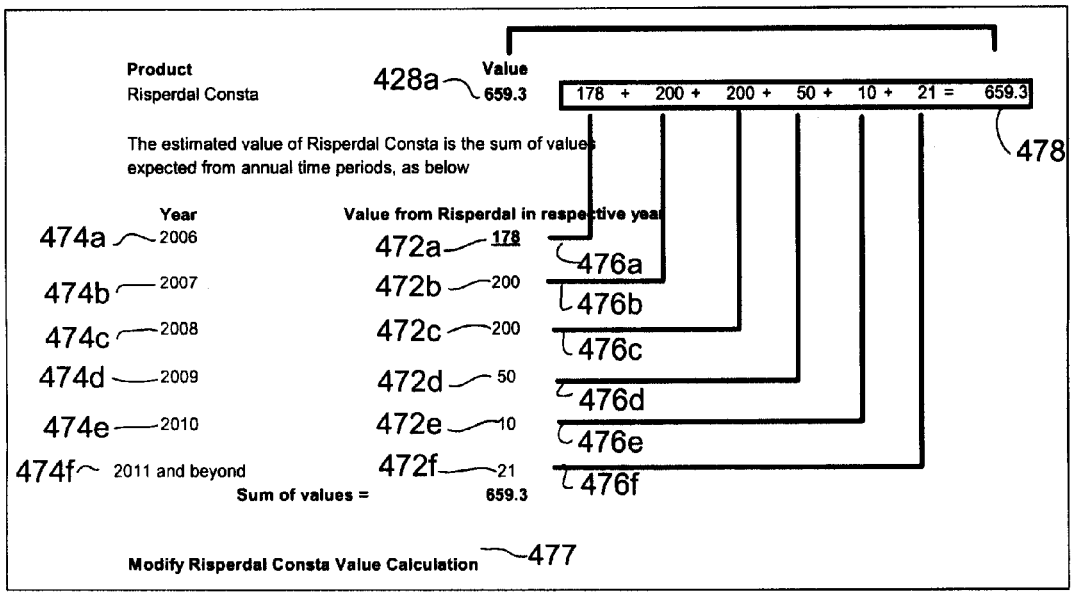
Figure 17:
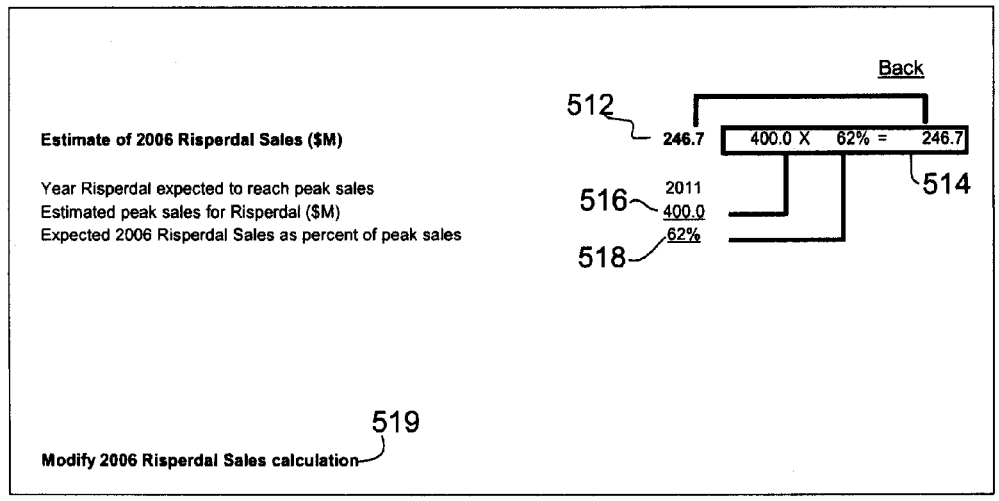

The estimated value 428*a* of the current component in each of screens 420, 440, 442, and 460 links to another computation detail screen 470 in FIG. 15 showing how that value was determined. In this case, the value is the sum of value estimates 472a-f from the current (474a) and several upcoming years 474b-f, again linked by lines 476a-f to a computation box 478, which shows how the total 428a is computed. As with the other computations, a user can follow links to modify the computation (screen 480, FIG. 16—link 477), see where the value for one year, e.g., value 472a for year 474a, was computed, and see how details within that year were calculated and interrelate (e.g., screen 510, FIG. 17).

In screen 480 (FIG. 16), the value 482 of Risperdal from each of several years is displayed and can be modified. A table 484 displays which variables (named Var1—Var3 in this example) are affected by changes in the overall value of Risperdal, and by how much. Screen 510 (FIG. 17) shows how the estimated sales of Risperdal in 2006 are calculated. This may, for example, be a component of the value 482 shown in screen 480. Screen 510 shows how the computed value 512 is derived using the calculation 514, detailing how the expected peak sales 516 and expected 2006 sales 518 are combined to produce the estimated 2006 sales. This calculation, like any other, can be modified by clicking on a link 519.

Screen 570 (FIG. 18) allows the user to view and modify the values 516 and 518 used in screen 510. Calculations 572 and 574 show how each of these values is calculated from underlying values 582, 584, 586, and 588. This screen 570 includes links 576, 578 to additional screens (not shown here), similar to screens 440 and 480, in FIGS. 10 and 16, respectively. On such screens a user can examine and ultimately modify the specific calculations.

Figure 19:
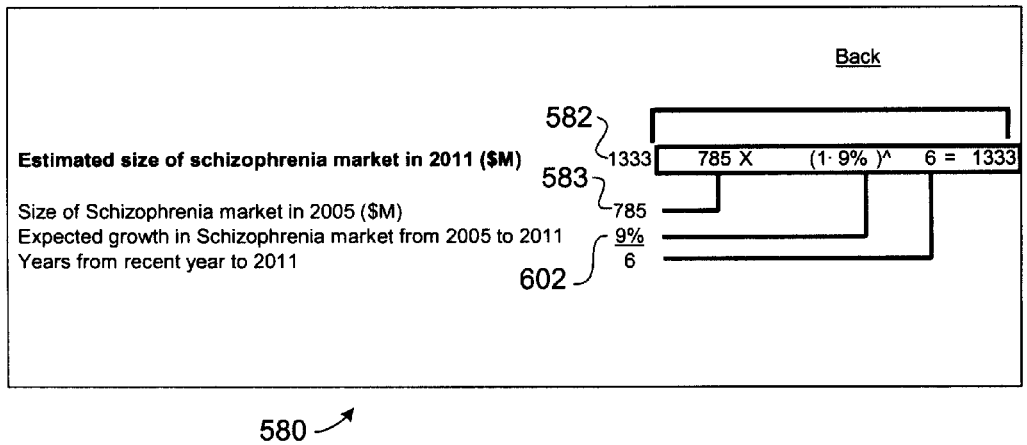

When a user positions the mouse cursor, or clicks on the computed value 582, a pop-up menu similar to 407a appears (not shown). By selecting a 'See Origin/Modify Origin' link within the pop-up menu, the user is taken to screen 580, in FIG. 19 showing how the size of the schizophrenia market 582 in 2011 is computed from the size 583 of the market in 2005 and the annual growth rate 602 expected from years 2005 to 2011. Similarly, choosing to view or edit the origin of the computed value 588 on screen 570 takes the user to screen 550, in FIG. 20, showing the computation for the estimated increase in 2006 Risperdal sales as a percentage of expected peak sales.

Figure 20:
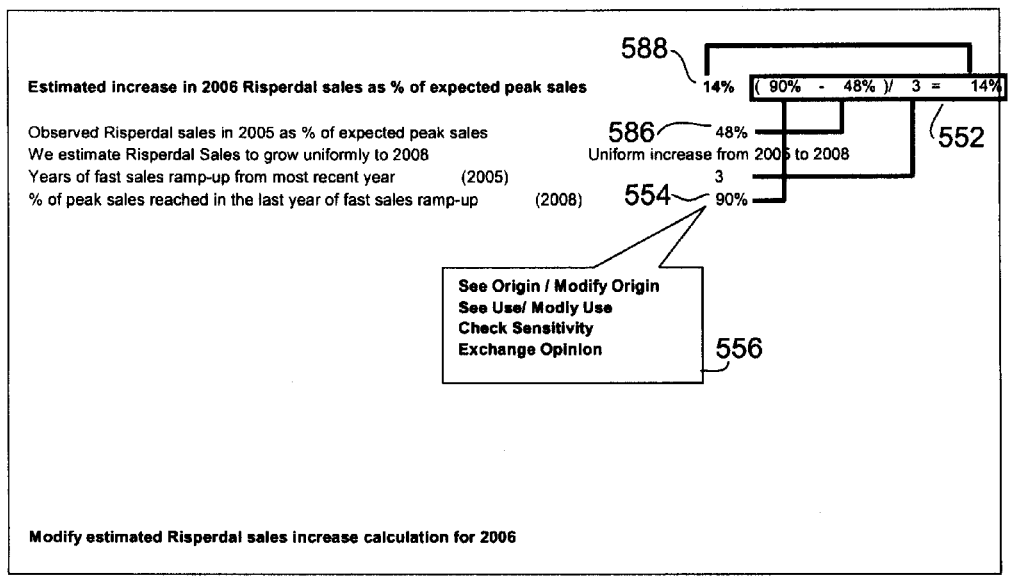
Figure 21:
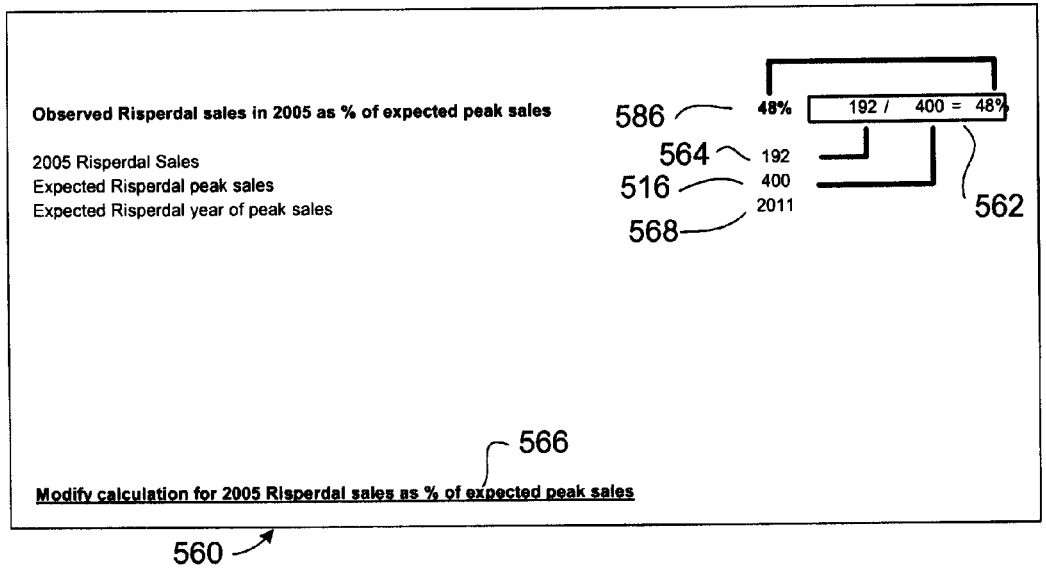
Figure 22:
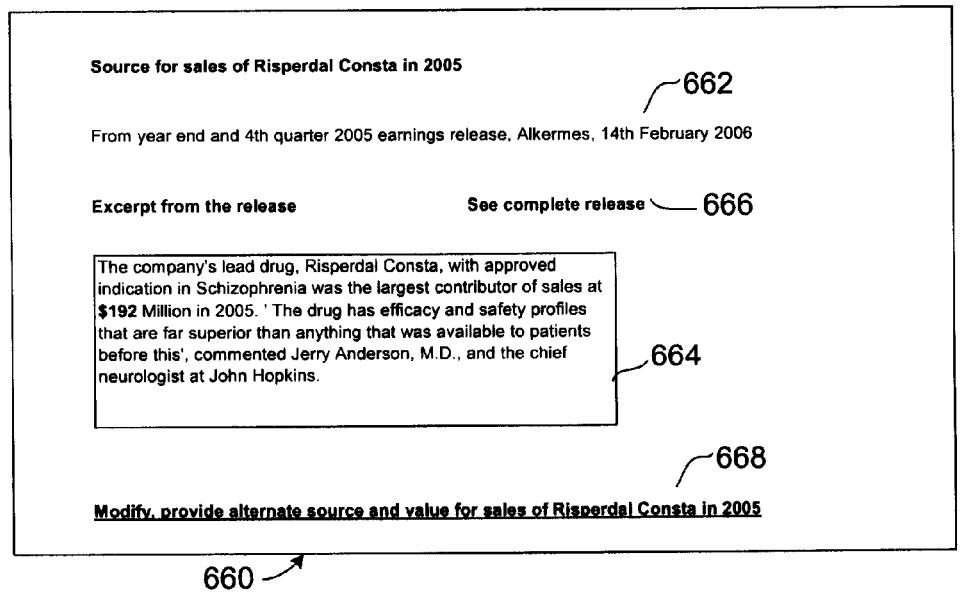
Figure 25:
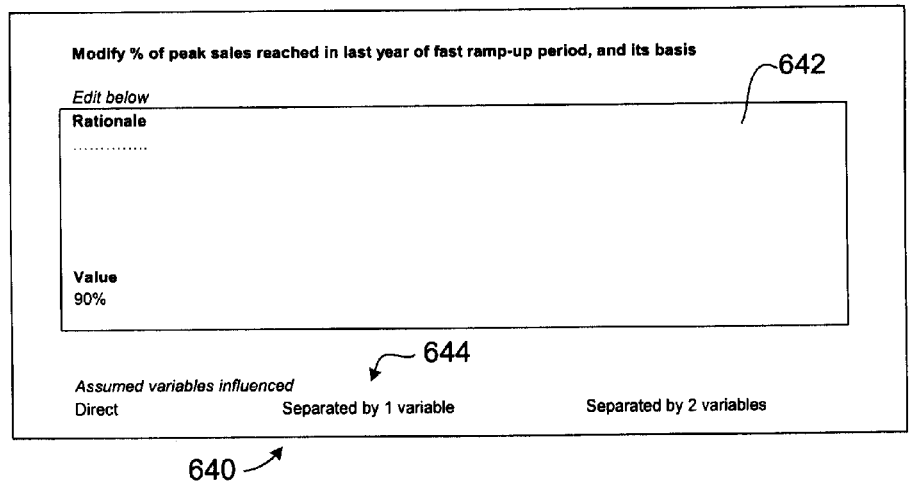
Figure 26:
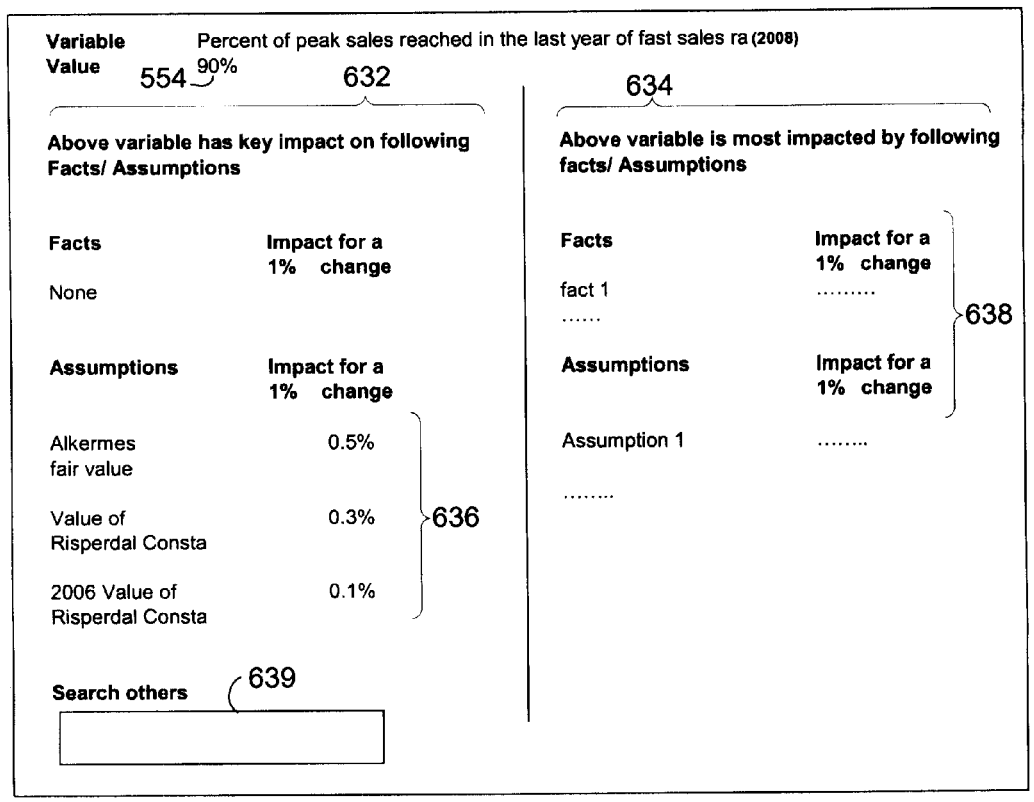

Screen 550 in FIG. 20, shows how the estimated increase 588 in 2006 sales is computed. Equation 552 combines the value 586 of 2005 Risperdal sales as a percentage of peak sales, repeated from screen 570 (FIG. 18), with the percentage 554 of peak sales expected to be reached in the last year of fast sales ramp up. The value 586 links in turn to screen 560, in FIG. 21, showing its computation 562 from 2005 sales 564 and expected peak sales 516. A link 566 allows the user to modify the computation 562. The 2005 Risperdal Sales 564 in screen 560 links to screen 660 in FIG. 22. Screen 660 shows the user the source 662 of the Risperdal Sales in year 2005 and includes an excerpt 664 from an earnings release, a link 666 to the complete release, and a link 668 to another screen 670, FIG. 23, that displays the source material 672 for the Risperdal Sales in 2005 and allows the user to edit it through a link 674. Note that screen 560 would also link back to screen 570, as the computation 562 uses as an input the output 516 from the computation 572 in screen 570.

Also in screen 550, the percentage 554 of peak sales reached in the last year of fast sales ramp-up has associated with it a pop-up menu 556 similar to the menu 407a discussed above. Selecting the 'See Origin/Modify Origin' option within the menu 556 takes the user to screen 620, in FIG. 24. Selecting the 'Check sensitivity' option within the menu takes the user to screen 630, in FIG. 26, and selecting the 'Exchange opinion' option takes the user to screen 650, in FIG. 27 where a user can see opinions 652 entered by others regarding one of the details in the preceding screens.

In screen 620, there is the indication 554 of the percent of expected peak sales reached in the last year of fast sales ramp-up and an indication 622 of the basis for this number including, in this example, a table 624 of how similar drugs performed. The link 626 links to screen 640, in FIG. 25, providing the user an option 642 to modify the basis 622 described in screen 620 and showing the effects 644 of such a modification.

In screen 630, key facts and assumptions 632 that are impacted by the value 554 and the key facts and assumptions 634 that impact the value 554 are shown, along with the amounts 636, 638 of the respective impacts. A search box 639 allows the user, from this screen, to search for other variables that may be impacted by the value 554, or those that may impact the value 554.

The opinions 652 in screen 650 may be sorted according to source, for example, the user's own opinion 654, opinions 656 reviewed, possibly edited, and sorted by an analyst employed by the entity hosting the information, and raw opinions 658 entered by other users. As with the data in other screens, these opinions 652 may include links to underlying facts or assumptions and to calculated facts or estimates that are affected by the opinions. In the example shown, opinions are listed for the estimated percentage of peak sales reached in the last year of fast sales ramp-up 554.

Figure 28:
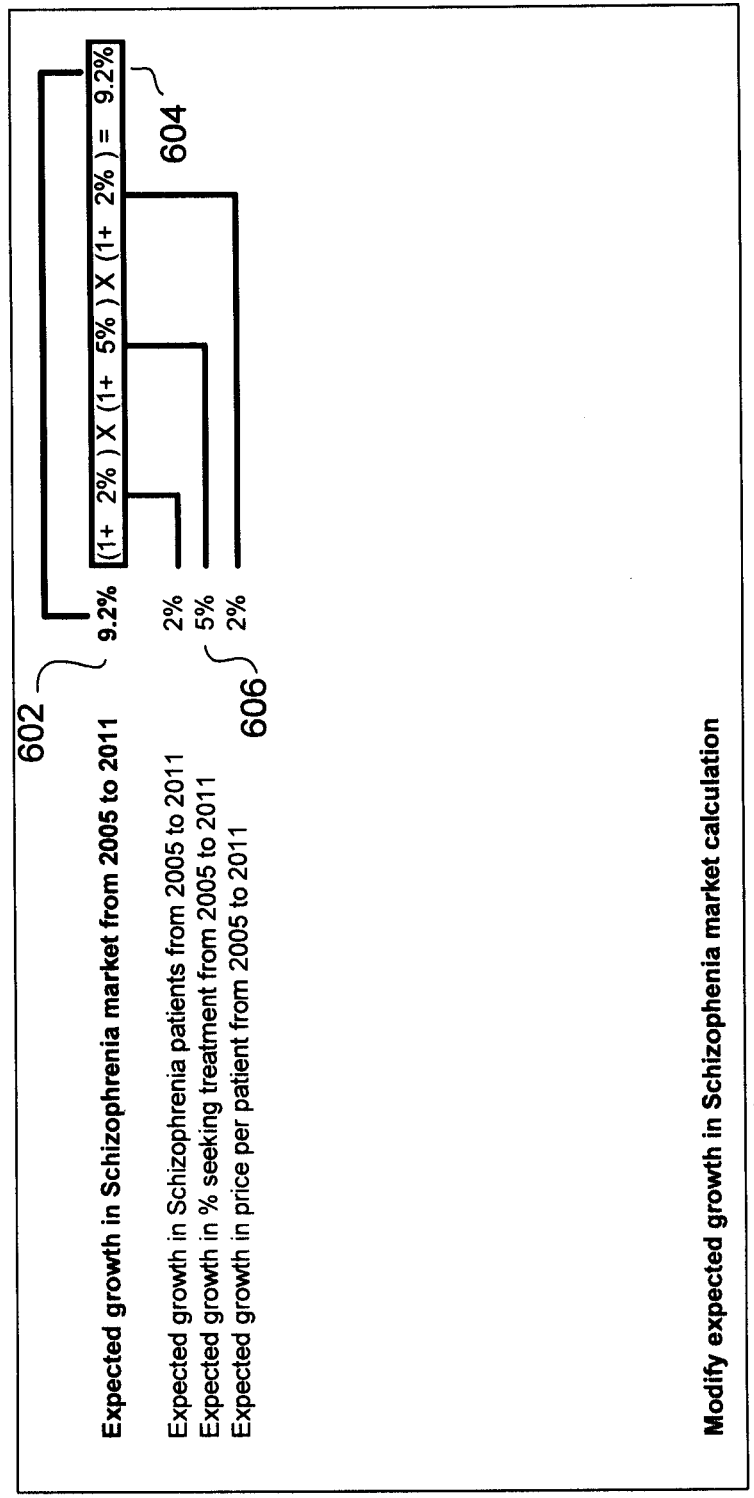

Screen 580 (FIG. 19) links to screen 600 in FIG. 28 for its expected growth input 602. Screen 600 shows the formula 604 from which the expected growth is computed and its inputs 606. Additional screens (not shown) could show the origin, use, sensitivity, and opinions about each of those inputs.

Figure 29:
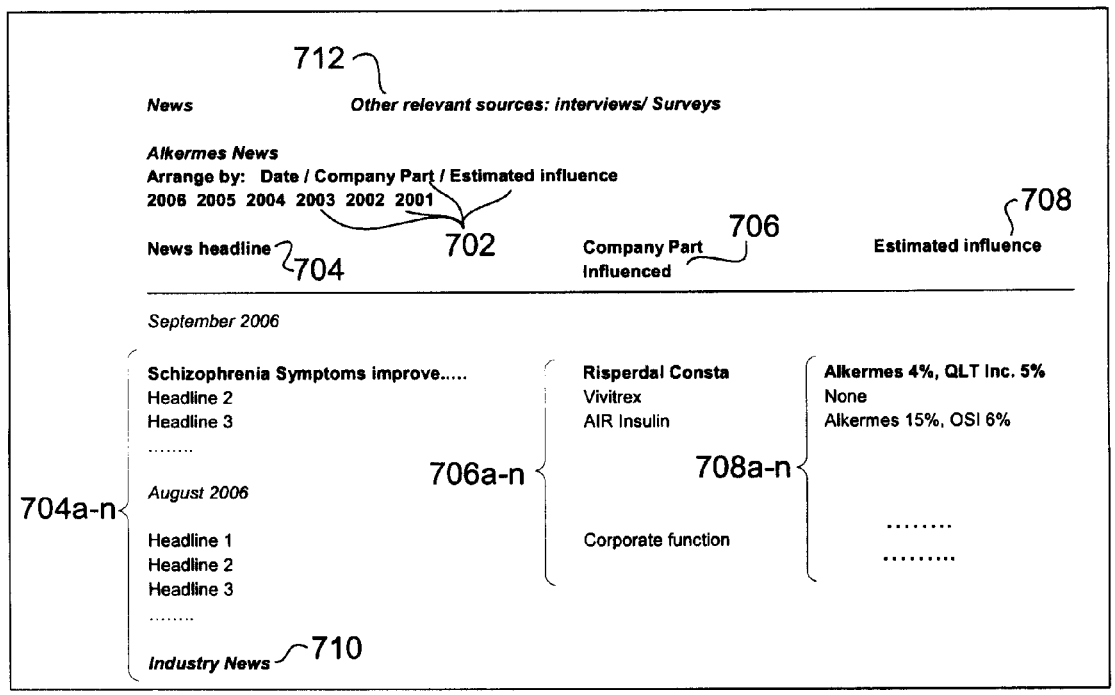

Another hierarchy of screens, related to and linked to the hierarchy just described, is shown in FIGS. 29-32. These screens display news and how that news relates to asset valuations. Screen 700, in FIG. 29, is a top-level screen showing news related to the selected asset. Standard user interface elements 702 allow the user to arrange the news by date, company part (corresponding to the hierarchies explored above), or the estimated influence on the company. For each headline 704a-n in a first column 704, the component 706a-n affected by the corresponding news is indicated in a second column 706, and the estimated influence 708a-n is listed in a third column 708. After news specific to the selected company is shown, additional news 710, in this case industry news, is shown (off the edge of the example screen 700).

Figure 18:
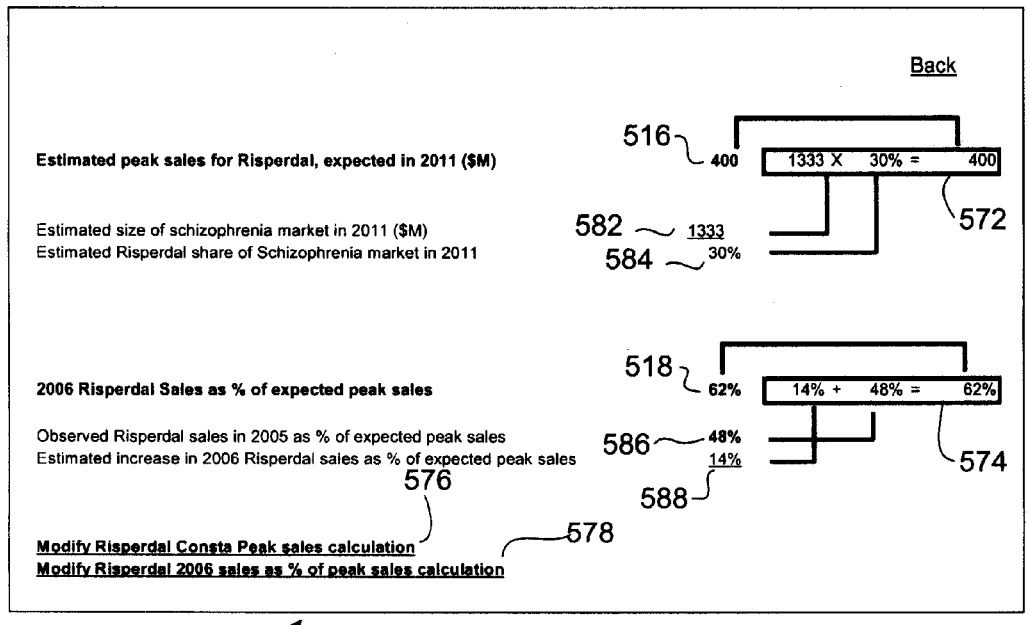
Figure 30:
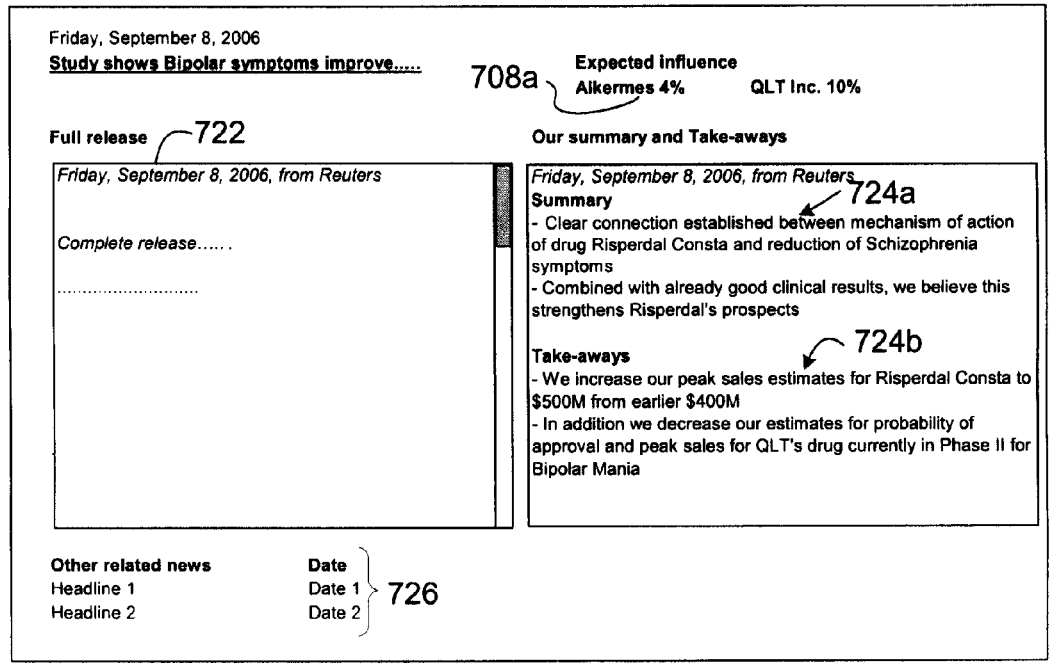
Figure 31:
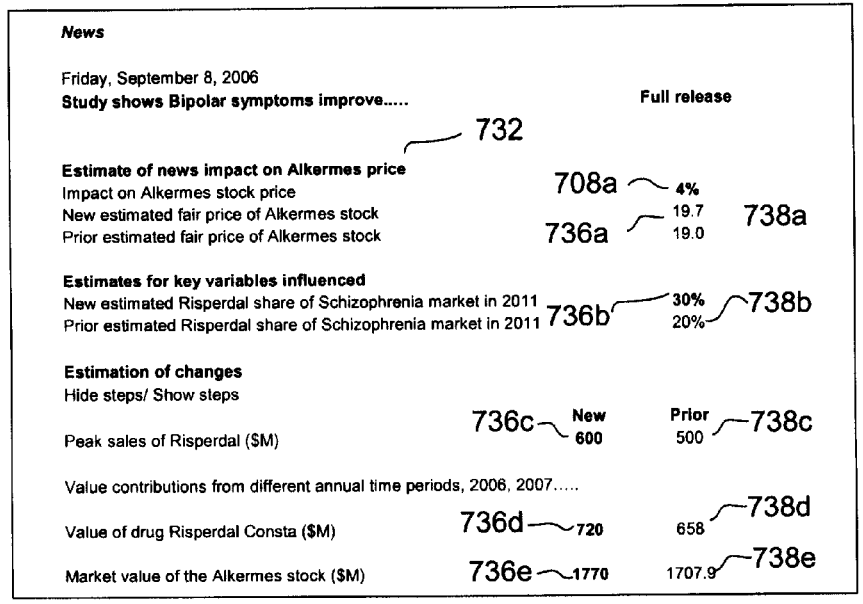

If a user selects a listed news headline 704a, he is taken to a detail screen 720 shown in FIG. 30. This screen shows the full news release 722 along-side a summary 724a and conclusions 724b written, for example, by an analyst employed by the operator of the information system. The expected influence 708a this news will have on the asset's value is repeated from the main news screen 700. Related news 726 is listed below the story. The expected influence 708a can be further broken down in a detail screen 730 shown in FIG. 31. This screen 730 lists assumptions 732 affected by the news, including the impact 708a the news has on the asset's value and a comparison of their new values 736a-e to their old ones 738a-e. Note that the new estimated share of the market 736b corresponds to the value 584 used in calculation 572 in FIG. 18. When a user positions the mouse cursor over or clicks on the computed value 736b, a pop-up menu similar to 407a appears (not shown). By selecting a 'See Use/Modify Use' link within the pop-up menu, the user is taken to screen 570, in FIG. 18 showing the calculation 572 that uses the computed value 736b, labeled as 584 in FIG. 18. Additional links within pop-up menus similar to 407a, revealed on rollover of mouse or clicking on the new values 736a-e and old values 738a-e, may allow users the options to view and alter other information relevant to the origin, use, sensitivity, and opinions relevant to the different values 736a-e and 738a-e.

Figure 32:
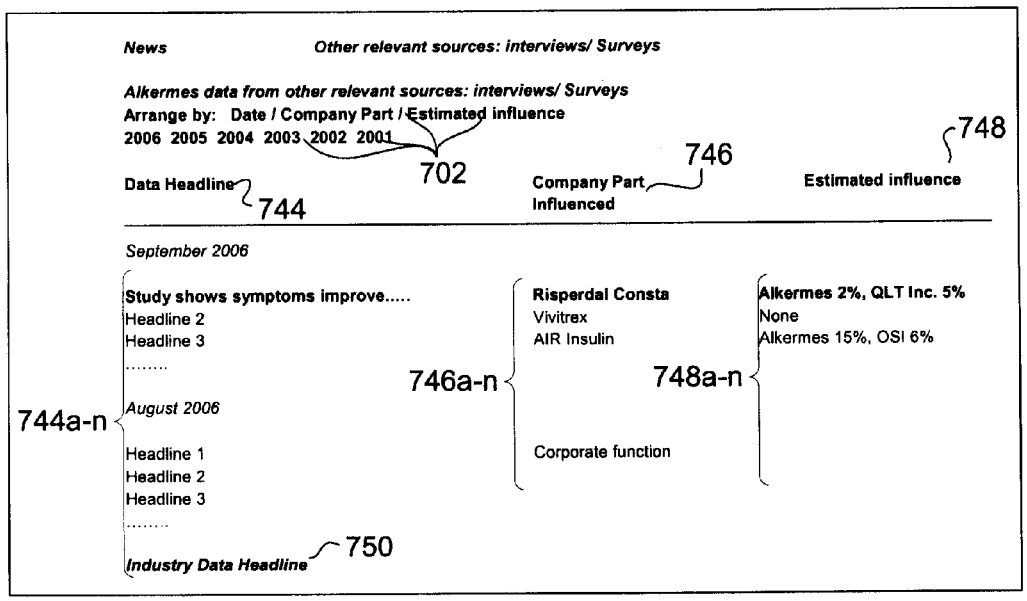

A link 712 at the top of the main news screen 700 takes the user to other sources of information, in particular, interviews and surveys displayed in screen 740, FIG. 32. This screen resembles the main news screen 700 and has the same interface elements 702 but the information it relates is gathered first-hand by analysts, rather than collected from news sources. Thus, instead of news headlines (704 in FIG. 29) it has data headlines 744. Similarly, the company part influenced 746, estimated influence 748, and industry data headlines 750 are comparable to the features 706, 708, and 710 in screen 700.

Contracts

As introduced above, a transparent valuation market facilitates the creation of a market for contracts on events expected to influence values of assets. A contracts market may be created by the operator 351 (FIG. 6) (e.g., host) of the transparent valuation market or it may be created and maintained by a third party 374 and operated in cooperation with the operator 351 of the transparent valuation market (we sometimes refer to the platform as a transparent valuation market).

In current markets, which trade stocks or bonds based on a company's entire value and contracts based on either the performance of such stocks and bonds or on external economic factors, both personal and professional investors with a view on a few parts of an asset or certain events relevant to an asset, are forced to trade on the entire asset. They are exposed to risks due to other factors that affect the asset value, and they may not be comfortable assuming these risks. For example, a lawyer may have an opinion on a popular ongoing lawsuit against a public company. However, on checking the value of the stock, she is reminded of other factors that she does not understand and that may influence the stock price more significantly than may the outcome of the lawsuit. She must either trade on the whole stock or stay out of the market.

Contracts for events of broad interest relating to specific asset parts can allow such a user to trade based on her views on the asset part or event, e.g., the outcome of the lawsuit. The payoffs for such contracts explicitly depends on the event, making it concrete and verifiable. A market created in a subset of contracts expected to draw the widest appeal can provide liquidity to investors interested in trading on them. In some examples, when the fifteen hundred or so most actively-traded public stocks in US are considered, at any given point of time there may be about fifty to a hundred issues that are of broadest interest to users. An opportunity to express views specifically on these issues of broadest interest may be attractive to a wide range of users and may result in popularity of such contracts among a large base of users with different financial sophistication. Contracts can be presented through the transparent valuation market, along with the transparent, interactive content relevant to the asset, as described above. A range of users will be drawn to see the key facts, assumptions, and their basis provided by the interface at the level of products, markets and events they understand and may find the contracts to be an attractive avenue for monetizing their views. This content can be explicitly connected to estimates for contracts and asset values tied to the relevant products, markets, and events.

Beyond investors, other users, including company managers, consultants, bankers, professional experts like lawyers and doctors, students, and consumers can find this platform useful. Such people are enabled to connect to products, services and events they understand best, and trade on them. In some examples, investors holding positions in an asset but uncomfortable assuming risks due to certain factors that influence it, can use the contract market to hedge that risk through contracts on fractional assets. Users who do not wish to trade can still participate, for example, using the opinion forums to express their opinions and read about other's views on the key product and on the market assumptions that drive the contract and asset value. Such users may be interested as current or potential customers of goods ultimately produced by the company at issue. In some examples, a user might come to the forums to discuss a problem he is having with a product with others familiar with the product. In the course of his research, the user may discover that it is possible to invest in the product (or, perhaps, sell such an investment short if he thinks his problem is a design defect) without betting on the entire company that manufactures it.

Business Model

Figure 33:
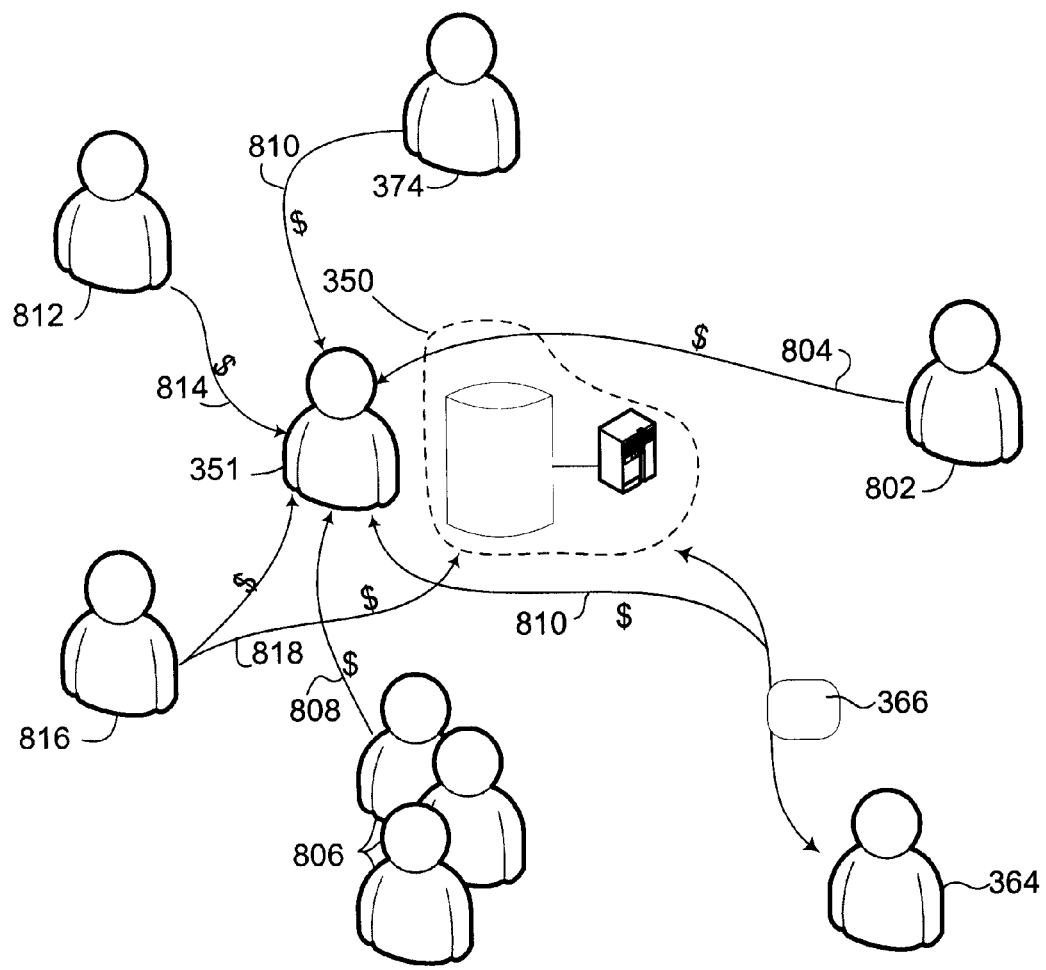

In some examples, the operator 351 of the transparent valuation market partners with more-traditional brokerages in the role of the market maker 374 to provide the contracts market. A possible arrangement of cash flows is shown in FIG. 33. The user interfaces may be integrated, so that the users don't need to be concerned with which entity they are interacting with, but the finances are separate. The operator 351 may also serve as its own market maker.

There are several possible sources of revenue for the operator 351 of the transparent valuation market 350.

Overall the US online advertising market is expected to be more than $16 Billion in 2006, and expected to reach more than $22 Billion by 2009. At a greater than 30% growth recorded in 2005, and similar growth expected in 2006, the 2009 estimate is believed to be very conservative and likely to be beaten. Increasing interest in online advertising from advertisers across industries, improved visibility and impact of online ads, and the emergence of standards have helped growth. There is also a clear understanding among advertisers that users pay more attention to online advertising than offline, a necessary part of ad efficacy.

Advertisers 802, such as marketing executives at the companies being analyzed, or their advertising agencies and representatives, will be attracted to the user traffic and activity on the transparent valuation market 350. Such advertisers will pay the operator 351 to place advertisements on the pages displayed to users 364 (revenue shown by arrow 804). With strong traffic and activity, executives 802 will want to be closely involved in placement of their ads on pages relevant to their stock and other markets they play in. For example, marketing executives 802 for a given car company will want to be closely involved with the strategy for placing ads on the different screens of the user interface relevant to their company, other car companies' stock, automobile products, and related market sections. They will want to communicate their planned product rollouts, product features, competitive comparisons, attractive sales deals, and their broader business vision to potential consumers and investors (users 364). They will see the transparent valuation market 350 as a strategic marketing resource and will use it as a channel to communicate with and target consumers and investors 364. In addition, retailers, distributors, and vendors 806 will want to advertise their products and services on the relevant product-related screens and within screens relating to relevant stocks, and thus will pay (808) for such advertising. The business strategy may involve initial or specific targeting for development of content for assets such as stocks of public companies within industries such as internet, biotechnology and others, expected to be of most popular interest.

In some examples, advertising revenues 804, 808 may be a function of user traffic on a website, average time spent per user, and CPM (cost per thousand impressions) rates. They may also be a function of popularity as judged by user traffic and time spent. The transparent valuation market 350 can attract traffic both as an alternative to other financial aggregators and directly from online brokerage websites. Strong content can encourage users 364 to spend on an average a larger amount of time on the website of the transparent valuation market 350 than on more-static sites. There is significant upside to the average time users spend on finance websites. Strong content, offered free of charge, can have a broad appeal. A combination of popular material of casual interest and unique content will engage users for a much longer time period. Unprecedented interactive features, ease of access, and transparency will support significant upside to the average time spent per user.

Due to the structured nature of information, a search performed on a term like 'schizophrenia' can return results that are structures at the first level in two categories: markets and science. At the next level, within each of the markets and science categories, there can be additional levels of information. For example, within the markets category, the next level of information may include the top drugs in the schizophrenia drug market, the companies that make those drugs, their current market prices, and estimates of their value and ratings. Users may view additional relevant content at other finer levels under each of these specific fields. Such structured responses to search queries that also provide information within a choice of relevant contexts can be more attractive to users than other search platforms. Similarly, advertisers may also find it more attractive to target these users within the relevant pages dealing with content for different products, markets, services, or other specific issues placed within relevant contexts of interest to them.

The average CPM pricing for display ads can vary over a wide range and depends on a number of factors. The popularity of the website, the number of users, and the amount of time they spend determines demand for the space on the page and thereby influences the price. Websites targeting niche customers can fetch higher rates. The size and format of the display can also affect price. For example, button, banner, or skyscraper ads all have different rates, where buttons are the smallest and cheapest while skyscrapers are large and more expensive per ad, but may be less on a price per unit space basis. The location on a page and of the page within a website also influence prices, e.g., homepage ads fetch more than the subsequent pages The operator 351 of the transparent valuation market 350 may earn commission revenues 810 from investors 364 trading on their views through contracts 366 written on relevant fractional assets. The commissions 810 may be paid by the market makers 374 of those contracts 366 or directly by the users 364. The identification and underwriting of the contracts may be carried out by the market makers 374 or by the analysts or other in-house experts selected by the operator 351. The financial experts within the transparent valuation market assigned with development of the asset value estimates can be at an advantage to identify and define such contracts within assets of their responsibility. Data derived from user activity within the transparent valuation market, such as user responses to example contracts and user surveys, can be used to guide the identification and definition of contract structure and content. Such data may also be useful to understand and refine the relevance and appeal of contracts offered. The experts may work in collaboration with other experts, such as in-house or external lawyers and regulators. In some examples, identification and definition of contracts may be enabled by suggestions received from users concerning contracts of potential interest to them. Such suggestions may be received directly on the transparent valuation market platform through specific questions, surveys, or discussions on the platform. The operator may make markets itself in a subset of contracts offered, for example, to provide liquidity to the users, and may be backed by investors 812 who provide financing 814. Investors 812 may provide financing in exchange for market-making spreads earned on contracts or other forms of compensation. In some examples, the operator 351 will seek strong popularity and broadest interest in selecting contracts in which they make markets. This may be a small portion of the total market for contracts, for example, only about 5% of the overall number of assets covered, and a subset of the overall contracts offered.

Contracts can be popularized on the transparent valuation market as a naturally integrated part of the offering of transparent, hierarchically structured analysis. Through the integrated offering, the market can help individuals keep updated with news, and information, develop opinions, compare these with their own views, and express the difference in view by sharing opinions on forums or by trading in contracts. For example, if an investor disagrees with the analysis of other people investing in a contract, he may wish to buy it himself on the basis that the others are selling it for a lower price than it is worth, or vice-versa.

The transparent valuation market can also allow users to open accounts and deposit cash into those accounts so that they can directly place bids on contracts and other investment vehicles offered for investing through the market. The operator of the transparent valuation market can partner with financial institutions to be custodians of that cash and may be paid interest on the cash deposits. The operator may also be able to invest a part of that cash directly and earn revenue from such investments. Interest earned on cash in such accounts can be an important source of revenue for the operator of the transparent valuation market. A part of the interest earned can also be paid to the users directly.

There are more than 30 million US individuals with online trading accounts in the retail online trading space (based on 2005 data), trading with existing brokerage and investment firms. A partnership with online brokerage firms may attract their investors to the transparent valuation market's website. The operator of transparent valuation market can partner with one or more online brokerage firms and work closely with them to enhance the experience of users of the online brokerage firms. This can be achieved by allowing the online brokerage firms to integrate some of the content, analysis, and estimates from the transparent valuation market directly on their platform and by providing links on their platform to content within the transparent valuation markets. Additionally, the operator of the transparent valuation market may work with the online brokerage firms to issue email alerts to their users about values or price estimates for assets of interest to different users. This may help enhance familiarity and popularity and draw additional users to the transparent valuation market. Within such partnerships, users of the transparent valuation market may be able to trade on common stocks, bonds, and options through the order entry and routing platform of the partners. In addition, the partners' users may be able to trade on contracts offered by the transparent valuation market directly through their platform using the systems within the transparent valuation markets. Investors who already trade on the assets with online brokerage firms, may have strong views on the most popular asset parts and events. Contracts allowing investors to assume positions in events without assuming risk due to other factors will be attractive to these investors. Additionally, investors who want to hold positions in these assets but are uncomfortable with risks in these events will also be able to hedge against these risks through the contracts.

There are about 35 million visitors in US (includes those who do not trade online), to business and financial information websites. In addition to investors, content on the transparent valuation market will appeal to other users within this category. This includes, for example, company managers, consultants, bankers, professional experts in business, law, and medicine, consumers, and students. Partnerships with aggregator websites, including conventional media companies, can additionally be useful to drive traffic from the above category to the transparent valuation market.

Within such partnerships with other websites, the operator of the transparent valuation market may work closely with these aggregator website operators to enhance their users' experience. The user experience could be enhanced through integration of content, analyses, or estimates on their websites. In addition, the content within the transparent valuation market on estimates of impact for assets influenced by a news piece may also be integrated along side the news headline on their websites. Their real-time and historical market information on assets may also be integrated with links to relevant content for the asset and other information on the transparent valuation market. Links from financial and business information websites to the transparent valuation market can draw user traffic to the transparent valuation market. Content from transparent valuation market integrated directly on partners' websites can link back to the transparent valuation market for the convenience of users that may want to further explore the estimates or other related content.

Users may have views on products and markets they are familiar with, but not necessarily on the entire traditional investment asset underlying such products, and are commonly drawn to business and financial information, for example stock price, out of curiosity. The contracts market will attract users familiar with and directly interested in contracts. Additionally, presented as an extension to the popular news, opinion, Amazing facts, and similar sections, contracts will appeal as a natural actionable part of these sections. The easily browsed, transparent content of asset value estimates will help users refine their views on asset parts and events of interest to them. It will help them build up a comfort level they need to make the commitment to trade on contracts. As a result, visitors to business and financial information websites, who may not have views on an entire asset, and may not currently invest, will find the contracts appealing. They will find, in contracts, a unique avenue to express views on products, markets, and events they believe strongly in without being exposed to risk due to other parts of asset which they do not understand. They may also use these contracts to hedge against the specific risks due to issues on which the contracts are based.

Large or institutional investors 816 may also be a source of revenue 818 to the transparent valuation market 350 or directly to its operator 351. There are more than 8000 hedge funds and a growing number of asset management funds. Large and institutional investors may become interested as contract volumes grow and there is significant liquidity in the contract market. For example, they may be interested in contracts that help them express views in parts of an asset that they believe most strongly and in hedging their positions against undesired sources of risk. The operator of the transparent valuation market may offer exclusive services including individual analyst interaction and advice to institutional investors. They may leverage their research, analysis and transparency to build relationships with large, institutional investors.

In some examples of the system described here, the body or bodies of information are exposed to users through a publicly accessible communication medium in a manner that is non-discriminatory. By non-discriminatory, we do not necessarily focus on classic standards for non-discrimination on the basis of race, sex, religion, and the like, although, non-discrimination could include those factors. Examples of non-discriminatory access would include, at one extreme, access to anyone who can communicate through the communication medium, the access being permitted by anyone at any time for any purpose, anonymously, and without any requirement whatsoever. In less extreme examples, non-discriminatory access could permit anyone willing to register by name and with some basic demographic information to have access, or could require a modest registration fee, say $10 a month, or some other requirement. More generally, access may be viewed as non-discriminatory if potential users are not differentiated, e.g., by the host or moderator, in a way that favors access by some users as compared to others for reasons that relate to a self-interested goal of the host or moderator, for example, because of a direct and significant advantageous commercial relationship that may be anticipated by the host with some users but not with others.

In some examples of the system described here, the body of information is exposed to users on a medium and users are enabled to engage in collective discussion concerning the information elements, the collective discussion occurring on the medium in which the body is exposed. This makes it simple, easy, quick, and effective for people to engage in such discussions and for a moderator to participate in and observe the discussions and adjust the body of information based on the discussion. Examples of enabling the collective discussion to occur on the medium on which the body of information is exposed could include, for example, permitting comments to be posted directly through interactive elements of a webpage on which elements of the body of information are displayed, to have the postings viewable or accessible directly by others through interactive facilities of the webpage, or to invoke an email, chat room, or instant messaging facility directly from such a web page. More generally, any facility of a communication medium that enables users to conduct the collective discussion without having to switch to another communication medium or switch to interaction through a different application that does not have as its purpose the facilitation of the collective discussion and then to switch back to the first medium, would be included. The communication medium described in our examples could include a webpage or website, portable documents, or active online spreadsheets or documents that include direct communication and interaction capabilities, for example.

In some examples of the system described here, a moderator is enabled to participate in collective discussion by user concerning the information elements, and the moderator is enabled to do so on the medium in which the body of information is exposed. Examples of how this would be done are included above with respect to collective discussions by users. By being able to participate in such discussions on the same medium, the moderator can immediately and directly help to guide the discussion, offer suggestions, take actions, and accommodate user input in a way that enhances the transparency, intensity, and significance of the discussions.

In some examples of the system described here, all of the elements of the body of information are exposed to the users either directly or upon request. By providing access to all of the elements, users can derive a comprehensive understanding of what elements are in the body, how they relate, how they were used to generate the resulting elements, and other information about them. Although the word all suggests that every element of the body of information would be exposed to users, in some examples, all can also mean substantially all of the elements, or all of the elements that are meaningful to or useful to a particular user or a class of users. All elements might exclude elements that are experimental, or tentative, or outdated. In general, all is meant to include every element that is important or useful or expected by a user to enable the user to understand the body of information to a degree and level that gives him a high level of confidence that he fully understands any aspect of the body of information that is important to him. In particular that nothing is being withheld for some purpose other than open and transparent exposing of the body of information. For example, deliberate withholding of one or more elements until a user has entered into a direct and significant advantageous commercial relationship that may be anticipated by the host.

A wide variety of other user interface features can be implemented using the underlying concepts described above. Examples include the interface features shown in FIGS. 34 through 84.

Figure 34:
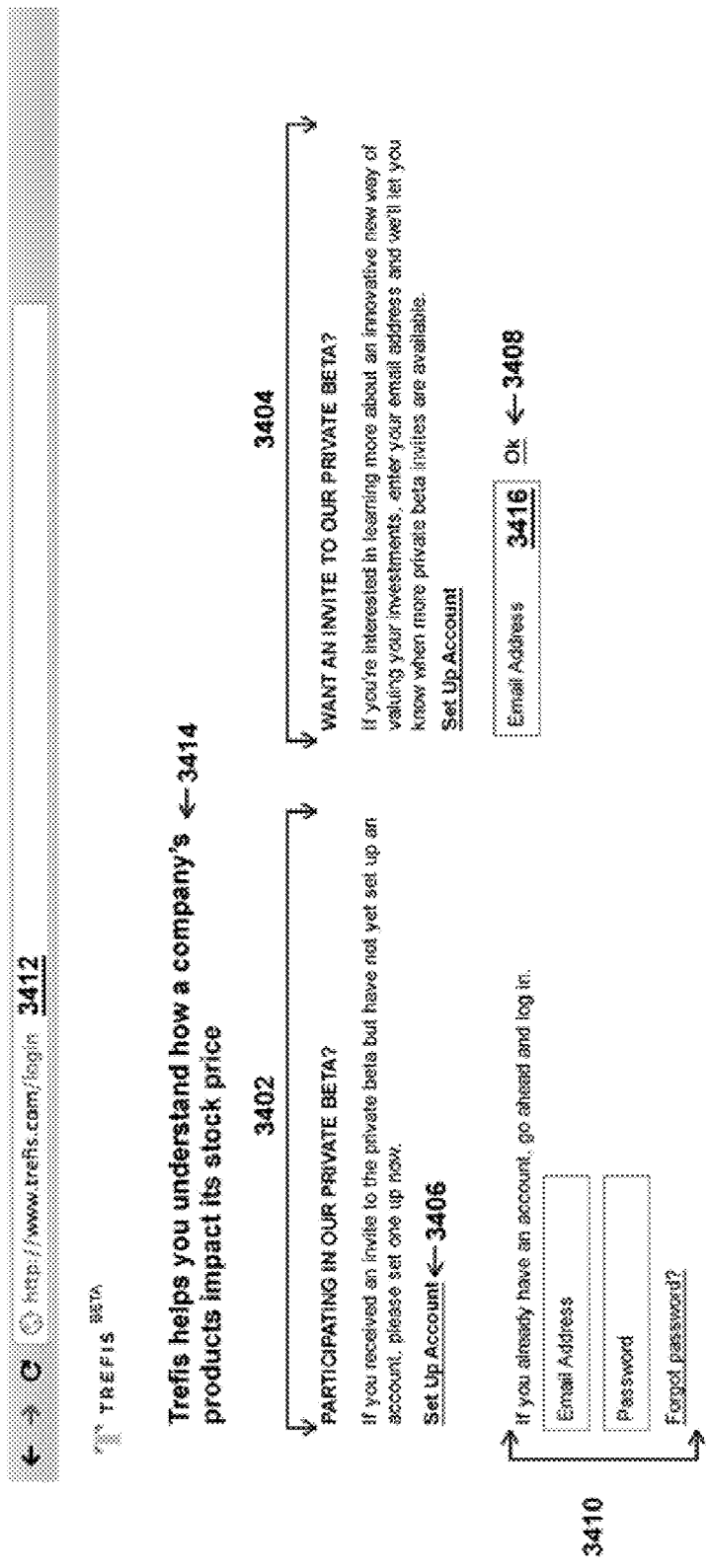

FIG. 34 shows an example home page 3400 of a website that can be used to understand the impact of a company's products on its stock price. The page 3400 includes an invitation 3402 for participation in beta testing and an opportunity 3404 for being invited for participation at a later date. The user can participate immediately either by logging in using an account information area 3410 or by selecting a set up account control 3406. Alternately, the user can provide an email address 3416 and select a control 3408 to submit the email address 3416 for later notification. The URL 3412 of the home page 3400 can identify the application's host (e.g., Trefis). The user can obtain a basic understanding of the application by reading a statement 3414.

Figure 35:
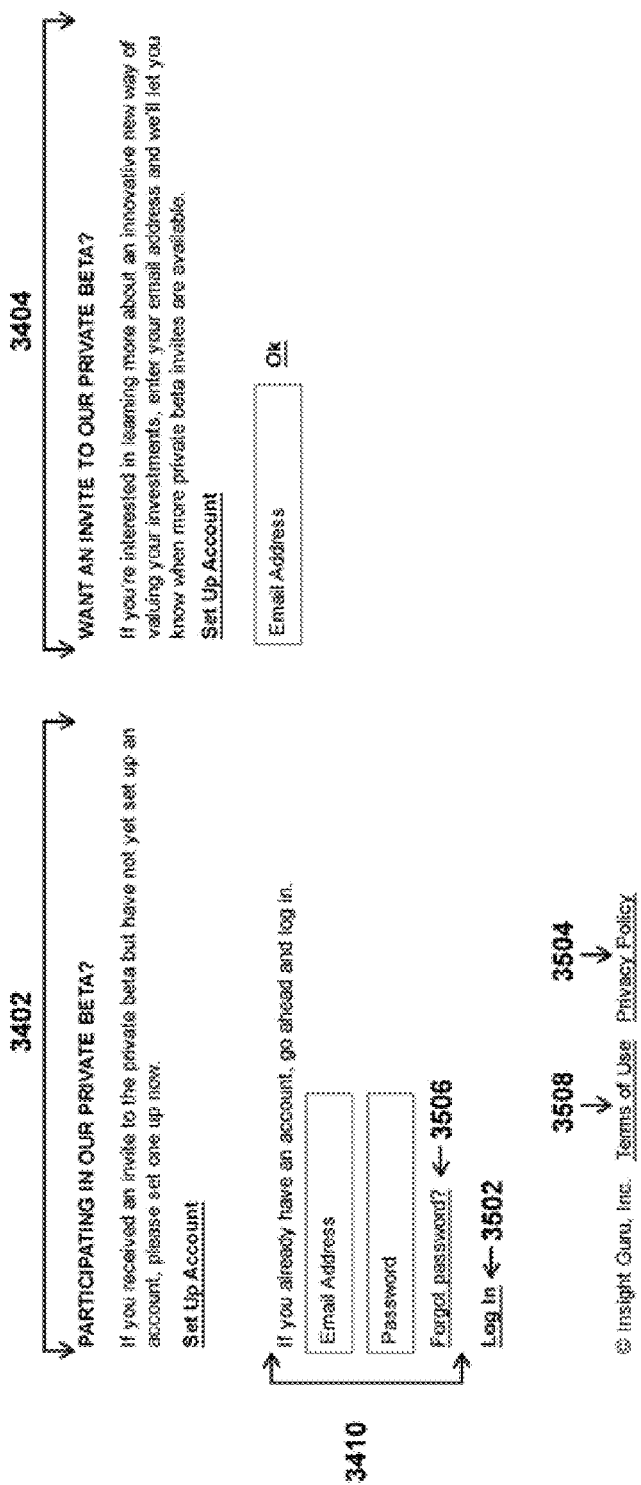

FIG. 35 shows a scrolled down version of the home page 3400 with the statement 3414 scrolled off the screen. This version of the home page 3400 includes a login control 3502 below the account information area 3410 which the user can select to submit the information (e.g., email address, password, etc.). For example, the user can enter his email address and password in the fields provided in the account information area 3410, and then select the log in control 3502. If the user has forgotten his password, the user can select a forgotten password link 3506, which can allow the user to receive his existing password or a reset password by email. The page 3400 can include a terms of use link 3508 and a privacy policy link 3504 by which the user can obtain usage and privacy information, etc.

FIG. 36 shows a beta participation screen 3600 that can appear, for example, if the user has selected the set up account control 3406 described with respect to FIG. 34 above. For instance, participation information can be provided in a popup 3602, containing a greeting 3604 and a prompt 3606 for more information. The user can provide his first and last names in two or more name fields 3608, an email address in an email address field 3610, a password in a password field 3612, and re-entry of his password in a password verification field 3614. Checkboxes, such as checkboxes 3616 and 3618, can allow the user to opt in (or out) for electronic or other updates (e.g., by email, etc.), accept the conditions of the website, etc. The beta participation screen 3600 can also include a series of questions, such as public stock research frequency information 3620, stock trade frequency information 3622, technology stock research frequency information 3624, etc.

Figure 37:
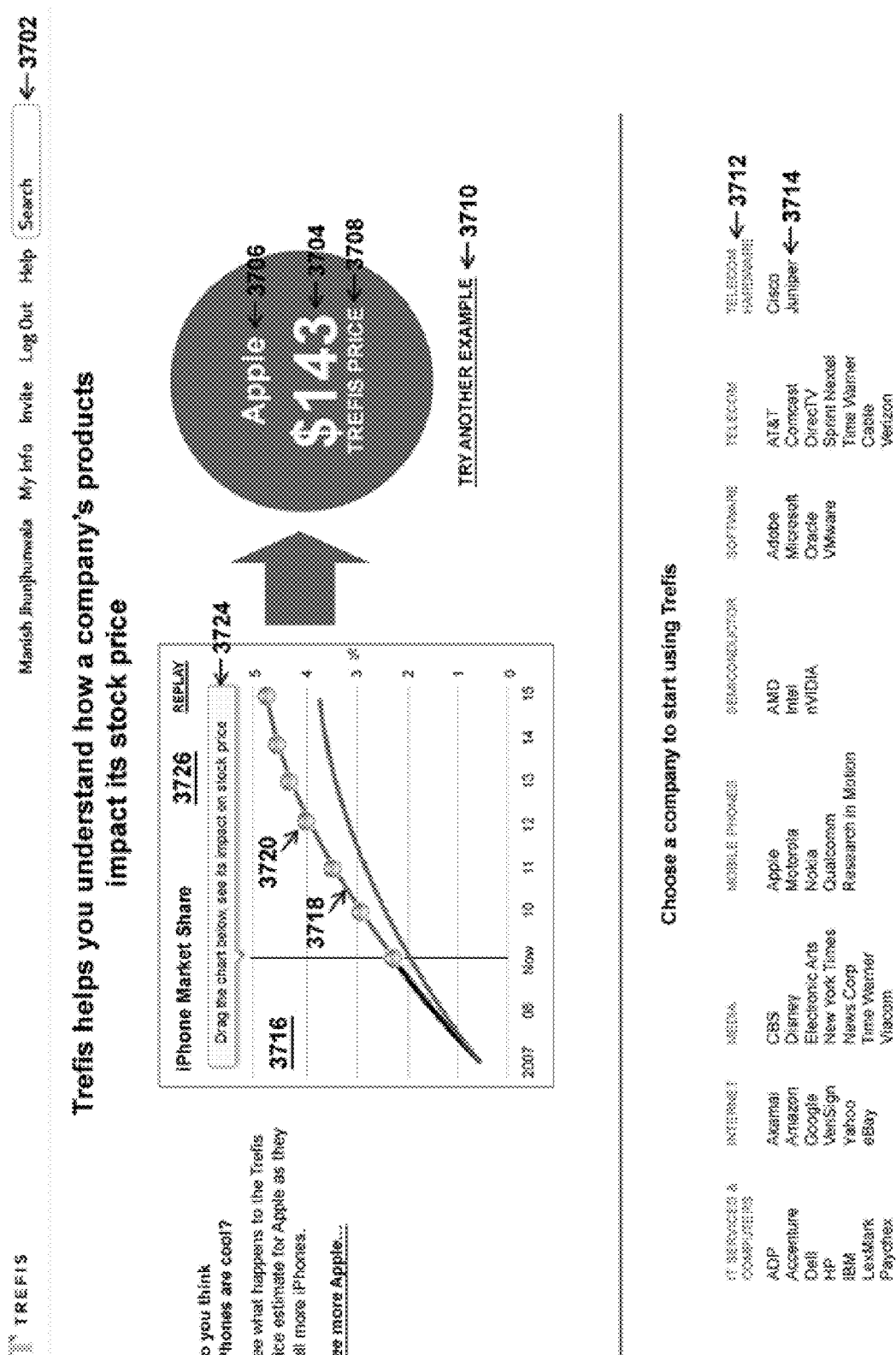

FIG. 37 shows a screen 3700 of a website for understanding how a company's products (e.g., Apple's iPhone) affect its stock price. A company name or ticker field 3702 can be used by the user to select the name or ticker of a company for which to view stock prices and other information. After the name of the company is selected, a stock price display 3704 displays the company's current stock price, for example, $143/share for an Apple stock 3706, according to a particular way of pricing the stock. In some implementations, the screen 3700 is just the home page where an example company, in this case Apple, is displayed by default. For example, this example can be pre-selected by the program. Using the company name or ticker field 3702, the user can actually navigate away from this home page, to the page for a specific company selected by the user. Below the stock price display 3704 is a label 3708 that identifies the pricing mechanism for the stock, in this case a "Trefis price". A try another example control 3710 can allow the user to try another example of viewing the impact of the company's products on its stock price. The user can view a column 3712 (e.g., Telecom Hardware) to see related companies 3714 associated with the column 3712. A graph area 3716 can display one or more parameters that underlie some portion of the stock price. In the example shown, the graph area 3716 shows the market share of mobile phones represented by the iPhone. A wide variety of other parameters can be graphed, such as the price of the iPhone, how long it has been on the market, the geographic penetration of sales, etc. The graph area 3716 can show a stock price line graph 3718 and individual stock price points 3720, for example. The display can also include a prompt area 3722 which alerts the user that he can try various hypothetical scenarios concerning the market share of the iPhone by clicking on the link 3723 for Apple. When the user tries other scenarios, the graph in area 3716 changes and the impact of the changes on the stock price. For example the user can follow instructions 3724 to drag part of the line graph (e.g., up and down) to see the effects that a change in assumed market share would have on the stock price 3704.

Figure 38:
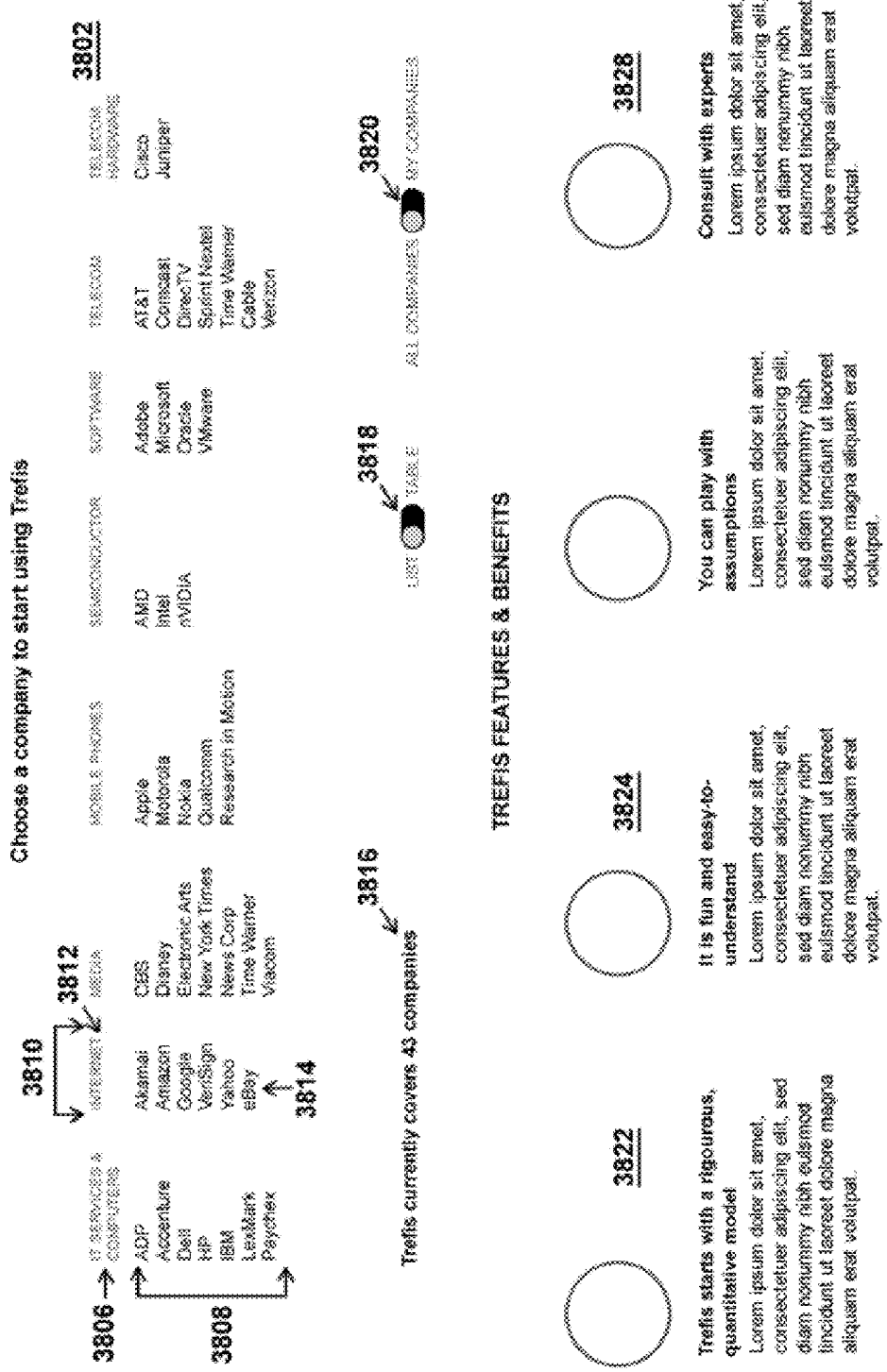

FIG. 38 shows an example screen 3800 of a website page that is scrolled down to show a company selection area 3802 and a listing of features 3804. The company selection area 3802 includes a list of columns 3806 listing various categories or business sectors, including IT services and computers, Internet, media, etc. Each of the columns 3806 includes a list of companies 3808 (e.g., the Internet 3810) and further includes a header 3812 (e.g., identifying the Internet) and links for the associated companies 3814 (e.g., eBay, Yahoo, etc.). The total number of companies covered in the area 3802 is identified in a companies total area 3816. The user can control the content in this part of the area 3802 using a list/table option 3818 to change the format of the display. The user can also change the companies listed in the area 3802 by using an "all companies/my companies" control 3820. The listing of features 3804 includes a modeling benefits description 3822, an easy-to-understand description 3824, an assumptions description 3826, and an expert consultation description 3828.

FIG. 39 shows the screen 3800 of FIG. 38 after scrolling down, such as if the user has employed scroll bars or down arrows to navigate further down the screen. The screen 3800 includes information 3902 that includes, for example, a message 3904 "Like what you see?" and an improvement message 3906. The user can select a "Send us your feedback" link 3908 to provide suggestions for the product to the product's manufacturer. The screen 3800 also includes a disclaimer statement 3910 which can identify the limitations of the software. etc.

Figure 40:
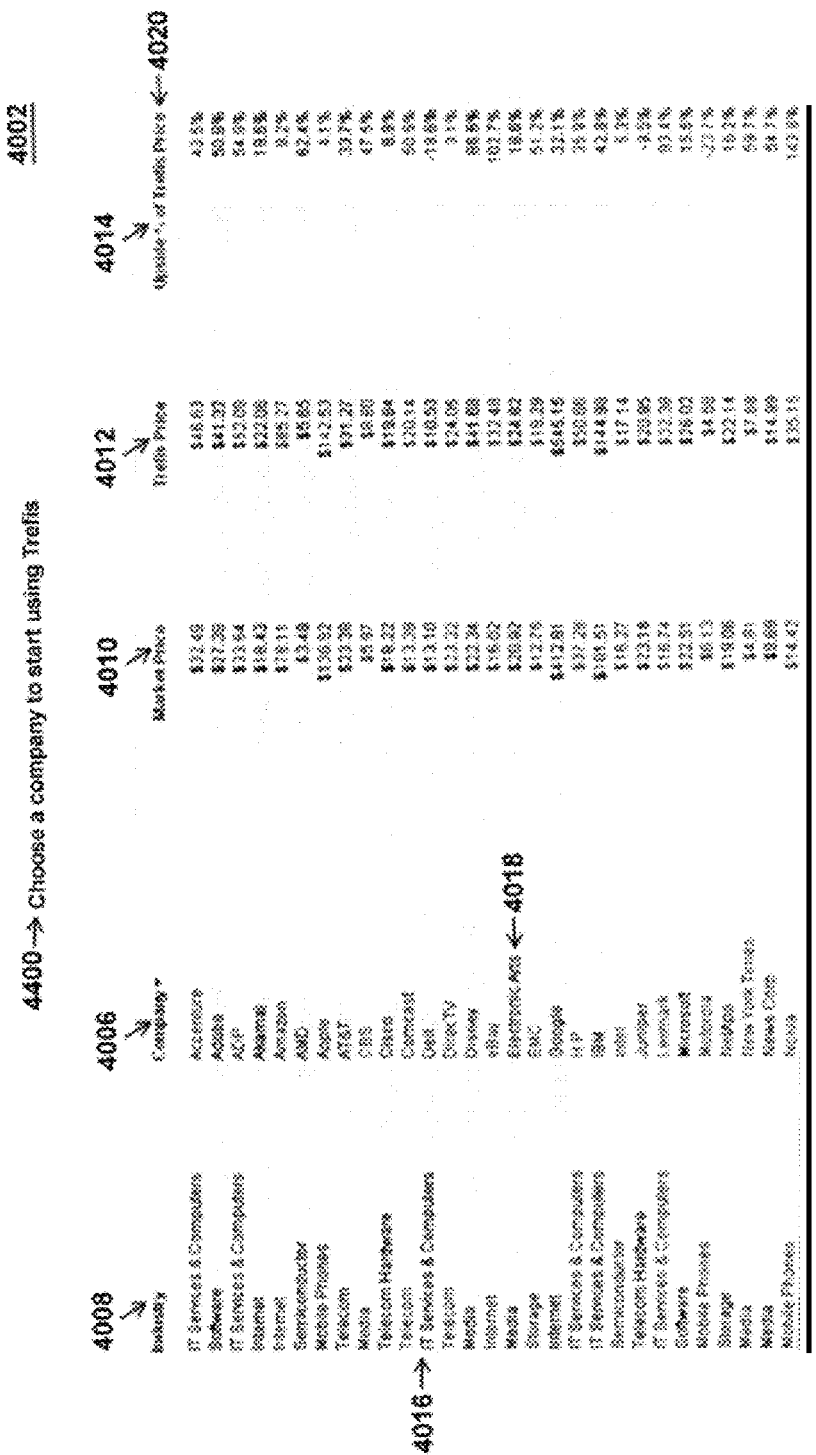

FIG. 40 shows a table selection screen 4000 of a web site page, which can be, for example, the resultant table view of the list of companies when the list/table control 3818 on FIG. 38 is used. The screen 4000 includes a company table area 4002. The user can use the area 4002, for example, to select a specific company for which to display the effects of products and their parameters (e.g., prices, sales, forecasts, etc.) on the company's stock price. The screen 4000 includes a prompt 4004 that can say, for example, "Choose a company below to start using the system." For example, the companies that may be selected by the user are listed in a table 4020 in the area 4002 in the first two of a series of columns. A company name column 4006 lists all of the companies from which the user may select (e.g., Accenture, Adobe, ADP, etc.). An industry column 4008 identifies the industry associated with each of the companies in the company column 4006. A market price column 4010 identifies the actual market price (e.g., as known to the public) of each of the companies' stock. An estimated price column 4012 identifies the market price of this stock as adjusted for the company's products based on a model operated by the host of the site, for example. A valuation percentage column 4014 identifies the percentage difference between columns 4010 and 4012, based on forecasts or other user-specified constraints. For example, as shown in a row entry 4016 in the table 4020, the company CBS 4018 having an industry 4008 value of "Media" has a publicly known market price 4010 of $5.97, an estimated price 4012 of $8.80, and a valuation percentage 4014 of 47.5 percent. The valuation percentage 4014 can also be referred to as "upside percent" as will be discussed below.

Figure 41:
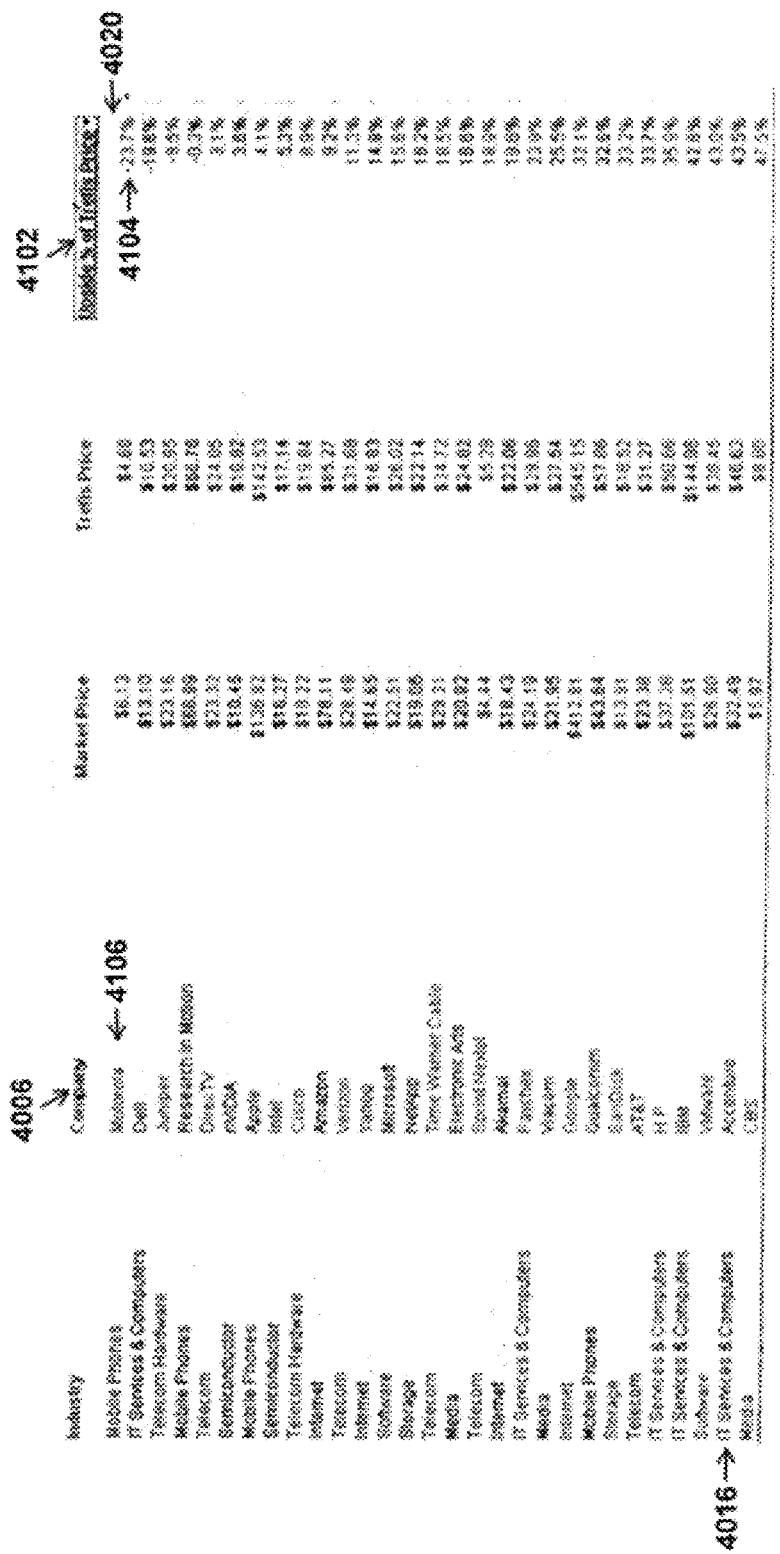

FIG. 41 shows how the screen 4000 can be sorted by various columns. For example, by selecting or clicking on a column header 4102 for upside percentages, the user can sort the information in the table 4020 by that column. When sorted in this way, the table 4020 can display the information in ascending order by upside percentage. For example, the Motorola entry 4106 with the percentage 4104 of −23.7 can be listed first. By comparison, the CBS row entry 4116 having a percentage 47.5 is listed last on the screen (with entries having yet higher percentages scrolled off the screen). The user may click again on the column header 4102 to display the information in descending order, and re-click the column header 4102 as needed to toggle between ascending and descending order. Other columns in the table 4020 can be used to order the data in other ways, such as by clicking on the company 4006 to sort by company name.

Figure 42:
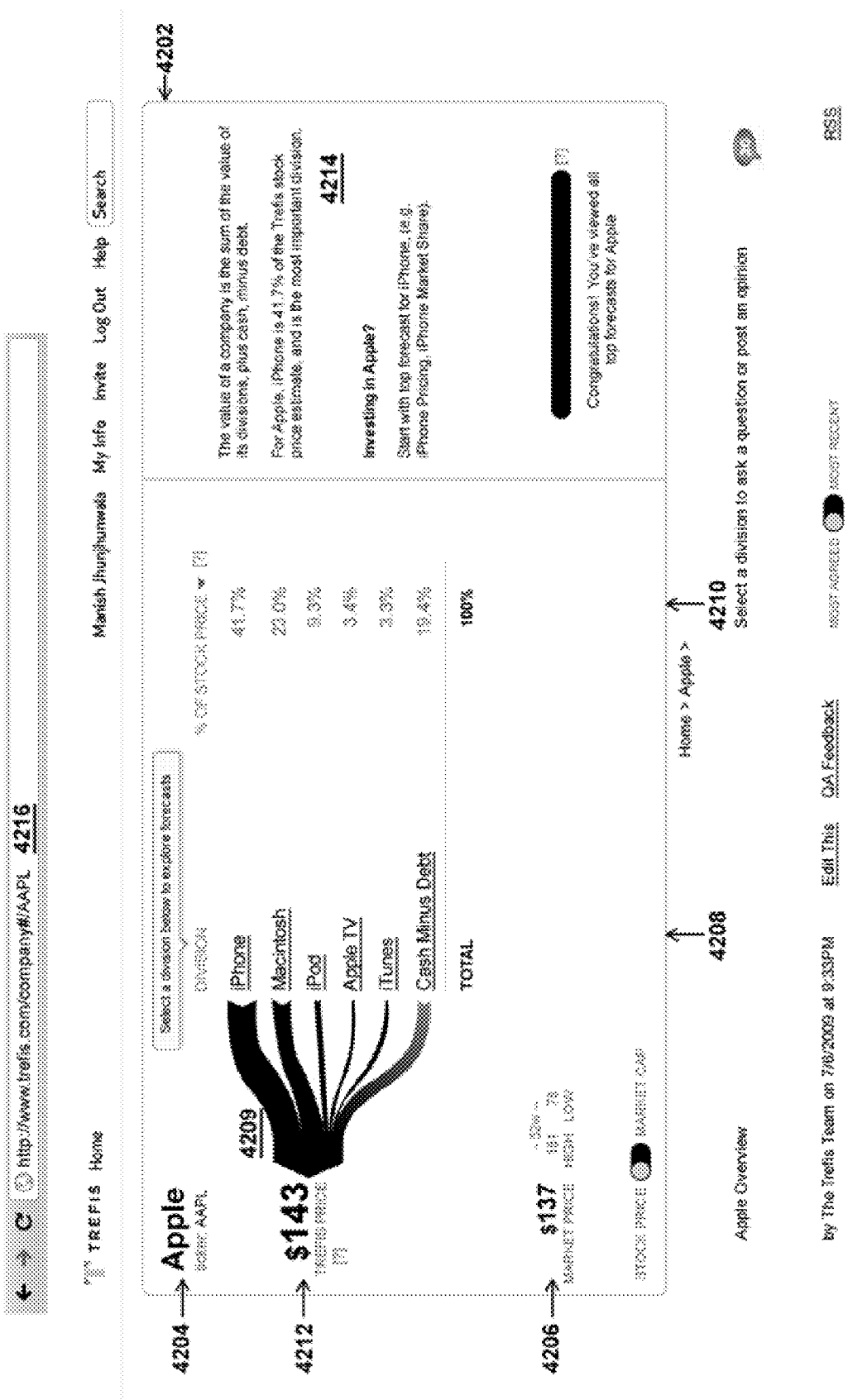

FIG. 42 shows a screen 4200 of a web site page that displays a company's estimated stock price relative to its products, for example all of the products in its product line. The top part of the screen 4200 can diagrammatically show the different products and services that comprise the price estimate of the selected company, based on one of the pricing models used. The user can reach this page by selecting a company from the table or list discussed previously or by searching for the company name or ticker in the company name or ticker search field, also discussed previously. For example, the screen 4200 can appear if the user has selected the company Apple from the screen 4000. The features of the screen 4200 can allow the user to drill down to see how parameters associated with various product lines impact the price of the stock. The screen 4200 includes a product breakdown area 4202 which includes a company label 4204 that identifies the company (e.g., Apple). A stock price area 4206 can identify the publicly known current market price and its 52-week high and low prices. For example, Apple's current market price is $137.00 and its 52-week high and low prices are $181 and $78, respectively, which can be displayed as prices rounded to the nearest dollar (or any other currency being used, for example). The product breakdown area 4202 includes a product division column 4208 and a percentage of stock price column 4210. For example, Apple's product divisions can include iPhone, Macintosh, iPod, etc., with corresponding (percent of stock price) percentages 41.7, 23.0, 9.3, etc. The estimated stock price 4212 of $143.00, for example, can be based on values determined from the product division column 4208 and the percentage of stock price column 4210. For example, iPhone represents 41.7% of the stock price of Apple according to the model, and iPhone contributes some amount of dollar value to the stock price (which is not shown on this figure). The combination of the contribution of dollar value and the weighting represented by the % of stock price yields the Trefis price according to the model. In some implementations, the dollar value contributions from divisions are simply added to arrive at the price estimate for the company. The percent contribution for each division can then be obtained by dividing the dollar contribution of a division by the price estimate of the company. Moreover, the dollar contributions from each division can be obtained by additional calculations performed in the model, using, for example, parameters that can be explored by clicking on the names of different divisions (e.g., iPhone, etc.). A dialog window 4214 can provide a user with a textual description of what the numbers represent. The URL field 4216 can further identify Apple (e.g., having stock letters "AAPL") as the company for which the data is displayed. A graphical element 4209 illustrates how the stock price is split among the different divisions, using different widths of stripes 4211 that diverge from the price on the left to the different divisions on the right. Each of the divisions listed in column 4208 is a link that can be invoked to drill down and understand the detailed analysis that supports the top level items on this screen.

FIG. 43 shows a scrolled down state of the screen 4200. In this state, an overview area 4302 and a forum area 4304 are shown. The overview area 4302 includes areas 4306 through 4312. The valuation highlights area 4306 explains to the user, for example, how the company's various products contribute on a percentage basis to the company's stock price. The business summary area 4308 provides a brief description of the company's overall business model. The sources of value area 4310 provides an area which can include a description of how valuation is determined in the model. For example, for the Apple company, the "Large Mobile Phone Market" area 4312 estimates of the number of mobile phones to be sold worldwide in 2009 to be 1.3 billion. Any of the areas 4306 through 4312 can be edited, for example, using an edit link 4314 or reported for quality issues (e.g., to a web site coordinator) using a quality assurance feedback link 4316. The forum area 4304 includes forum entries 4318 through 4322. For example, the forum entry 4318 involves market share associated with iPhones as shown by a heading 4324. The question in this entry is "do we know the smartphone market size as a percentage of overall phone market size?" A rating area 4328 can include the percentage of users who agree with the posting as well as thumbs-up and thumbs-down controls that a user can select or click on to express his own agreement/disagreement vote with the specific posting. Controls 4330 can allow the user, for example, to edit the post, delete the post, or mark a post as a featured post, etc. Controls 4332 can list the number of replies to the post and allow the user to post a reply. The entry 4320, as depicted, is currently "unrated" as indicated by an unrated label 4334. A control 4336 can be used to sort the forum entries in any order, such as most recent, most agreed upon, or other criteria.

The forum area 4304 features that allow the user to easily view and navigate other users' opinions and responses are an improved version of what is described with respect to FIG. 27 above as 652. This version is better because the control 4336 can be used to sort the entries in various ways, the rating area 4328 includes agreement percentages and thumbs-up/thumbs-down symbols, and controls 4332 list the number of replies to the post and allow the user to post a reply.

FIG. 44 shows another scrolled down state of the screen 4200. For example, the bottom portion of the entry 4322 is shown. The screen 4200 also shows controls 4402 for navigating to the previous or next groups of forum entries.

Figure 45:
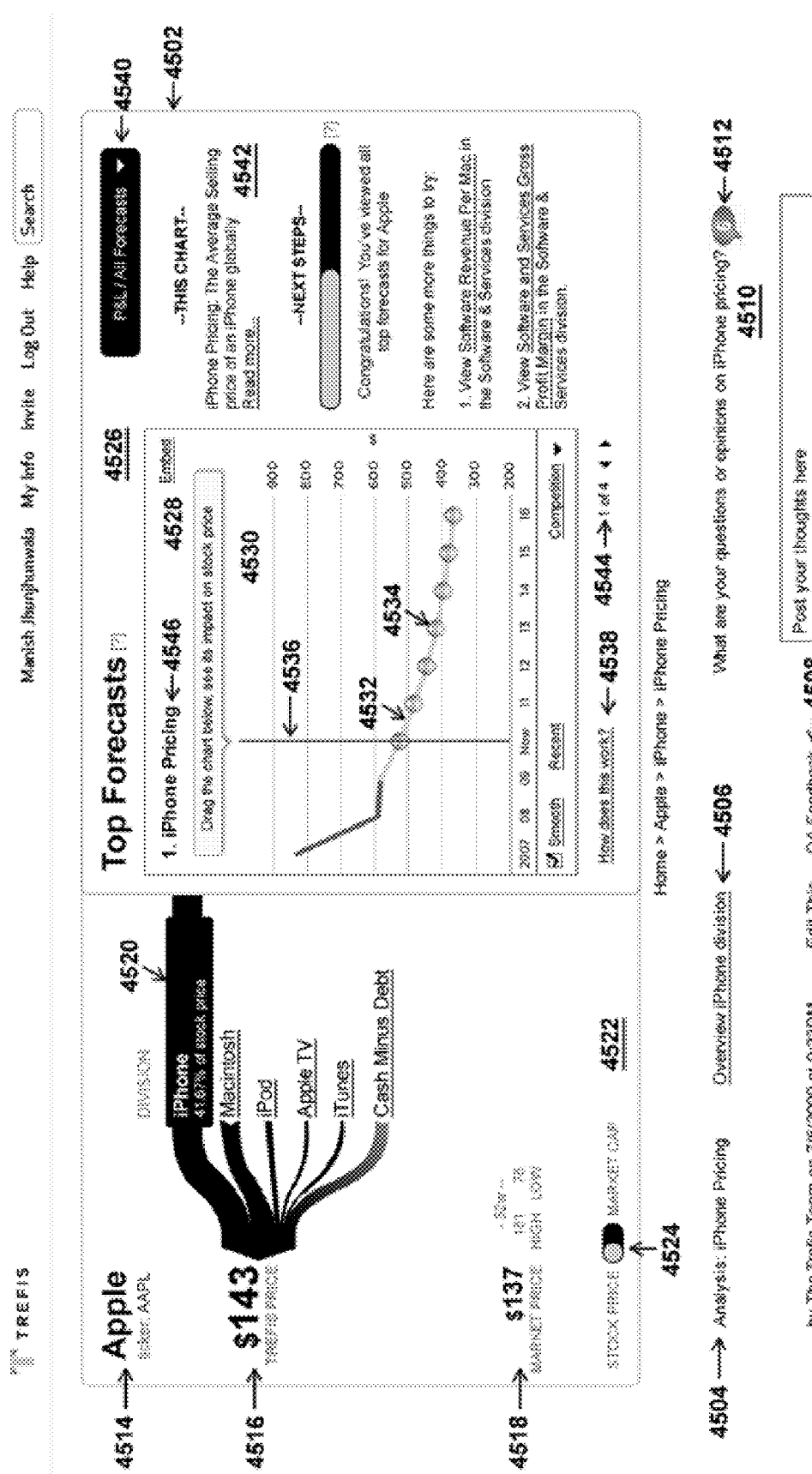

FIG. 45 shows a screen 4500 of a web site page that can be used for displaying estimated stock price information for a specific division or product. The screen 4500 includes a product data area 4502 and an analysis description area 4504. The analysis description area 4504 includes a product identifier 4506 (e.g., iPhone), the source of the information 4508 (including a link 4509 to provide quality assurance feedback), and a questions and opinions area 4510. A count display 4512 can identify the number of comments received to date. The product data area 4502 includes a company label 4514 (e.g., Apple), an estimated price 4516, and a market price area 4518 as before. A selected division or product 4520 (e.g., iPhone) is one of the divisions 4522. It was selected by invoking that division link on a FIG. 42. Varying line thicknesses 4524 can be used to indicate the relative contribution by percentage of the divisions 4522 to the estimated price 4516. In general, a division can be a product, a service, or a group of products and services. The selected division or product 4520 determines the data that is displayed in a data area 4526. For example, the data area 4526 can contain one or more graph areas 4528. Each graph area 4528 includes a graph area 4530 with a graph (e.g., a line graph 4532), data points 4534, a vertical timeline bar 4536, and controls 4538. The data area 4526 also includes one or more controls 4540. For instance, the controls 4540 can be invoked to display profit and loss or other forecasts. A descriptive information panel 4542 can provide the user with a textual description of the forecasts being displayed. In this instance, the information that is displayed in the product data 4502 relates to product pricing, as indicated by a label 4546. For example, a "1 of 4" label 4544 indicates that the screen 4500 is the first in a sequence of four screens that can be displayed, the other three graphs being for three other parameters that relate to the iPhone division. The second screen in the sequence will be described with respect to FIG. 51. The next steps panel 4545 offers other links that the user can invoke.

Figure 9:
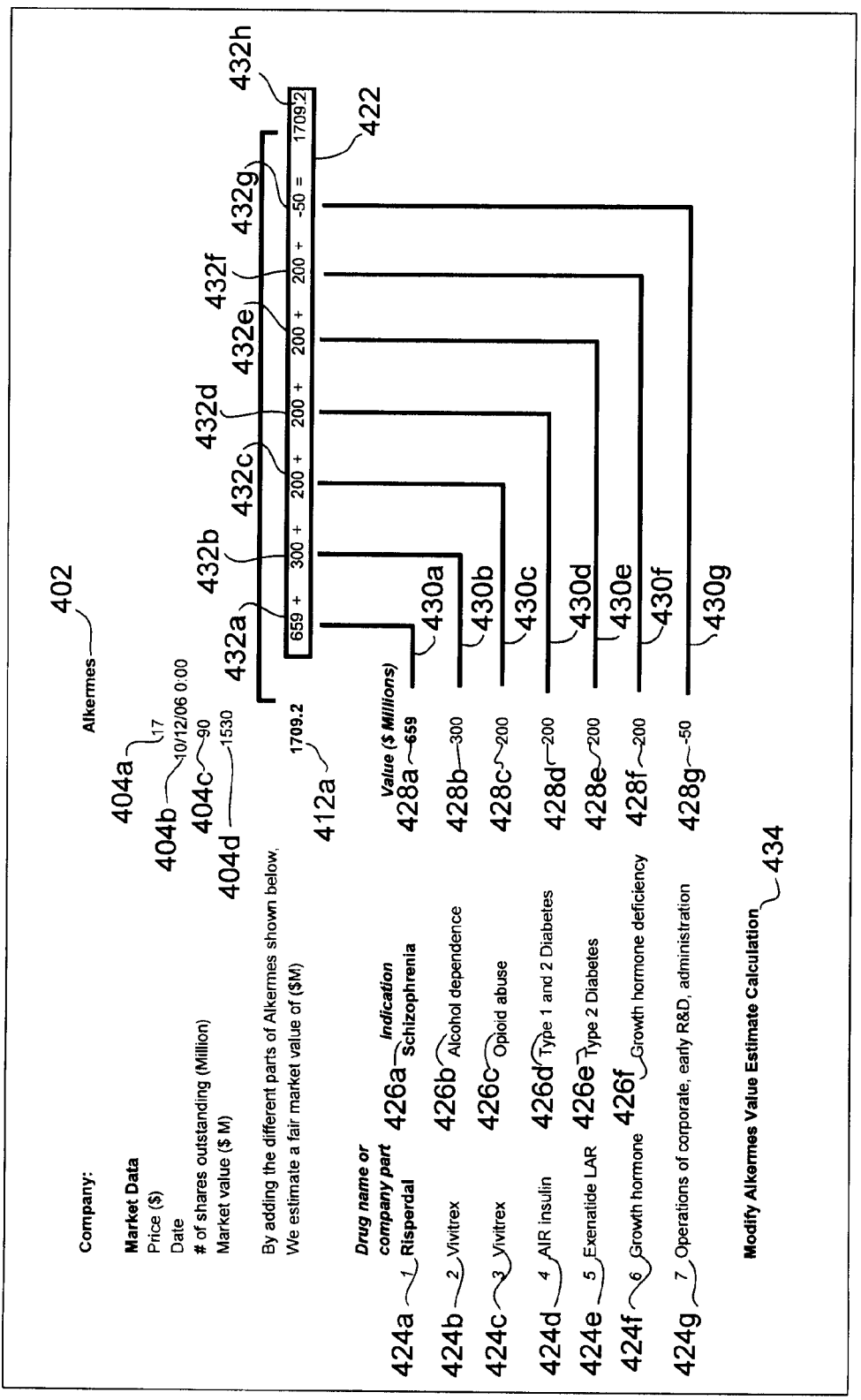
Figure 10:
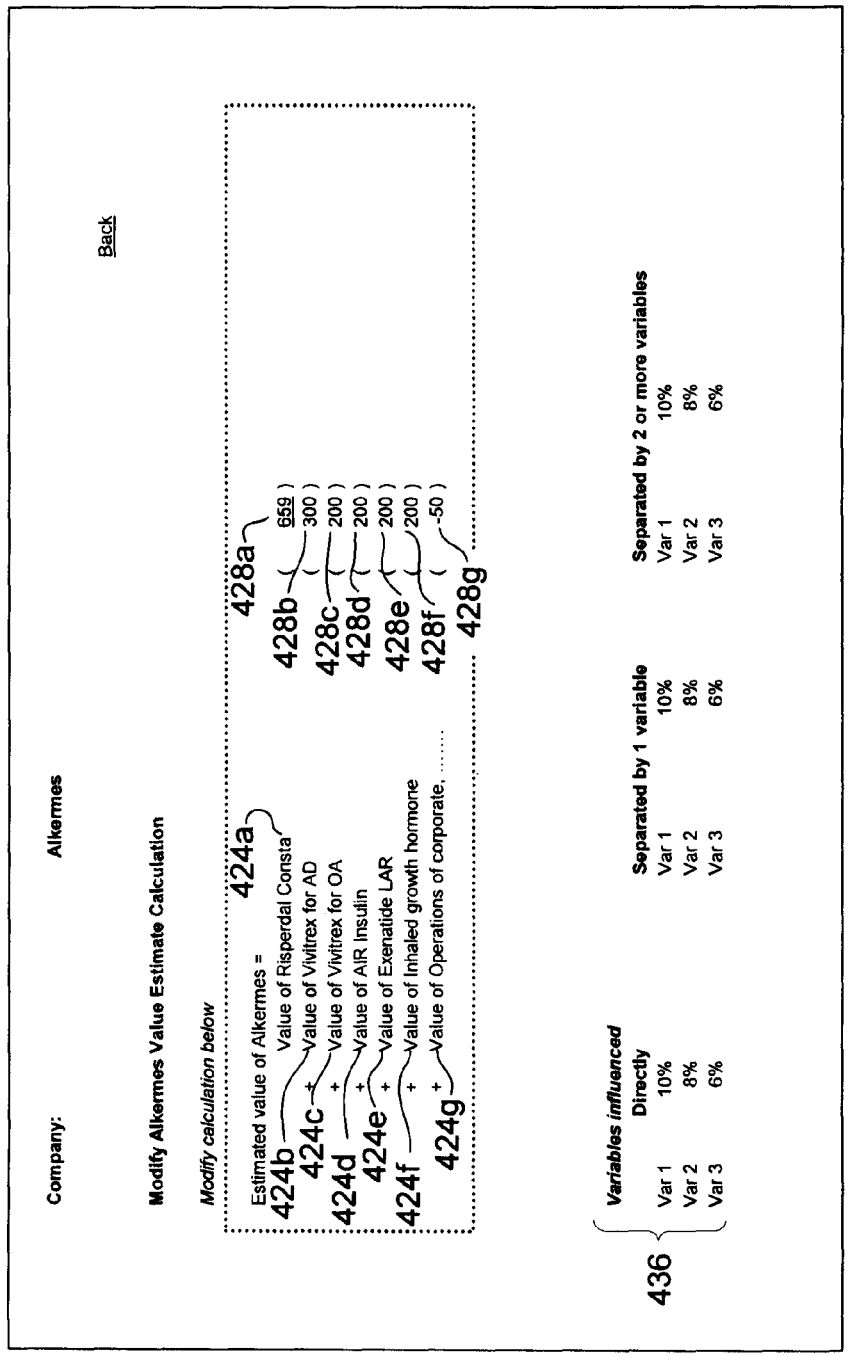

The varying line thicknesses 4524 feature is an improved version of what is described with respect to FIG. 9 above as 432h. This version is better because it graphically shows each product's contribution to the estimated share price.

Figure 46:
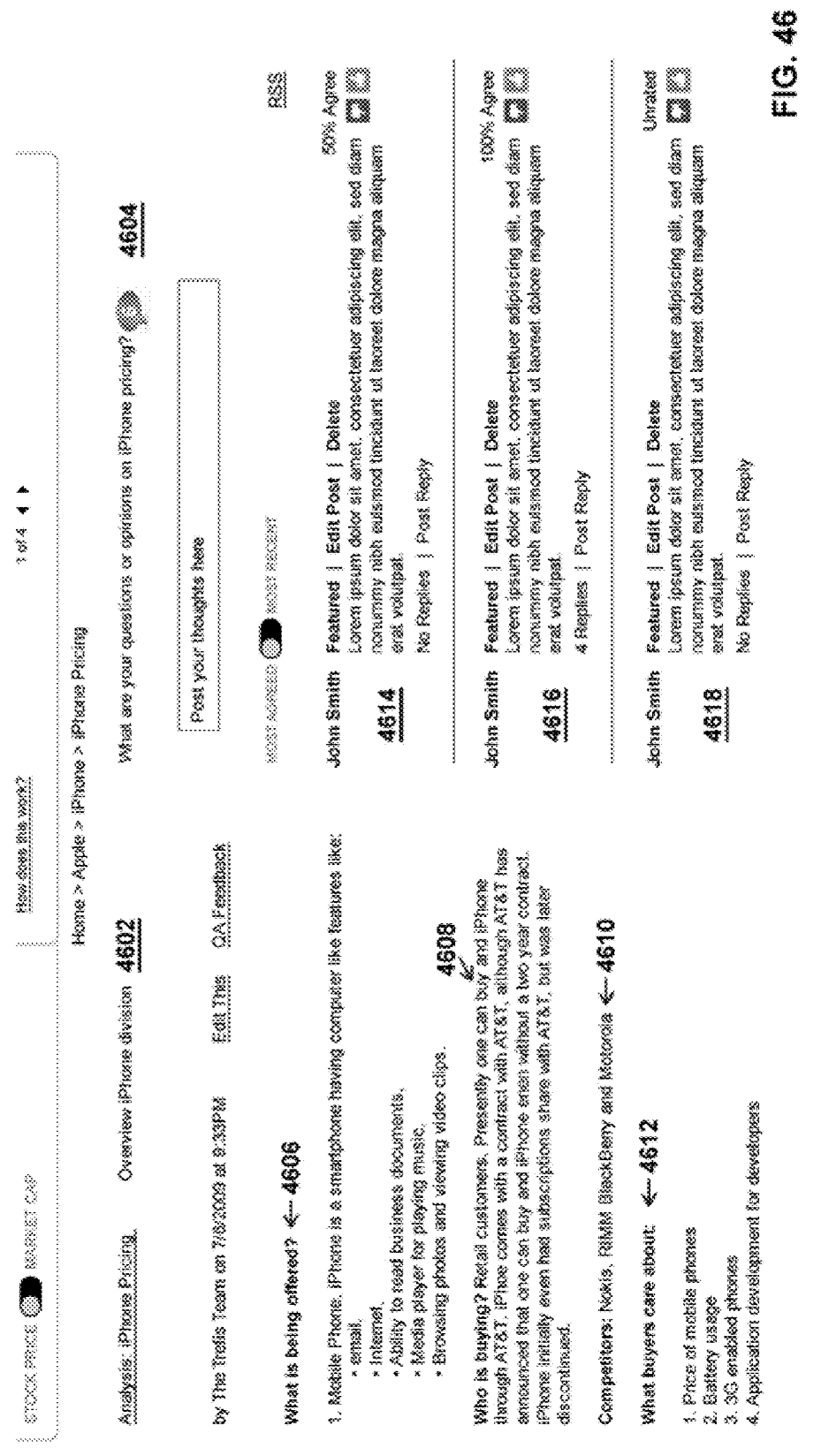

FIG. 46 shows a scrolled down state of the screen 4500. In this state, the screen 4500 shows an analysis data area 4602 and a forum area 4604. The analysis data area 4602 can operate in the same fashion as the area 4302 described with respect to FIG. 43. The analysis data area 4602 can include several sub areas, such as a product offered area 4606, a product buyers area 4608, a competitors list 4610, and a list 4612 of what the buyers are perceived as caring about when buying mobile phones. The forum area 4604 can include multiple forum posts, such as posts 4614 through 4618. The features and controls for the forum area 4604 can be similar to those described for the forum area 4302 with respect to FIG. 43. The analysis area of screen 4500 can include two views.

Figure 48:
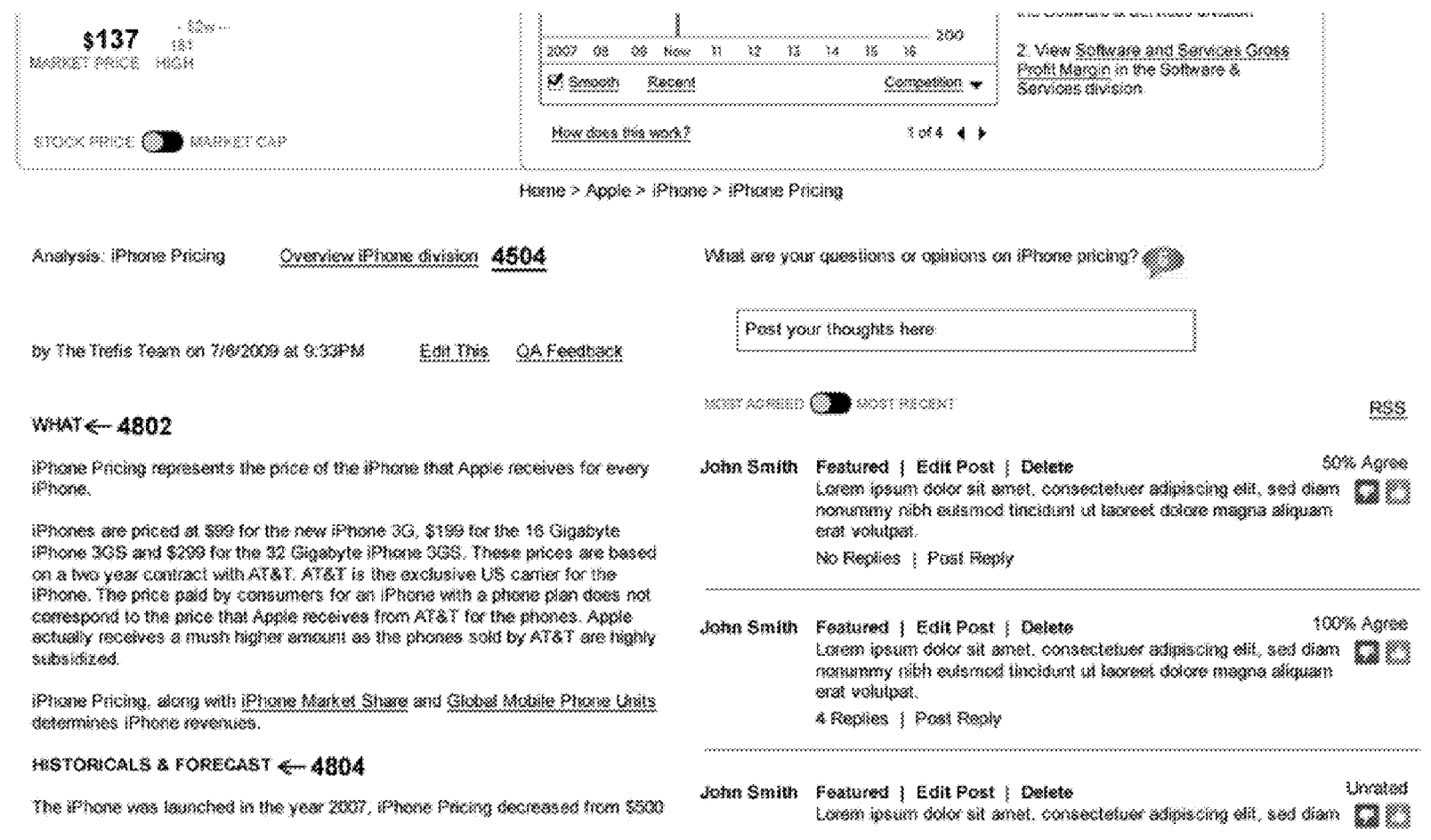

One view, for example, is as shown in FIG. 46, when the overview of the division selected in FIG. 45 is presented. In this case, the iPhone division's overview is presented. The second view, as shown in FIG. 48 (described below), shows the analysis of the metric depicted in the forecast chart on FIG. 45. In this case, iPhone pricing is shown, which is one of the metrics that has an impact on the estimated value of the iPhone division.

FIG. 47 shows another scrolled down state of the screen 4500. In this state, the screen 4500 shows a top selling points area 4702 which lists the types of things that sellers may look at in buying the product. The screen 4500 also includes additional forum entries 4704 through 4708, which are entries following the entry 4616 previously described. The forum area can automatically filter and display comments specific to the forecast chart shown in FIG. 45 (e.g., iPhone pricing), allowing the user to read comments relevant to the forecast chart being shown.

FIG. 48 shows additional information that can be displayed in the screen 4500. For instance, the screen 4500 can include pricing information 4802 which can provide specific product and pricing information. FIG. 48 shows a state of the analysis area when the analysis "iPhone pricing" is selected as opposed to "Overview: iPhone division" shown on page 46. The analysis area can provide the user with the option to either view analysis of the specific metric shown in the chart area on FIG. 45 (e.g., iPhone pricing forecast chart), or an overview for the entire division selected, as shown in FIG. 45. The screen 4500 can also include historical and forecast information 4804 that describes, for instance, known or forecasted product launch dates as well as historical price points. In this example, the historical and forecasted information are all relevant to the iPhone pricing.

FIG. 49 shows additional information that can be played in the screen 4500. For example, a forecast rationale 4902 can list various expectations affecting iPhone pricing such as, for example, expectations of the company's planned changes to pricing, sales strategies, new product information, and technology trends. The forecast rationale 4902 can provide a summary that introduces specific factors such as factors 4904 and 4906. For example, the factor 4904 can describe pricing pressures of competitors. The factor 4906 can describe the effects of smart phones becoming more commoditized, for instance. Continuing the explanation above, the forecast rationale is basically the rationale for projections that can be shown in the forecast chart for iPhone pricing. The chart shown corresponds to iPhone pricing above, while the section below the chart can allow the user to see explanations relevant to the chart, such as historical information, forecast summaries, forecast rationale, and others such as "how we get historical data" and "sources," as described in more detail below relative to iPhone pricing.

FIG. 50 shows another state of information that can be displayed in the screen 4500. For example, by scrolling down from the state of the screen 4500 depicted in FIG. 49, the user can view additional areas 5002 and 5004. The area 5002, for instance, can describe how the historical data for the metric shown in the forecast chart on screen 4500, in this case iPhone pricing, was obtained. The sources area 5004 can list various references from which the information was obtained, such as an article title 5006 (e.g., "Apple: Is a Low-Cost iPhone in the Works?"), URLs or other identification methods.

Figure 51:
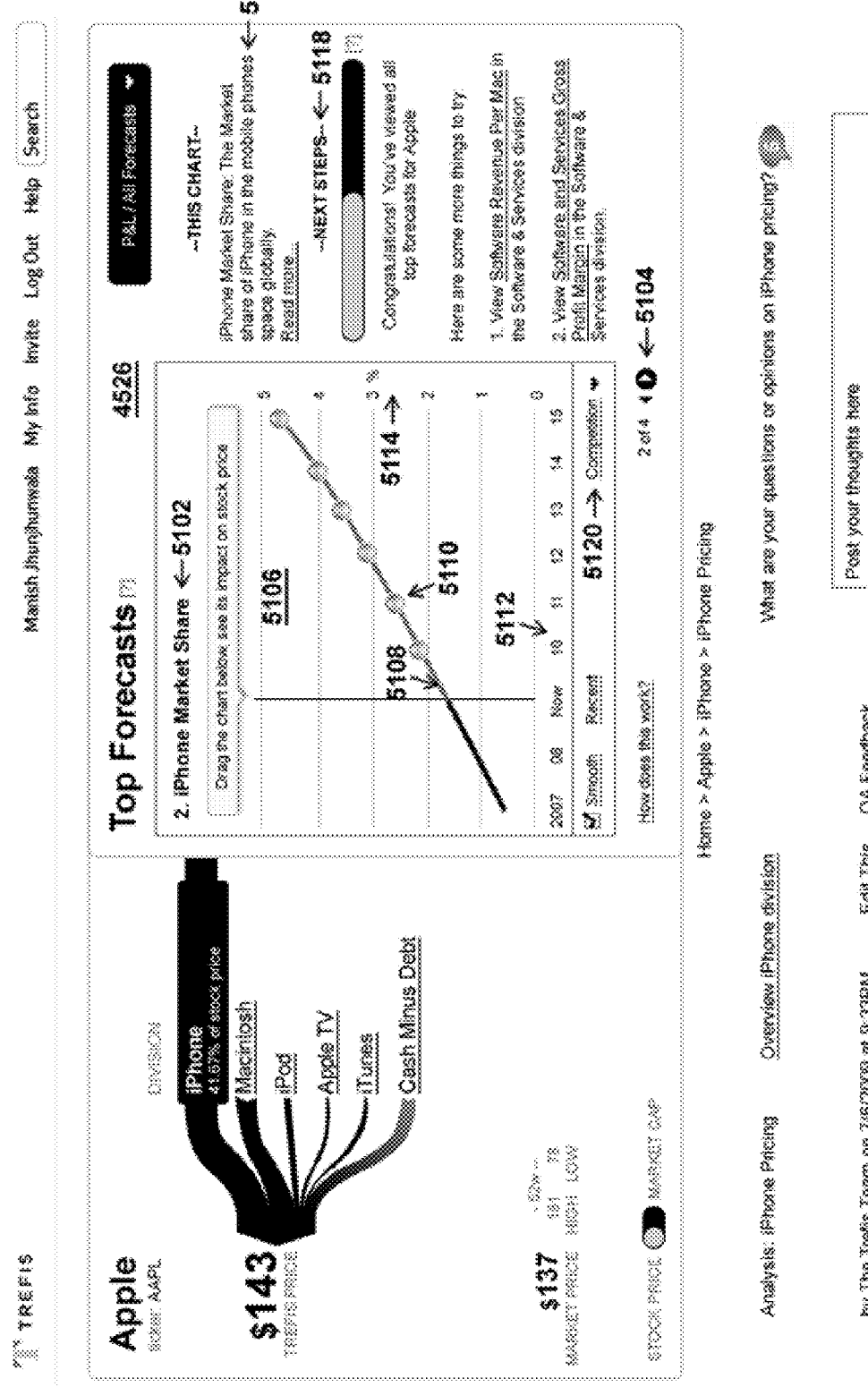

FIG. 51 shows a screen 5100 of a web site page. The screen 5100 displays market share information as indicated by a market share title 5102. For example, the information displayed in the screen 5100 can be a continuation of the information displayed in the screen 4500. For instance, as indicated by a "2 of 4" display and control 5104, the screen 5100 can include the second group of information displayed for a product, where the screen 4500 displayed the first group of information for the product. The screen 5100 includes a graph area 5106 that includes a graph 5108 connecting multiple data points 5110. The graph 5108 is plotted relative to a horizontal axis 5112 related to time and a vertical axis 5114 related to market share. The screen 5100 also includes a descriptive text box 5116 that describes market share and a list of options 5118 that the user may use to view additional information. A competition control 5120 exists below the graph 5106 may be used to display a graph of information related to products in competition with the product represented by the screen 5100.

Figure 52:
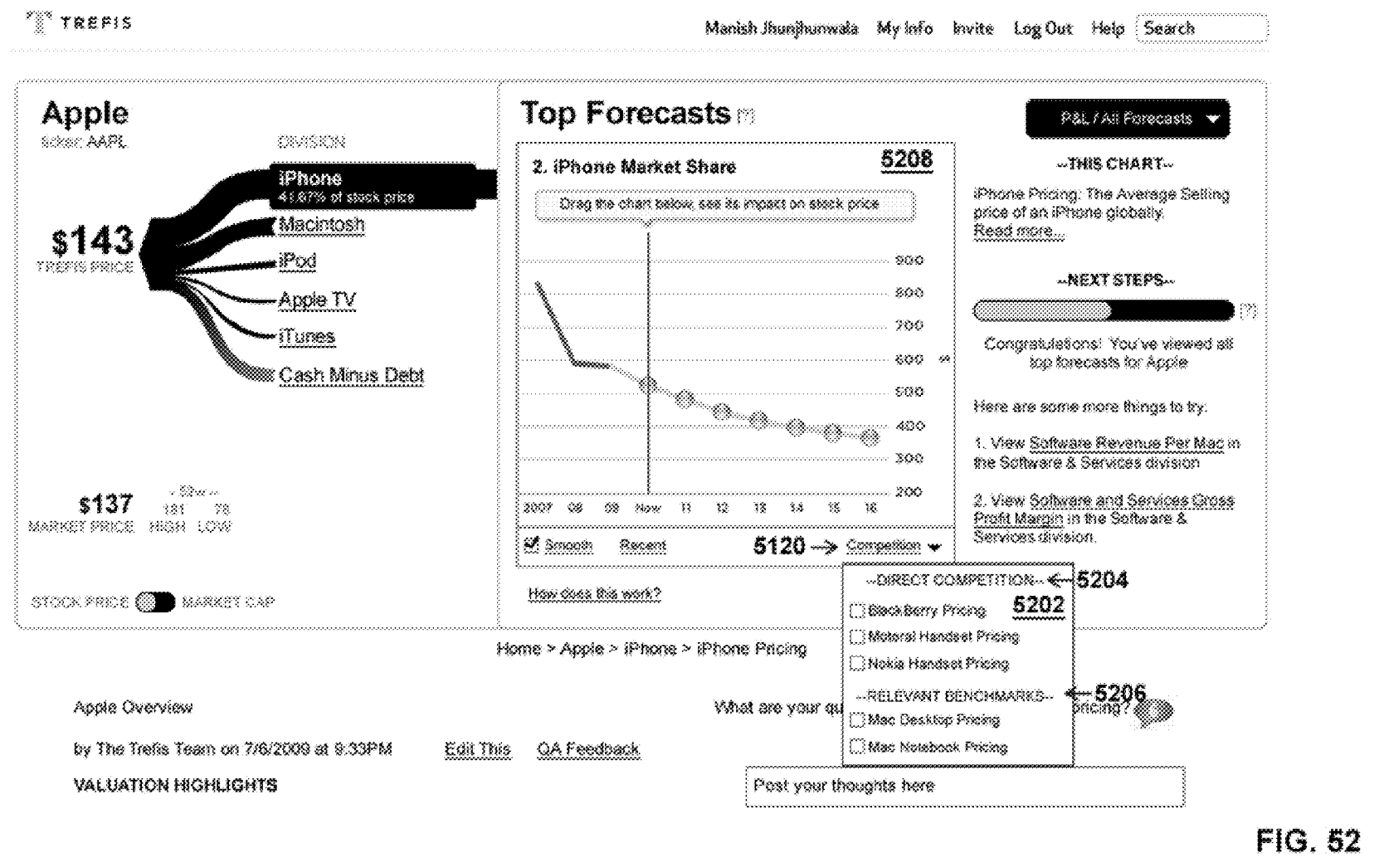

FIG. 52 shows a screen 5200 of a web site page with a competition popup 5202 displayed, such as by the user selecting the competition control 5120. For example, the competition popup shown can appear when the competition control on FIG. 45 is invoked. In this example, the forecast chart is for iPhone pricing. By comparison, the FIG. 51 forecast chart is for iPhone market share. The popup 5202 includes a direct competition area 5204 and a relevant benchmarks area 5206. For example, for products in competition with Apple's iPhone, the direct competition area 5204 can include checkboxes for Blackberries, Motorola phones, Nokia phones, etc. The relevant benchmarks area 5206 and can include checkbox options for Mac desktop pricing, Mac notebook pricing, and so on. A graph area 5208 shows a line graph of the average selling price of the iPhone over time.

Figure 53:
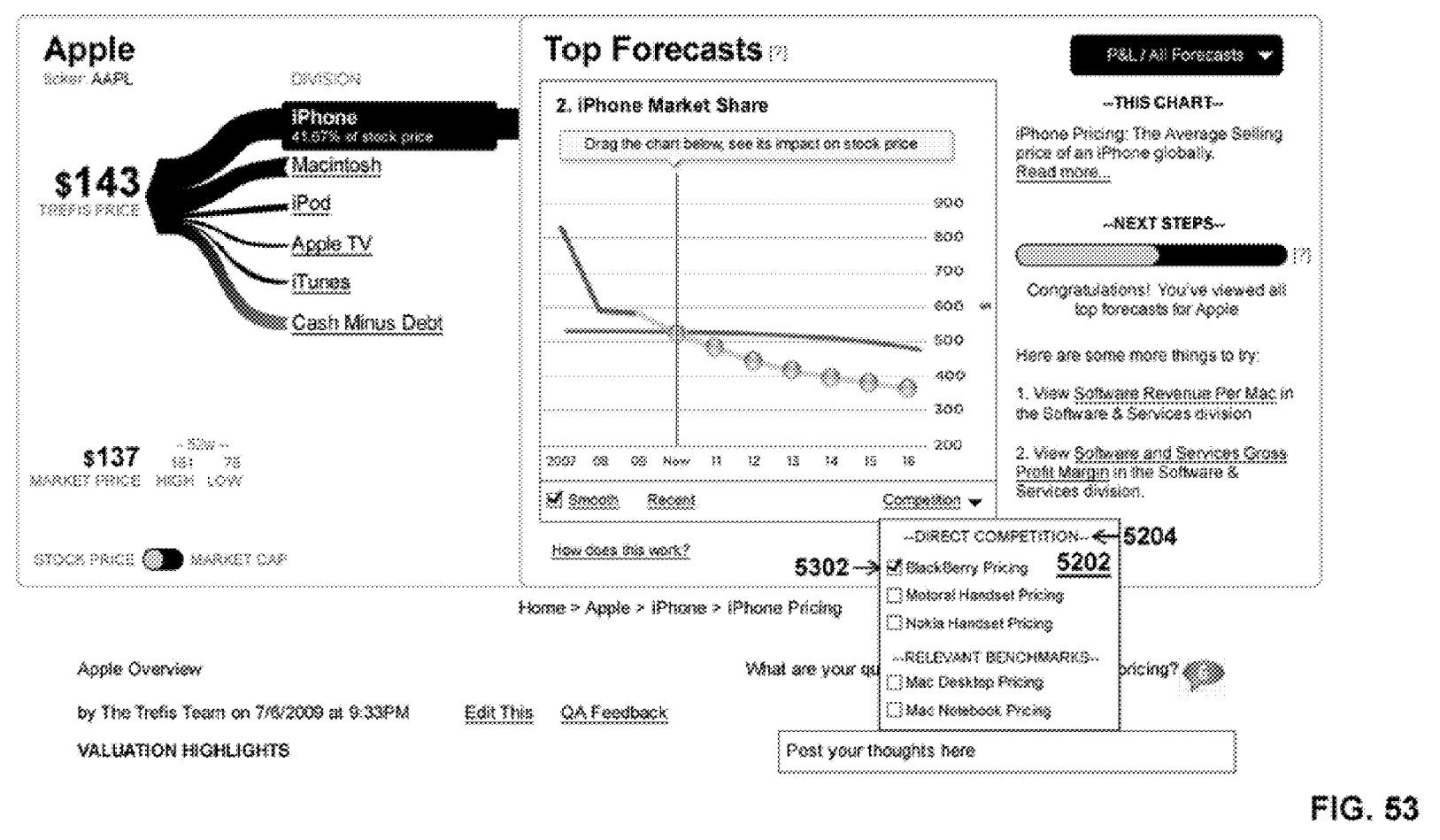

FIG. 53 shows the screen 5200 with a Blackberry pricing checkbox 5302 checked in the direct competition area 5204 on the popup 5202. By checking the checkbox 5302, for example, the user can display a graph of information related to Blackberry pricing.

Figure 54:
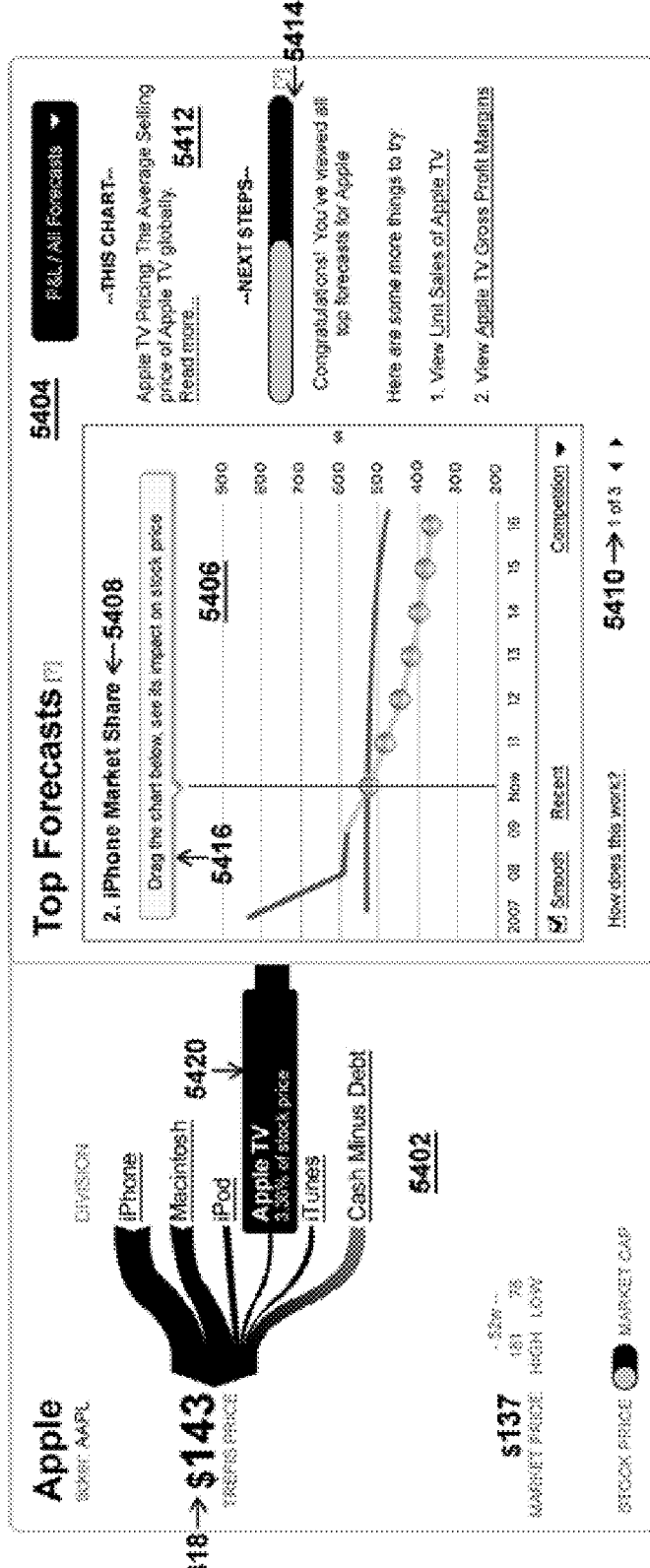

FIG. 54 shows a screen 5400 of a web site page that can be used for displaying information for a different division, specifically the Apple TV. For instance, the information displayed in the screen 5400 can appear if the user has selected the Apple TV control 5420 from a list of divisions 5402. As stated earlier, a division can be a product, a service, or any group of products and/or services. This is in contrast to the selection of the iPhone division selected and described in examples above. When the Apple TV control 5420 is selected, the information in the data area 5404 includes a graph 5406 related to Apple TV's pricing, as identified by an Apple TV pricing label 5408. The information displayed can be the first of multiple screens, such as the first of three screens, as indicated by a label 5410. The area 5404 can include descriptive text 5412 that provides additional information about Apple TV pricing and a list of options 5414 that the user can employ to look at additional information as a next step in browsing the content on the website. In one example scenario of manipulating the data, the user can drag individual data points up and down on the graph, as indicated by a label 5416. As a result of dragging elements on the graph 5406, an estimated price 5418 of $143 can change, incorporating the results of a hypothetical change of Apple TV pricing that the user makes by dragging the graph 5406 elements.

Figure 55:
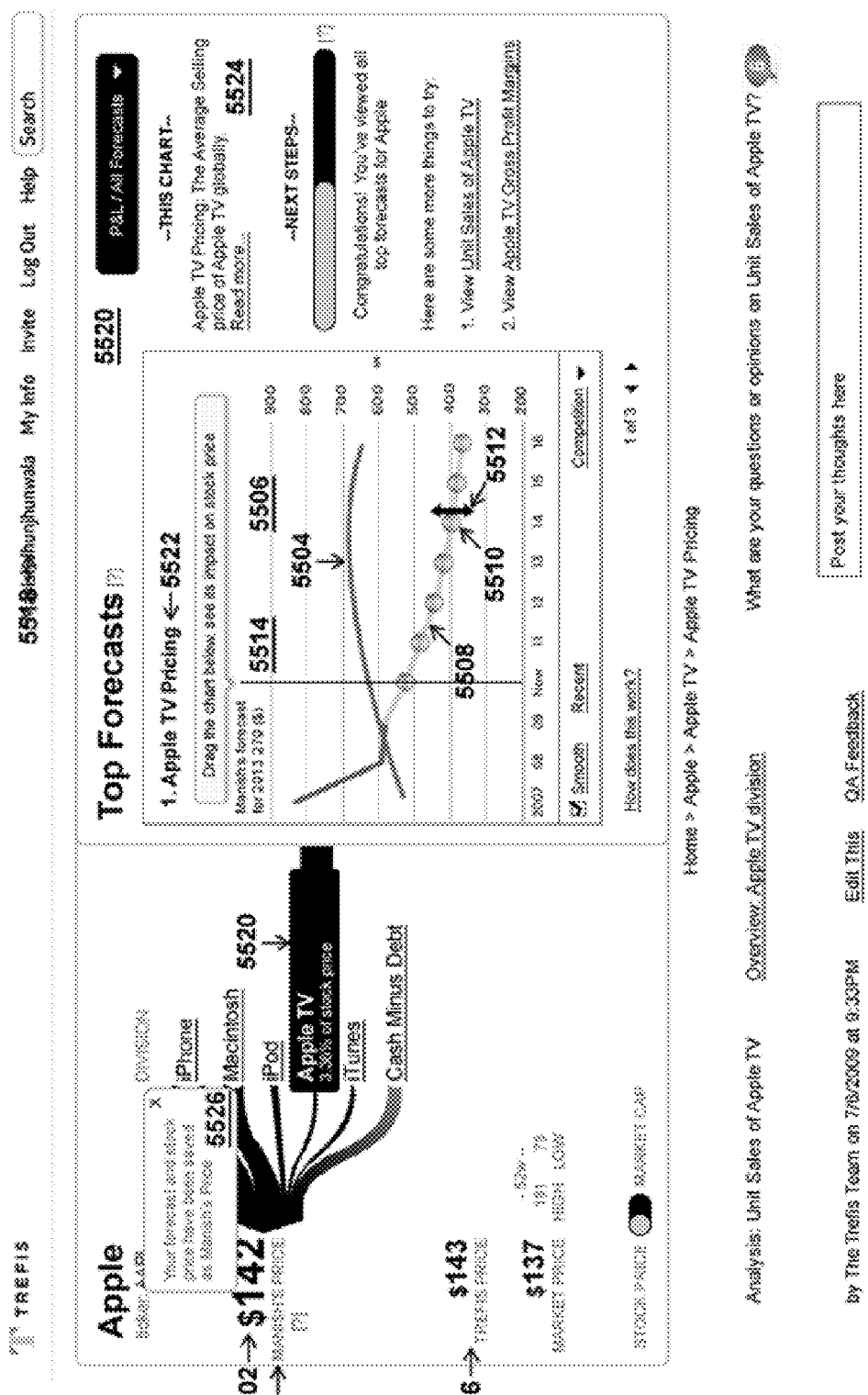

FIG. 55 shows a screen 5500 of a web site page with a new price estimate 5502 based on a modified forecast. The new price estimate 5502 of $142 is based upon user interaction, specifically dragging a line graph 5504 to a new position in the graph area 5506. The line graph's new position is shown by a line graph 5508, including data points 5510. An up/down arrow 5512 can serve as a cue to indicate to the user that the line graph is draggable. ] More precisely, the user has positioned the line graph 5508 at the price of $270 for the year 2013 as indicated by a caption 5514. As a result of dragging the line graph 5508 to its new position, the new price estimate 5502 is different from the price estimate displayed (e.g., $143) as an original Trefis price 5516 (e.g., unmodified by user interactions). The new price estimate 5502 is also labeled with the user's name 5518 (e.g., "Manish's price"), corresponding to a name of the user 5518 displayed above a data area 5520. The name of the particular product (e.g., Apple TV) is redundantly displayed in each of the selected product area 5520, the title of the graph 5522, and the descriptive text 5524 associated with the screen. A notification popup 5526 can be used to indicate that the user's forecast and/or the stock price estimate have been saved. As a result of the user changing the forecasted metric, in this case Apple TV pricing, the data area 5520 can also identify the product's new percentage contribution (e.g., 2.89 percent) to the stock price (e.g., down from 3.36 percent shown in FIG. 54).

Figure 56:
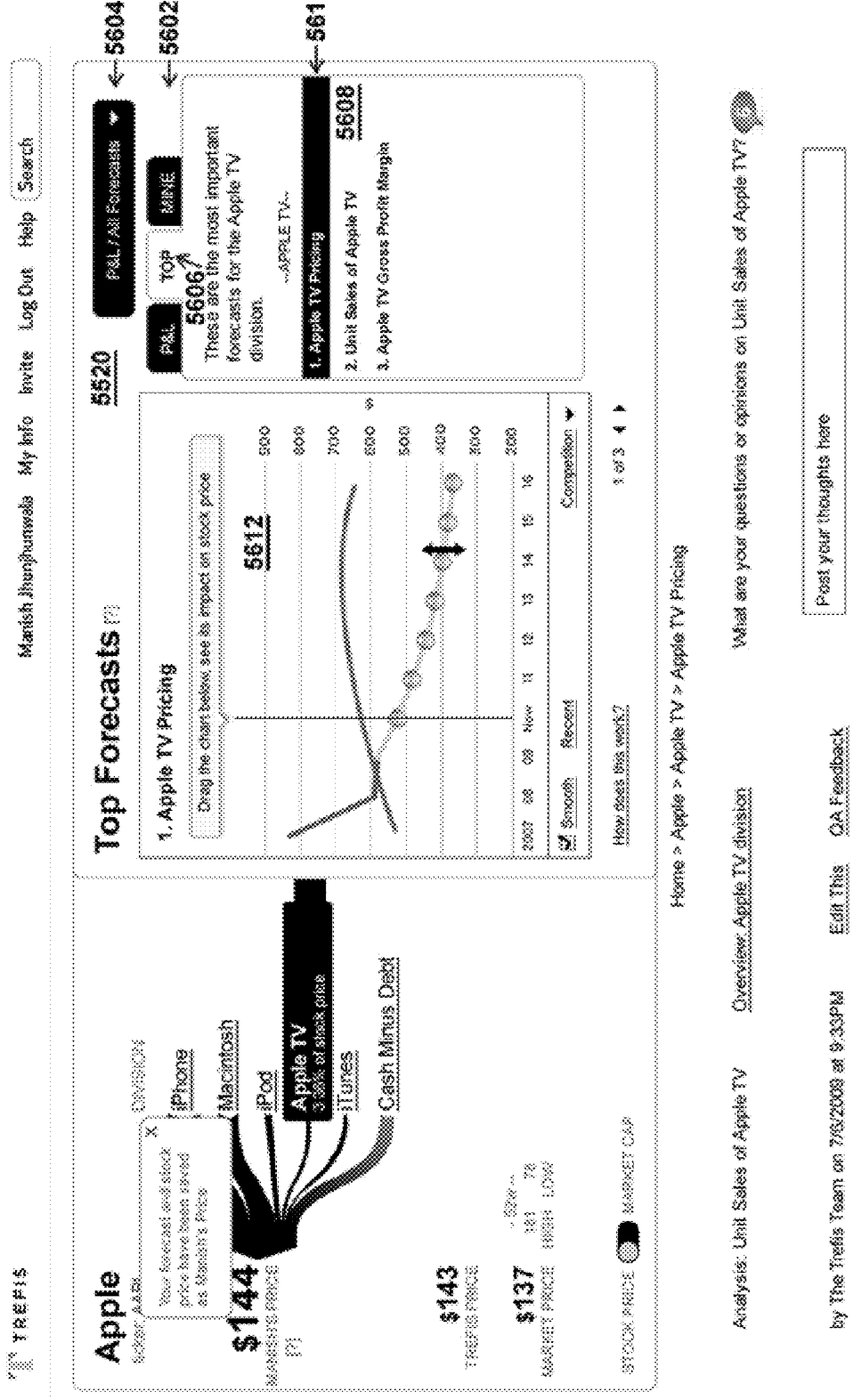

FIG. 56 shows a screen 5600 of a web site page with a profit and loss (P&L)/all forecasts control 5604 clicked. As a result, different tabs 5602 are displayed. Under a "Top" tab 5606, the user has selected an Apple TV pricing option 5610 from a forecast list 5608 of a set of forecasts for the product (e.g., Apple TVs) and selected by the program as important based on a number of pre-determined criteria. Selecting the option 5610 causes the corresponding pricing forecast information to be displayed in the graph area 5612. When the control 5604 is first invoked, it can automatically result in opening up the panel on the right-hand side, pre-selected to the forecast chart that the user was already viewing. For example, in FIG. 55, the user was already viewing an Apple TV Pricing forecast, which is one among the three top forecasts for Apple TV. When the P&L/All forecast button is clicked, the Apple TV pricing can be shown selected in the list of three. The user can select the other two from this list. Alternatively, the forward and back arrow control 5410 in FIG. 54 can also be used to navigate through this list of three.

Figure 57:
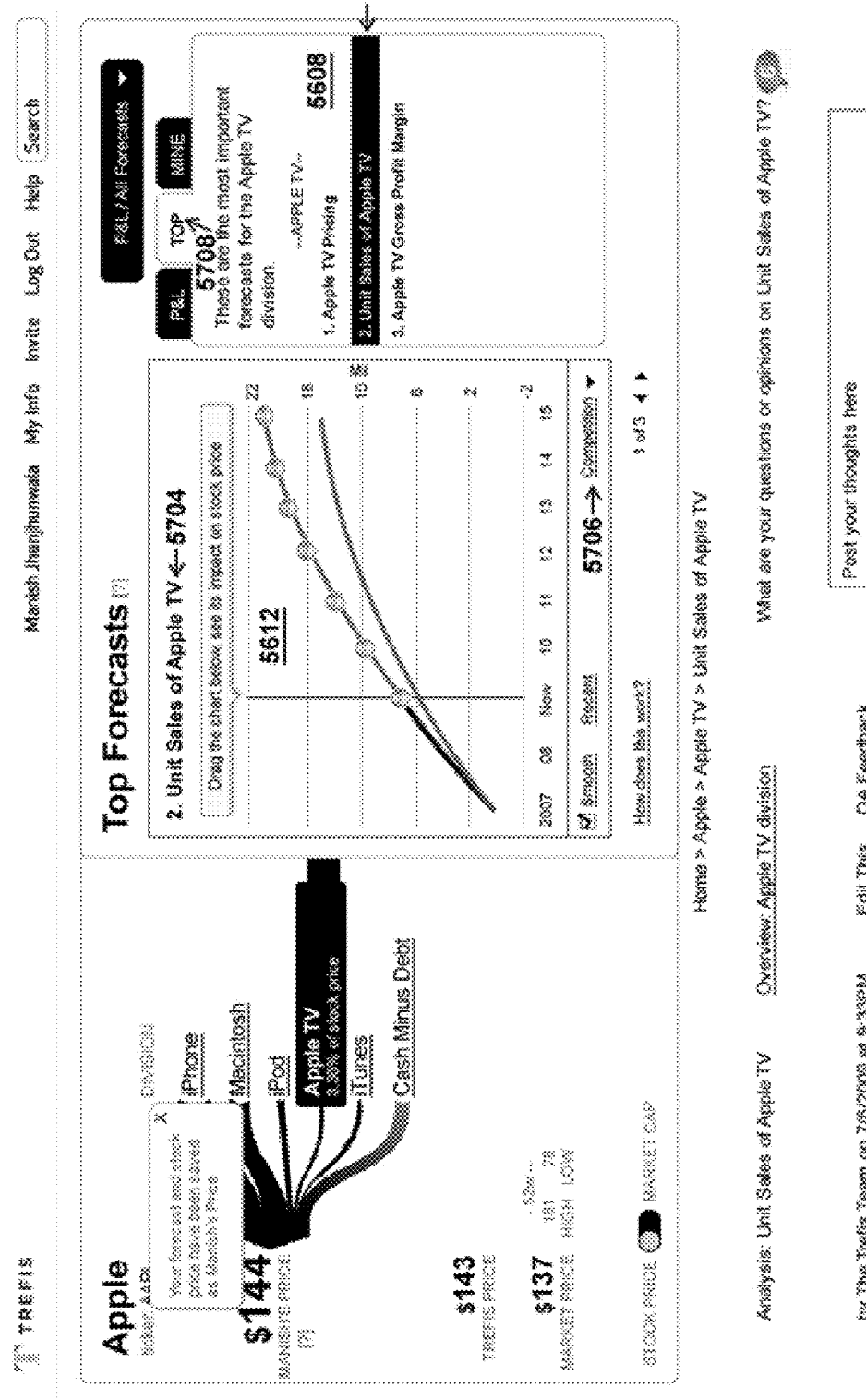

FIG. 57 shows a screen 5700 of a web site page with a different forecast selected from the list of forecasts 5608. In this case, in contrast to the screen 5600 where the Apple TV pricing forecast was selected, a unit sales option 5702 is selected (e.g., unit sales of Apple TVs) under a "Top" tab 5708 As a result, the graphs displayed in the graph area 5612 correspond to unit sales, as indicated by a unit sales heading 5704. This unit sales information is indicated as being the second of three screens related to price forecasts, as indicated by a "2 of 3" label 5706. Note that, as the forecast chart changes from Apple TV pricing to unit sales of Apple TVs, the analysis area also changes to "analysis: unit sales of apple TV." The same is true for the forum area on the right-hand side. However, in each case, the "Overview: Apple TV" remains the same, as both Apple TV pricing and Unit sales are part of Apple TV division.

The feature of using a graphical representation of unit sales data in the graph area 5612 is an improved version of what is described with respect to FIG. 21 above as 564, 516 and 568. This version is better because it graphically shows sales-related information.

Figure 58:
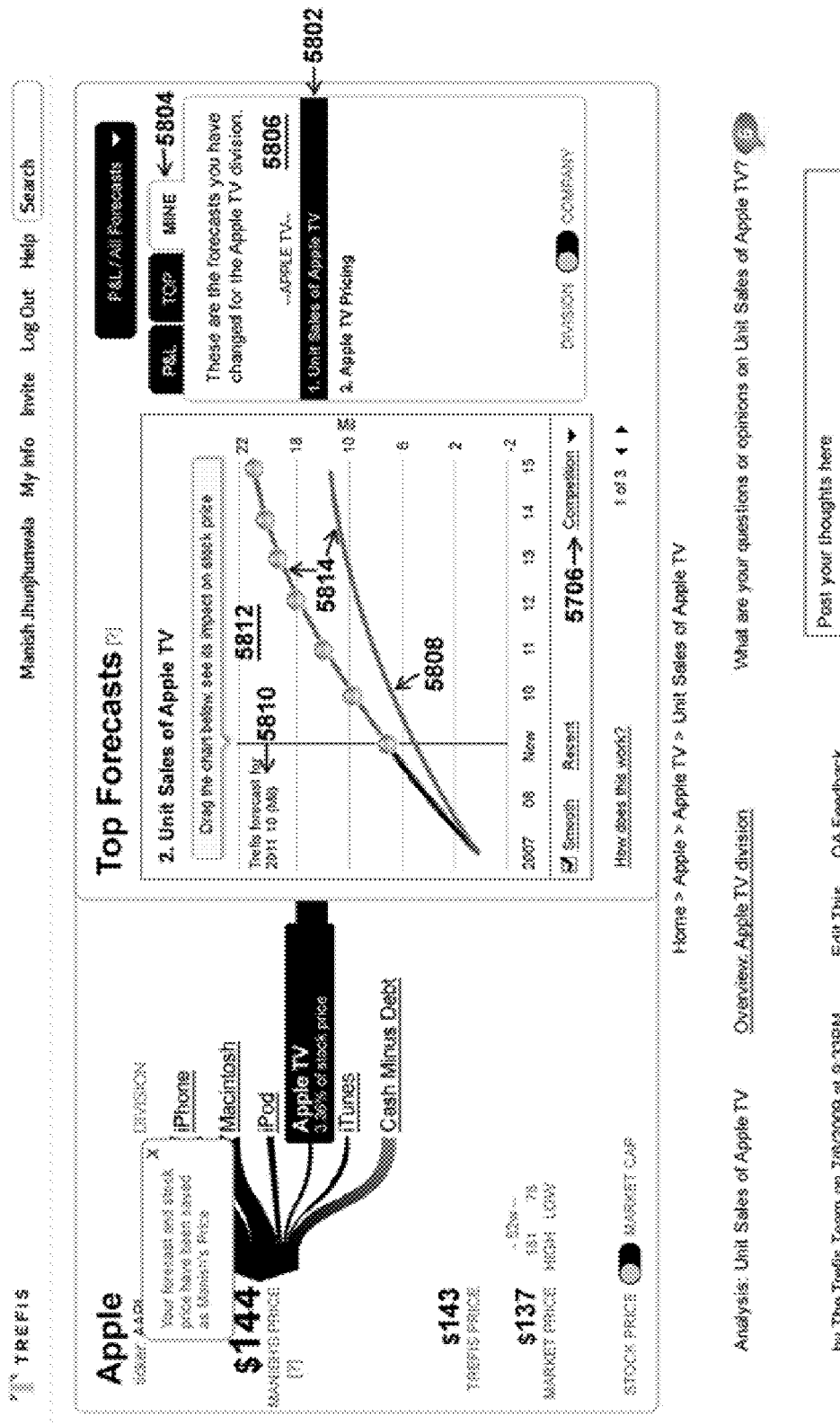

FIG. 58 shows a screen 5800 of a web site page that includes a list of forecasts 5806 under a "Mine" tab 5804. The specific forecast selected is a unit sales forecast 5802. As a result of the selection, corresponding graphs 5814 are displayed in a graph area 5812. The bottom graph 5814 includes the original model estimate's unit sales forecast of 10 million units in the year 2011, as indicated by a caption 5810.

Figure 59:
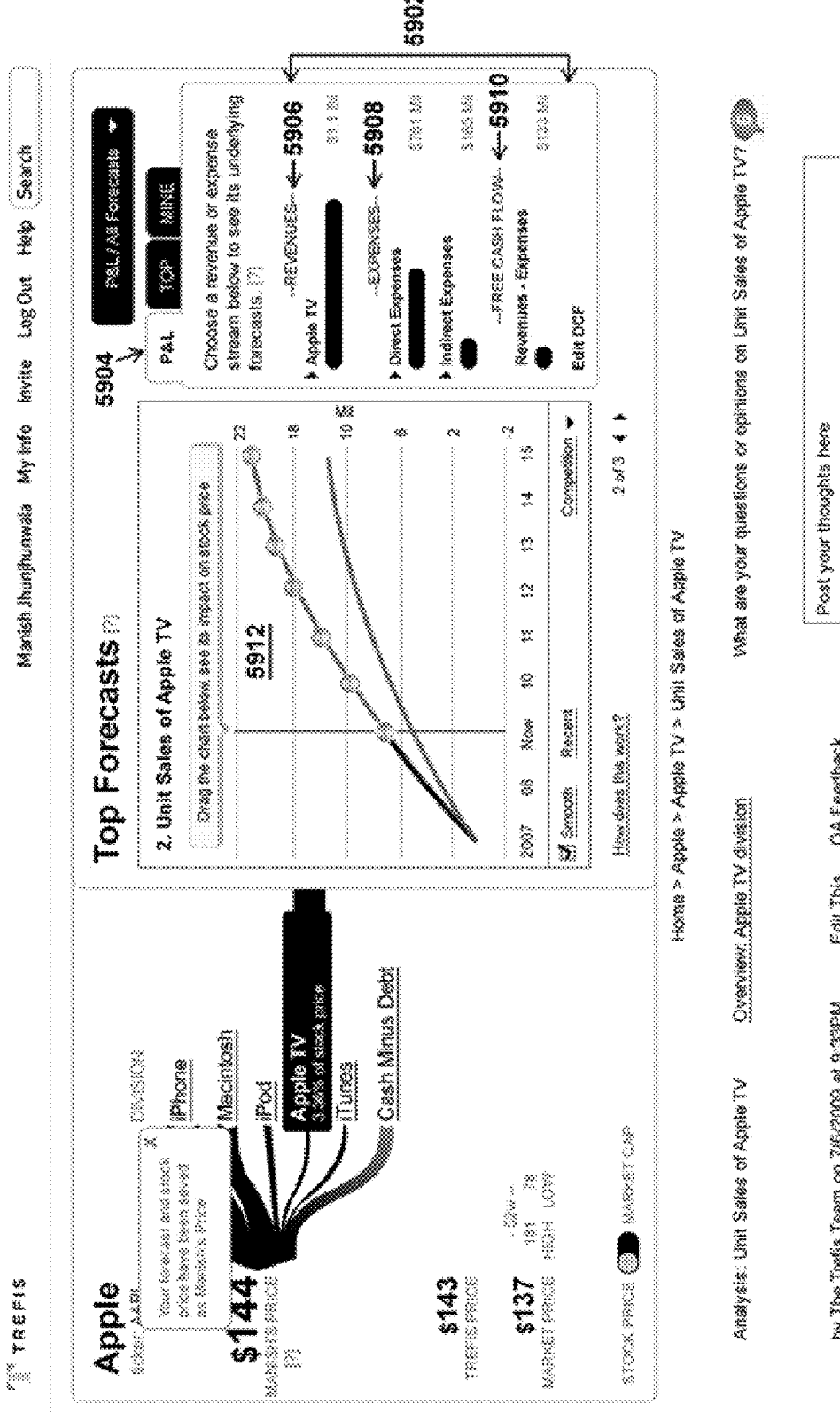

FIG. 59 shows a screen 5900 of a web site page that includes a list of P&L options 5902 under a "P&L" tab 5904. For example, the P&L options 5902 can include revenues 5906, expenses 5908, and free cash-flow 5910. User selection of the options 5902 can affect the graphs displayed in the graph area 5912, such as by adjusting the estimated stock price based on forecasts in revenues 5906, expenses 5908, or free cash-flow 5910, depending on what the user selects.

Figure 60:
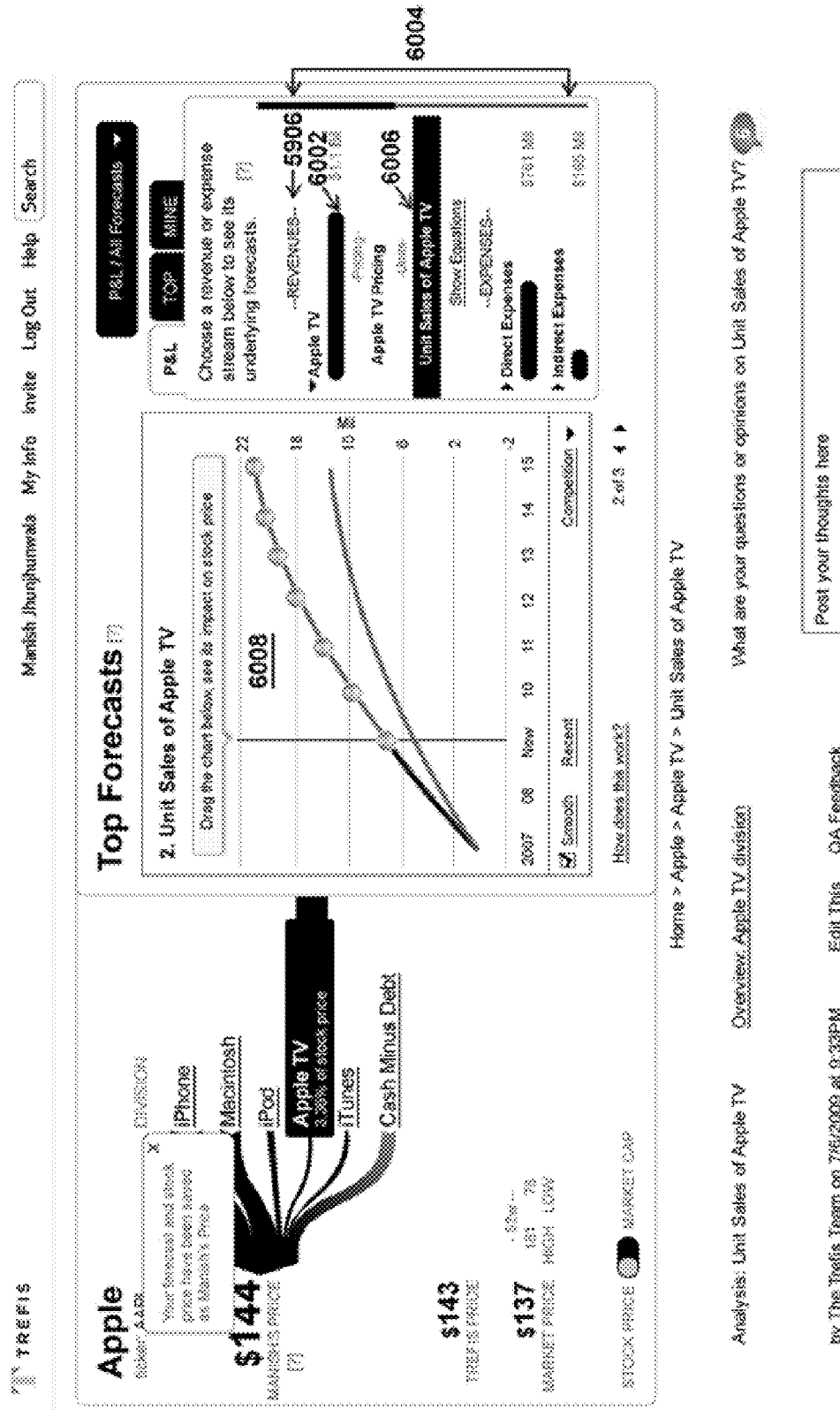

FIG. 60 shows the screen 5900 with a unit sales of Apple TV revenue stream option 6006 selected from the revenues 5906 option. The option 6006 appears, for example, if the control 6002 is selected, resulting in an expanded set of options 6004. By selecting the option 6006, the graph in a graph area 6008 can reflect unit sales of Apple TVs.

Figure 61:
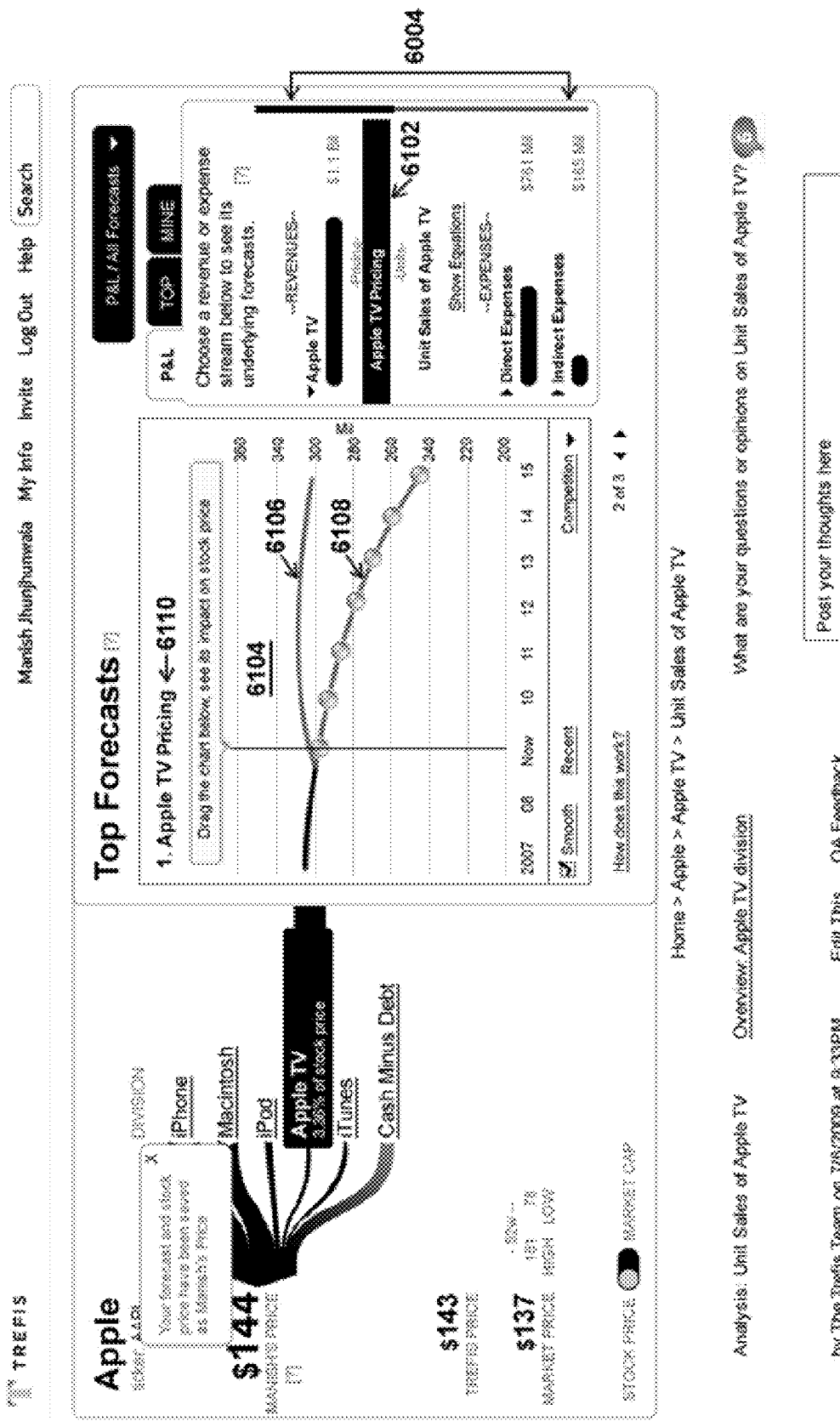

FIG. 61 shows the screen 5900 with an apple TV pricing option 6102 selected from the set of options 6004. Selecting the option 6102 causes graphs 6106 and 6108 to be redrawn or changed in a graph area 6104, reflecting pricing, as indicated by a caption 6110.

Figure 62:
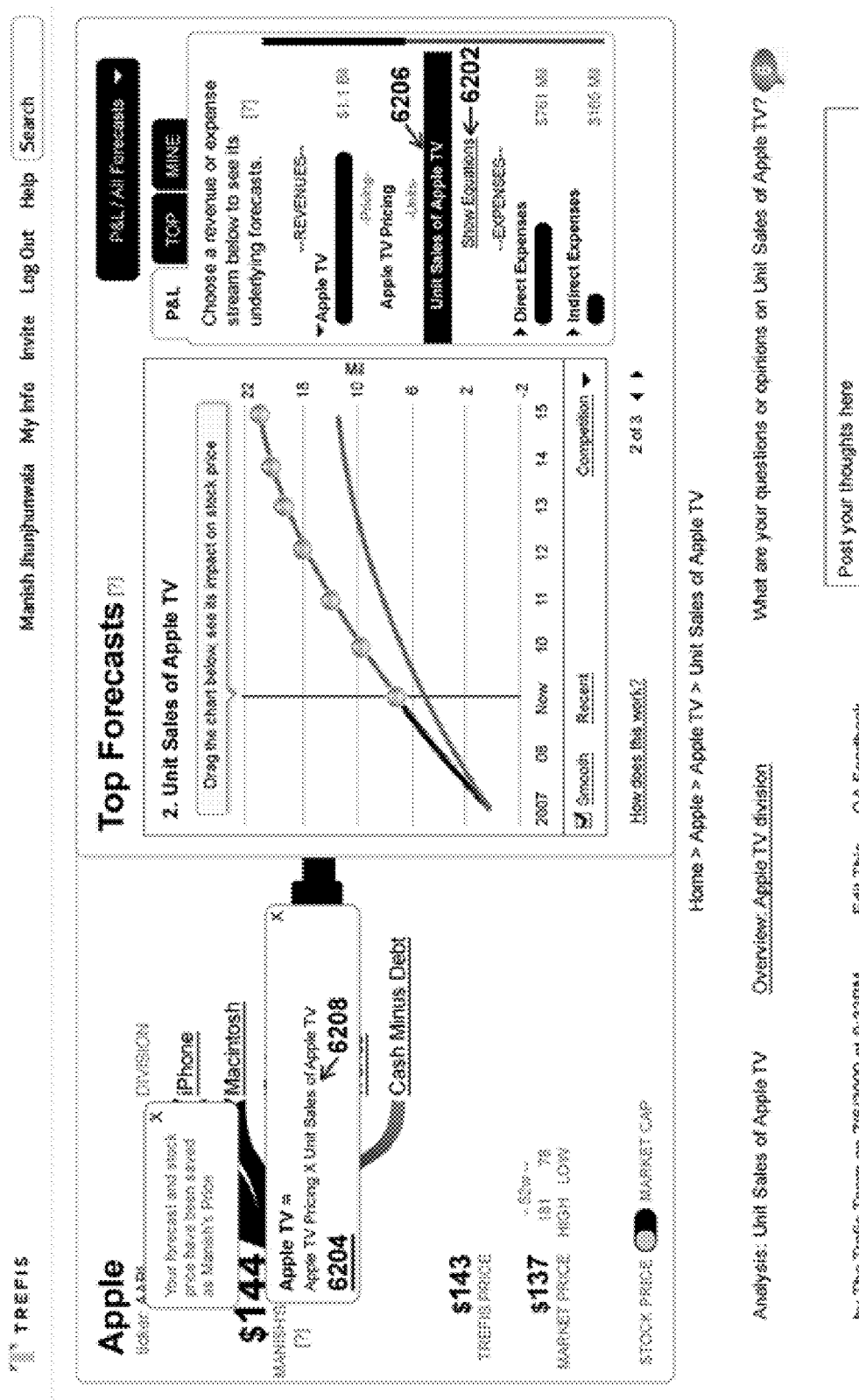

FIG. 62 shows a screen 6200 of a web site page with a show equations control 6202 selected. As a result of selecting the control 6202 while a unit sales option 6206 is selected, an equation popup 6204 is displayed. In this case, an equation 6208 displayed in the equation popup 6204 indicates that Apple TV revenues are based on the mathematical product of pricing times sales.

Figure 63:
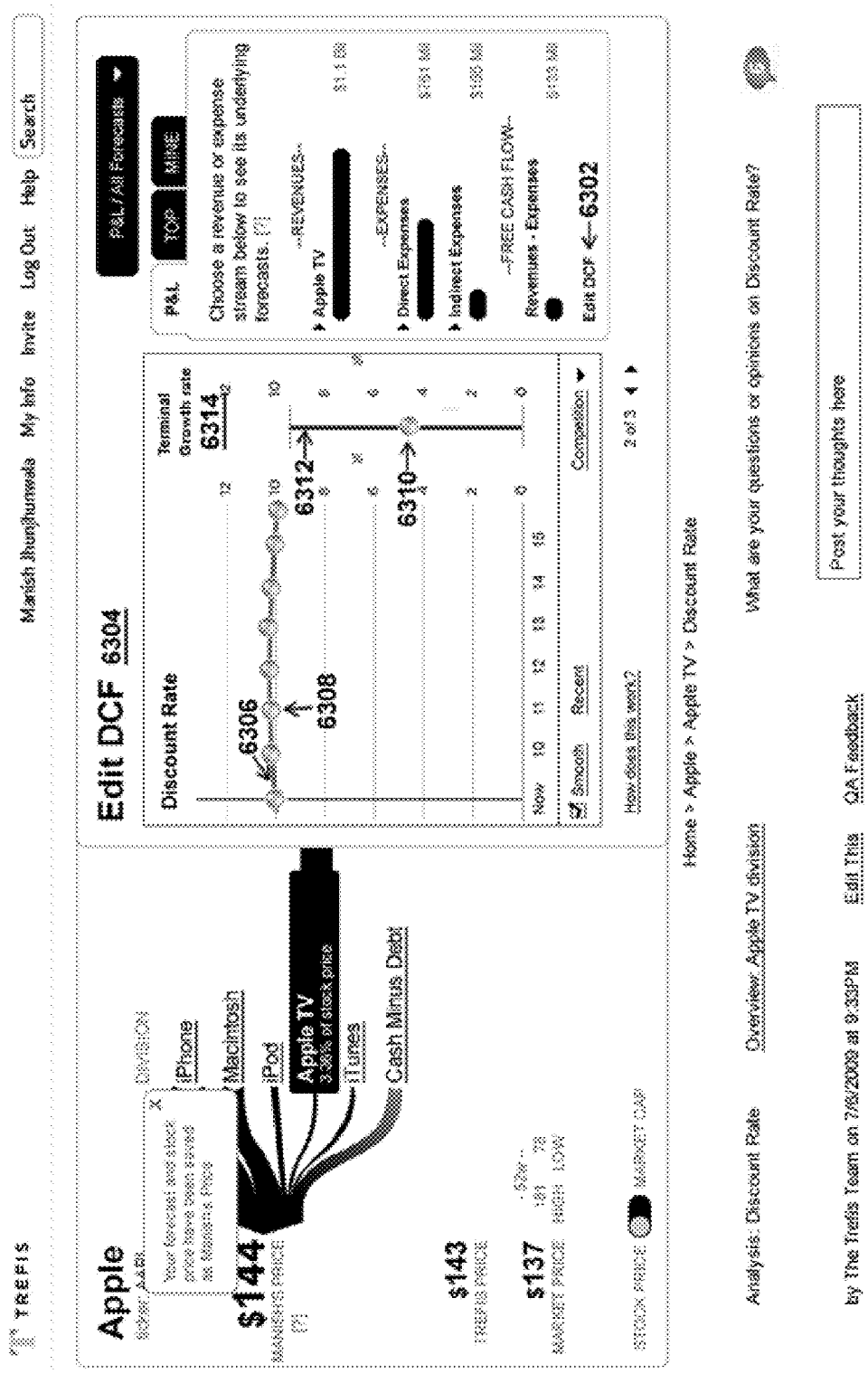

FIG. 63 shows a screen 6300 of a web site page with an edit DCF link 6302 selected for editing discounted cash flow (DCF) values. The edit DCF link 6302 is also shown earlier in FIG. 59, but here it is finally invoked. As a result, an edit DCF area 6304 is displayed. The area 6304 includes a graph 6306 connecting data points 6308 (e.g., discount rates at years 2009, 2010, etc.). The area 6304 also includes a terminal growth rate area 6314 which displays a slide point 6310 on a slide bar 6312 which the user can use to change the terminal growth rate, further affecting estimated stock prices.

Figure 64:
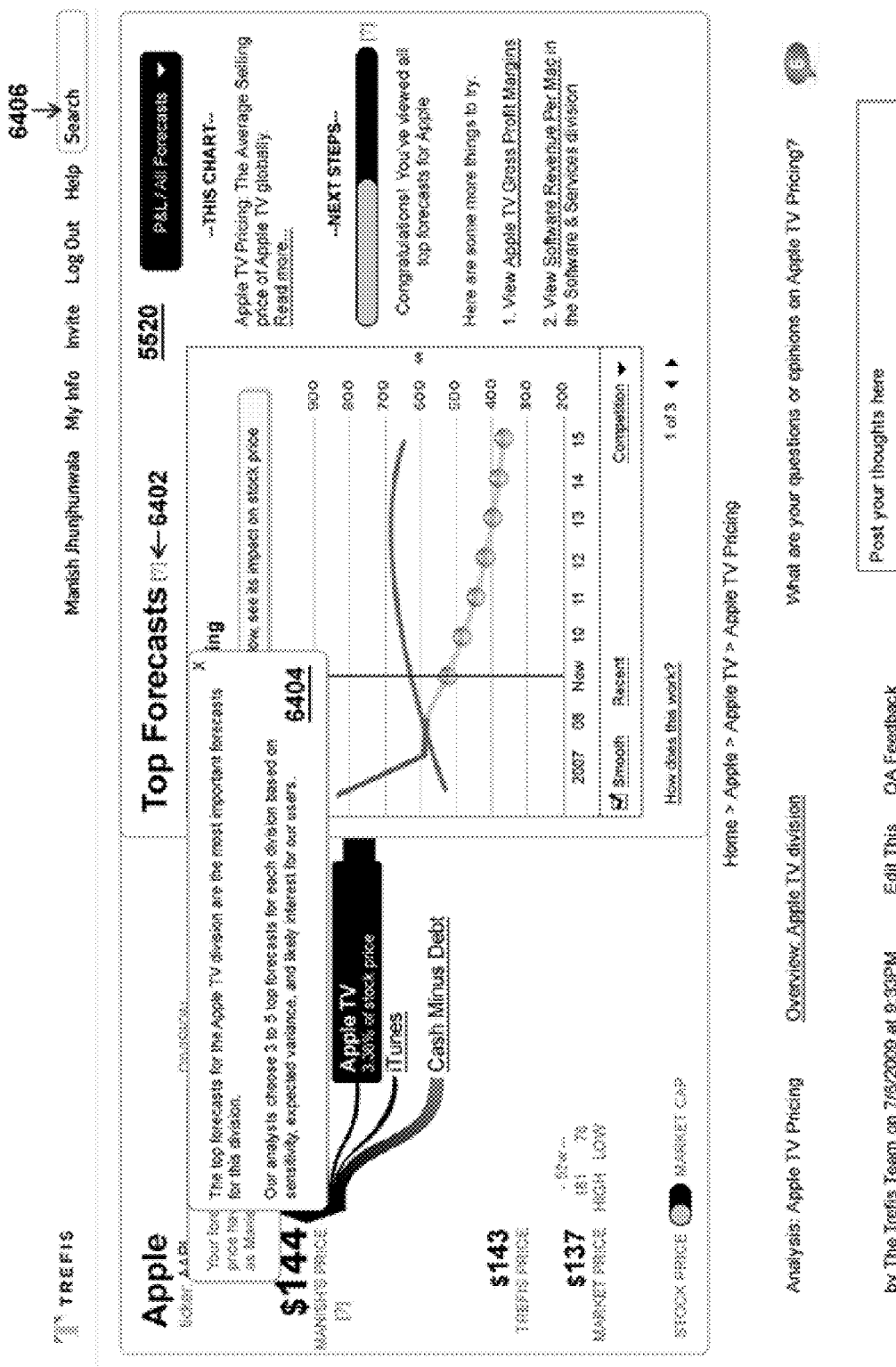

FIG. 64 shows a screen 6400 of a web site page with a contextual help control 6402 selected. The user can select the control 6042, for example, to receive information that describes how top forecasts are generated. As a result, a top forecasts description popup 6404 appears, providing the user with a description, such as how expert analysts have arrived at the top forecasts for a division.

Figure 65:
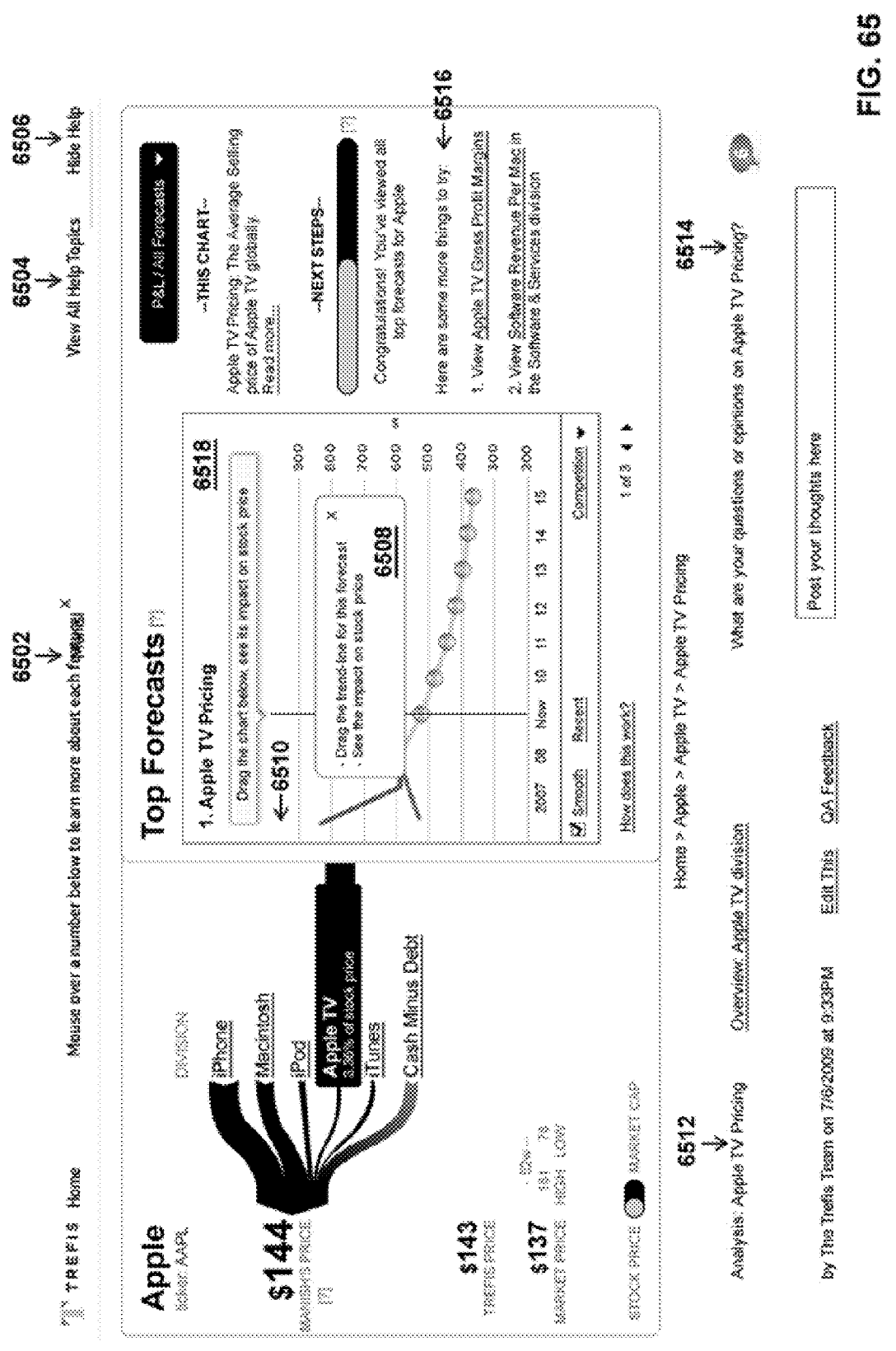

FIG. 65 shows a screen 6500 of a web site page with help activated. For example, the screen shows the effects of the user selecting a help control 6406, as shown on FIG. 64. Help instructions 6502 inform the user how to use the help function. A view all help topics control 6504 can allow the user to see all help topics. A hide help control 6506 can deactivate the help function, returning the screen 6500 to its previous pre-help state. The help function can display help descriptions in popups, such as a popup 6508 that appears, for example, when the user mouses over a number "1" 6510 in a graph area 6518. Other areas in which the user can get help include a number "2" area 6512, a number "3" area 6514, and a number "4" area 6516, each for a different part of the screen 6500.

Figure 66:
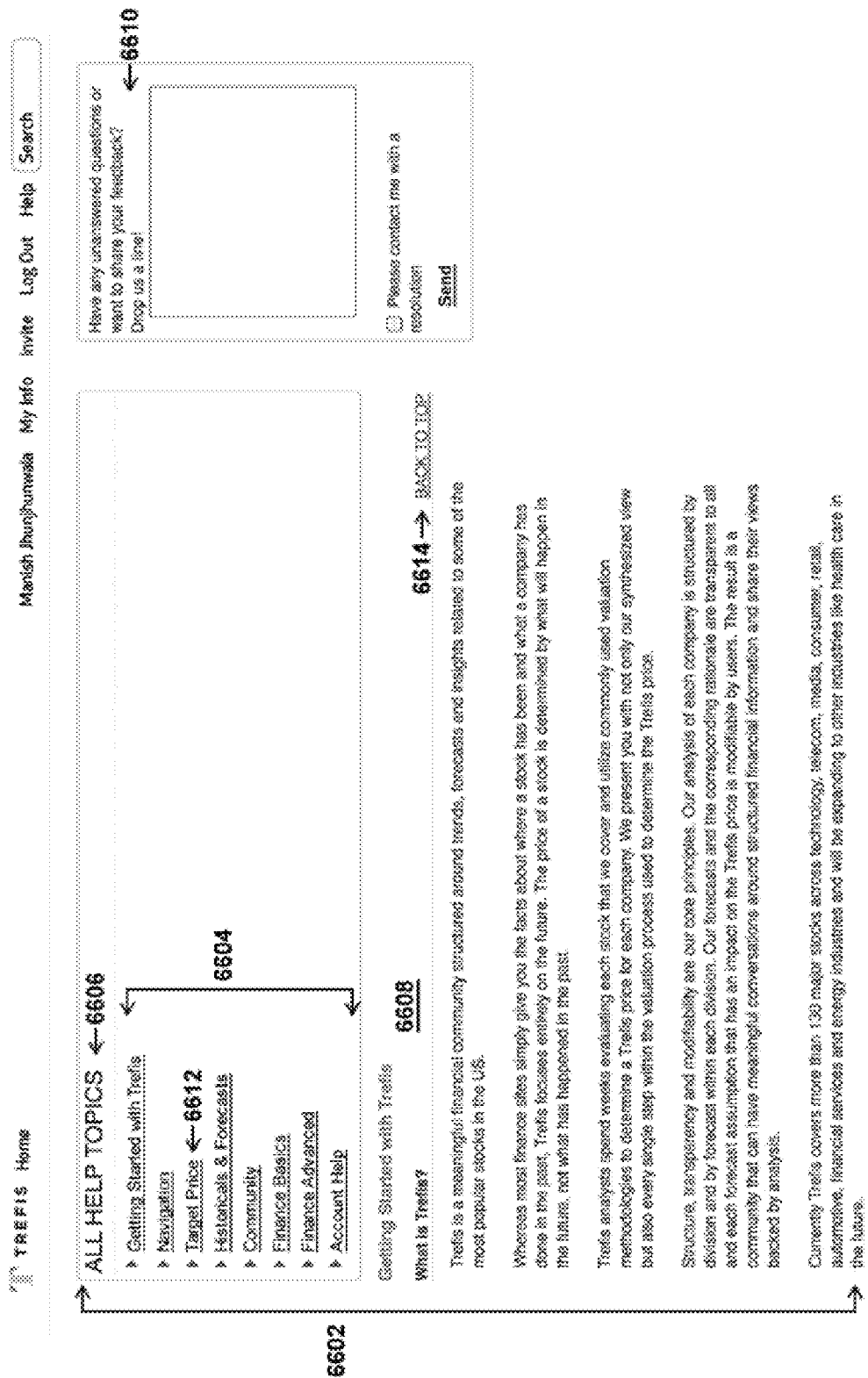

FIG. 66 shows a screen 6600 of a web site page with the view all help topics control 6504 selected. As a result, the displays of estimated prices and forecasting selections are replaced with a help text area 6602. The area 6602 includes a list of help topics 6604 under an all help topics having 6606. The current help topic is displayed in a region 6608 (e.g., "What is Trefis?"). The user can provide feedback (e.g., to the help function administrator) using a feedback area 6610. At any time, the user may display help on a specific topic by selecting the corresponding link in the list of help topics 6604. For example, the user can select a target price link 6612 to display information regarding target prices. The screen 6600 also includes a back to top control 6614 which the user can use at any time to reposition the help text area 6602 to the first help topic (e.g., "Getting Started with Trefis").

Figure 67:
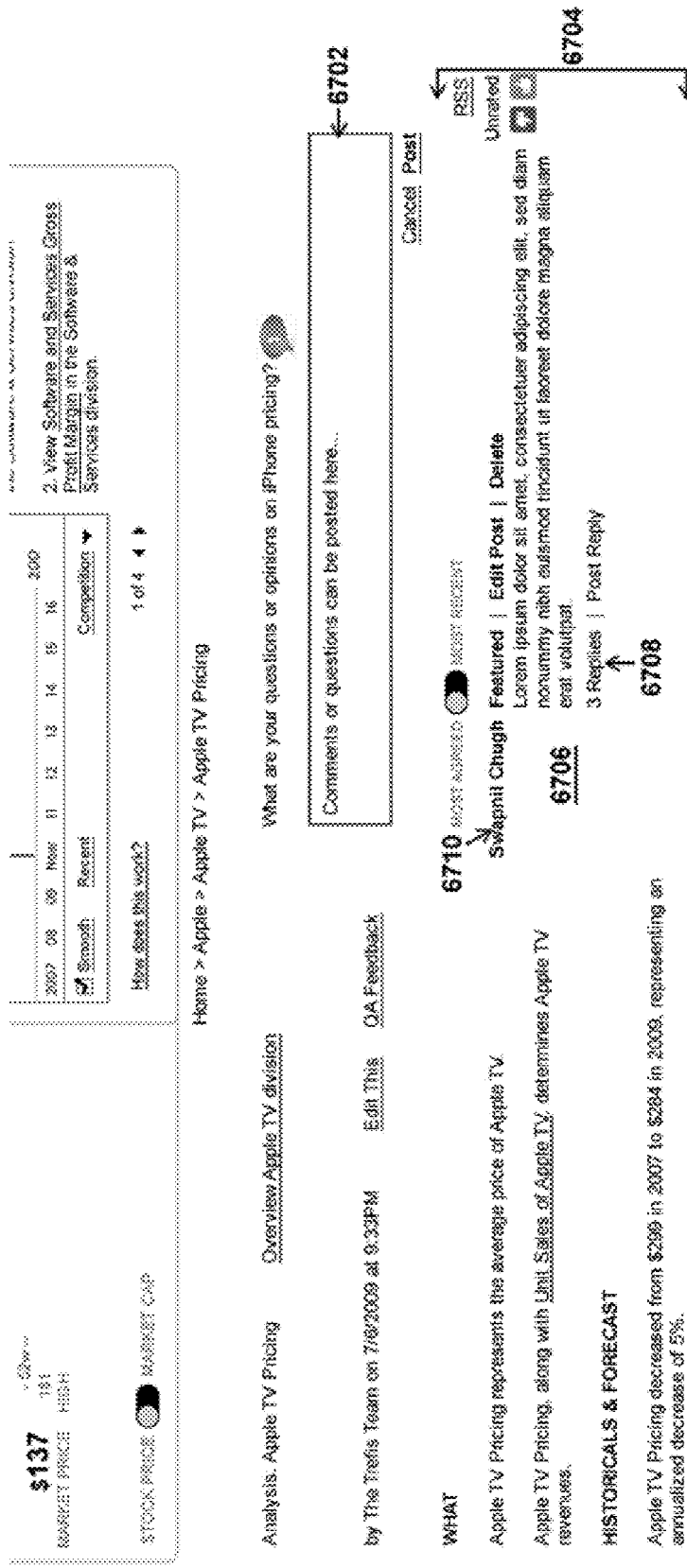

FIG. 67 shows a screen 6700 of a web site page that is transformed due to the action of the user placing the cursor in a comment box 6702. As a result, existing postings and comments 6704 for the current metric shown on the chart (e.g., Apple TV pricing) are displayed. For example, the first comment 6706 by a contributor 6710 is displayed, listing three replies 6708.

Figure 68:
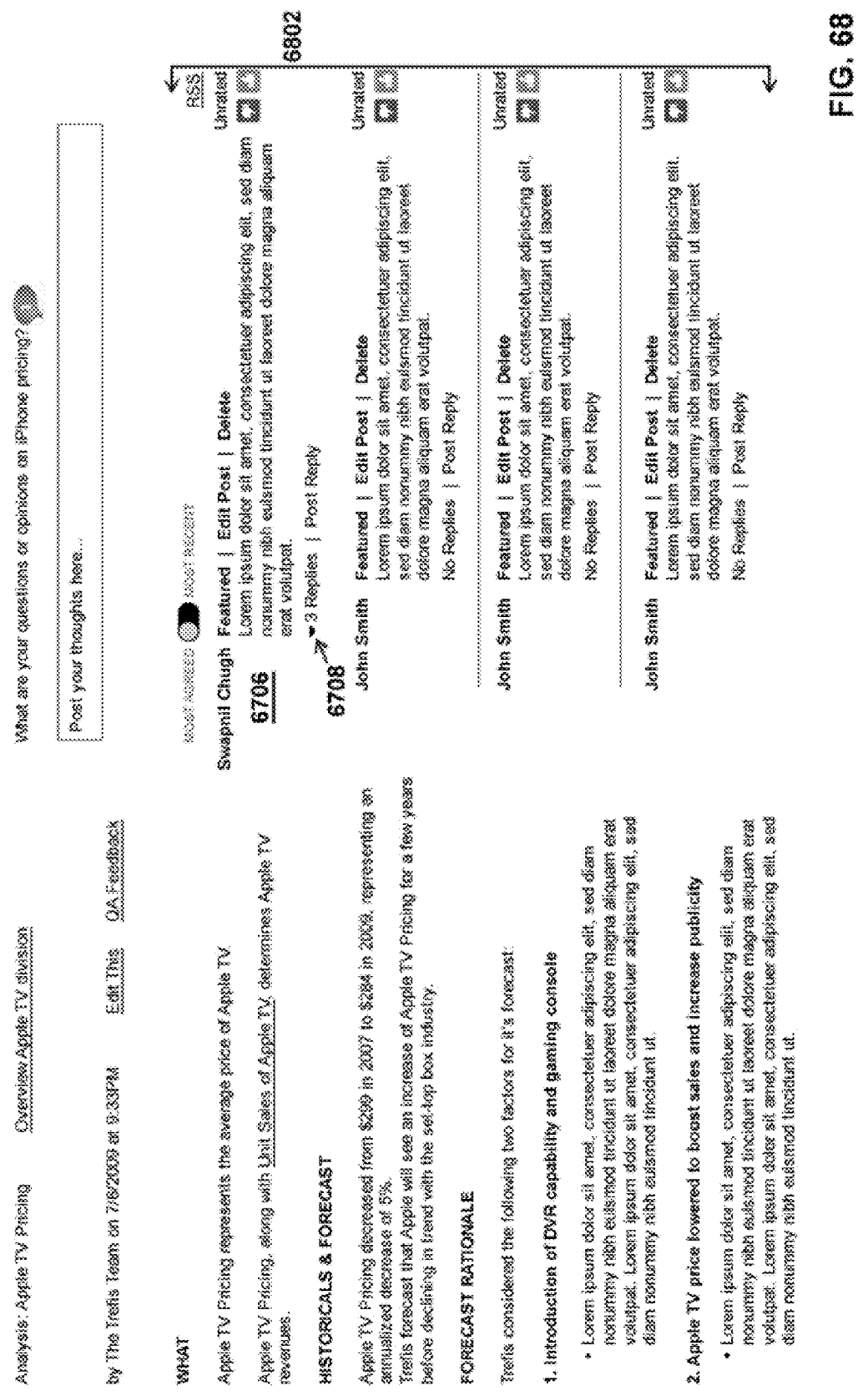

FIG. 68 shows a screen 6800 of a web site page with existing comments expanded. For example, replies 6802 to the comment 6706 are displayed as a result of the user clicking on the three replies control 6708.

Figure 69:
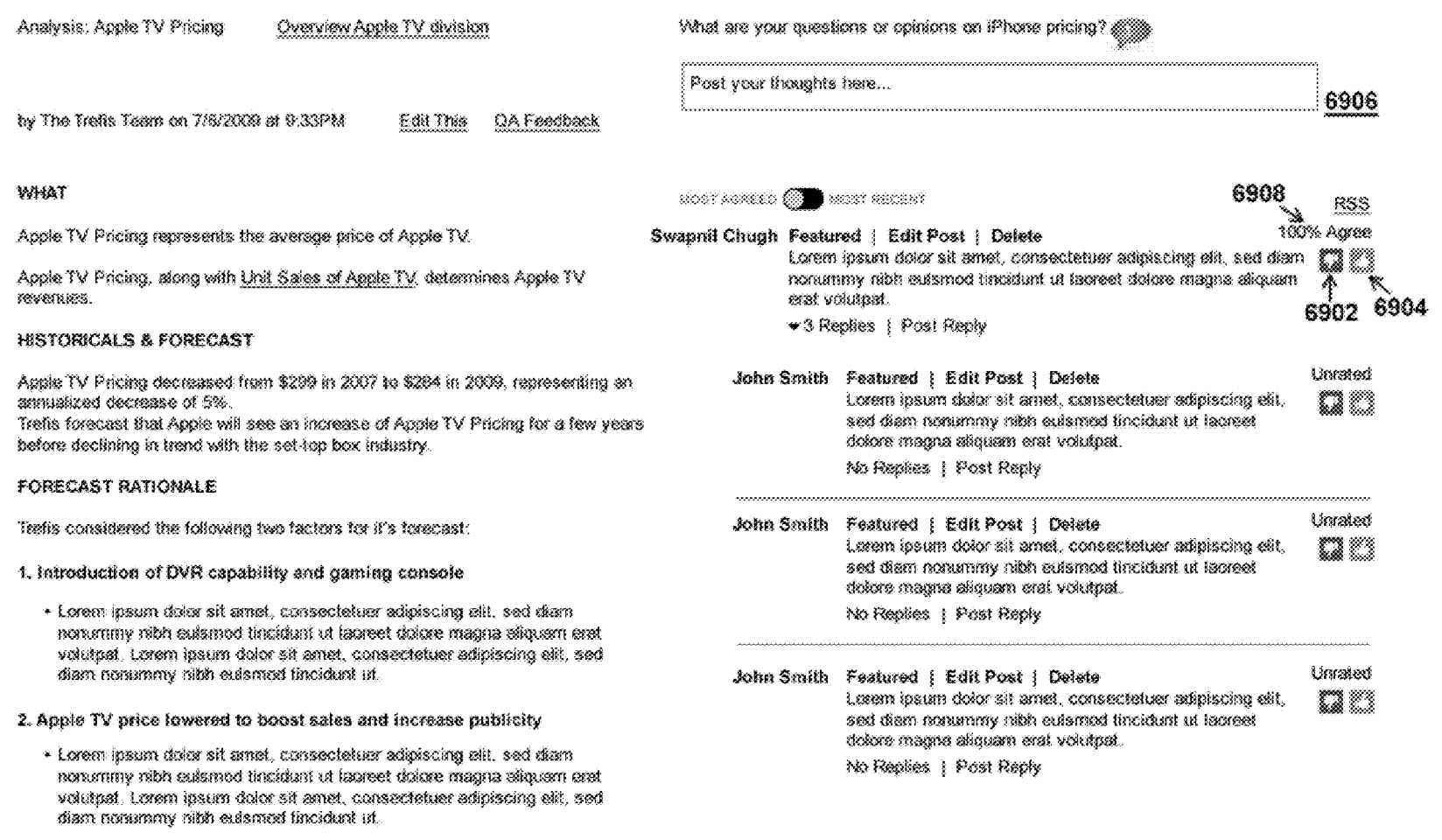

FIG. 69 shows a screen 6900 of a web site page with a thumbs up control 6904 that the user has clicked to show agreement with the comment. Alternatively, the user can select a thumbs down control 6902 to show disagreement with the comment. The user can also post his thoughts in a comment box 6906. The screen 6900 can calculate an agreement percentage 6908 with any particular comment based on the number of thumbs up controls 6904 and thumbs down controls 6902 selected for a comment. For example, the agreement percentage 6908 indicates 100 percent agreement.

Figure 70:
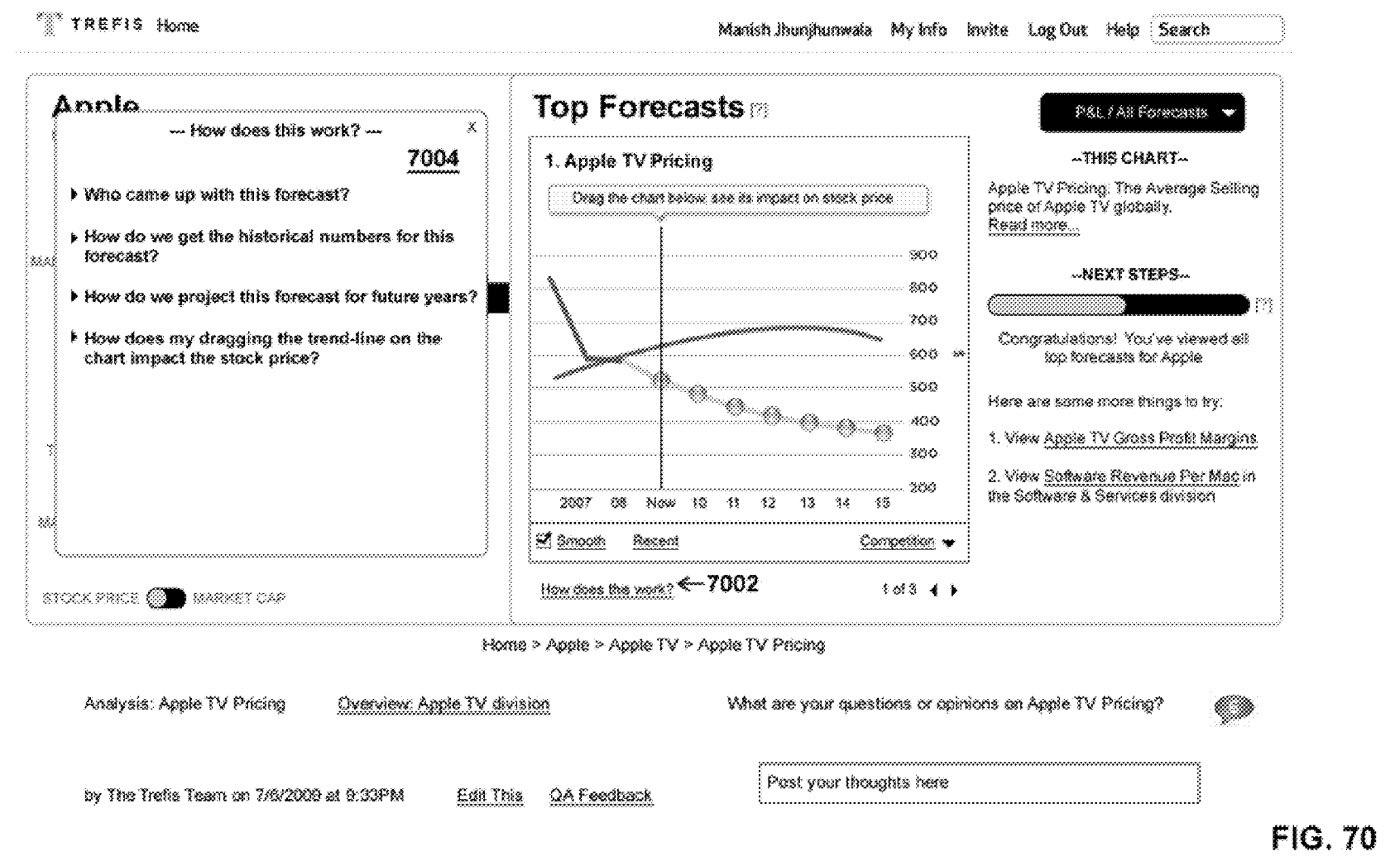

FIG. 70 shows a screen 7000 of a web site page with a "How does this work?" control 7002 selected. The user may select the control 7002, for example, if something on the screen 7000 is confusing or needs more explanation. Upon selecting the control 7002, a popup 7004 appears. The popup 7004 can describe, for example, how forecasts are derived, how historical information is used, how future projections are made, and how dragging graphs or other controls on the chart can effect the numbers (e.g., estimated stock prices).

Figure 71:
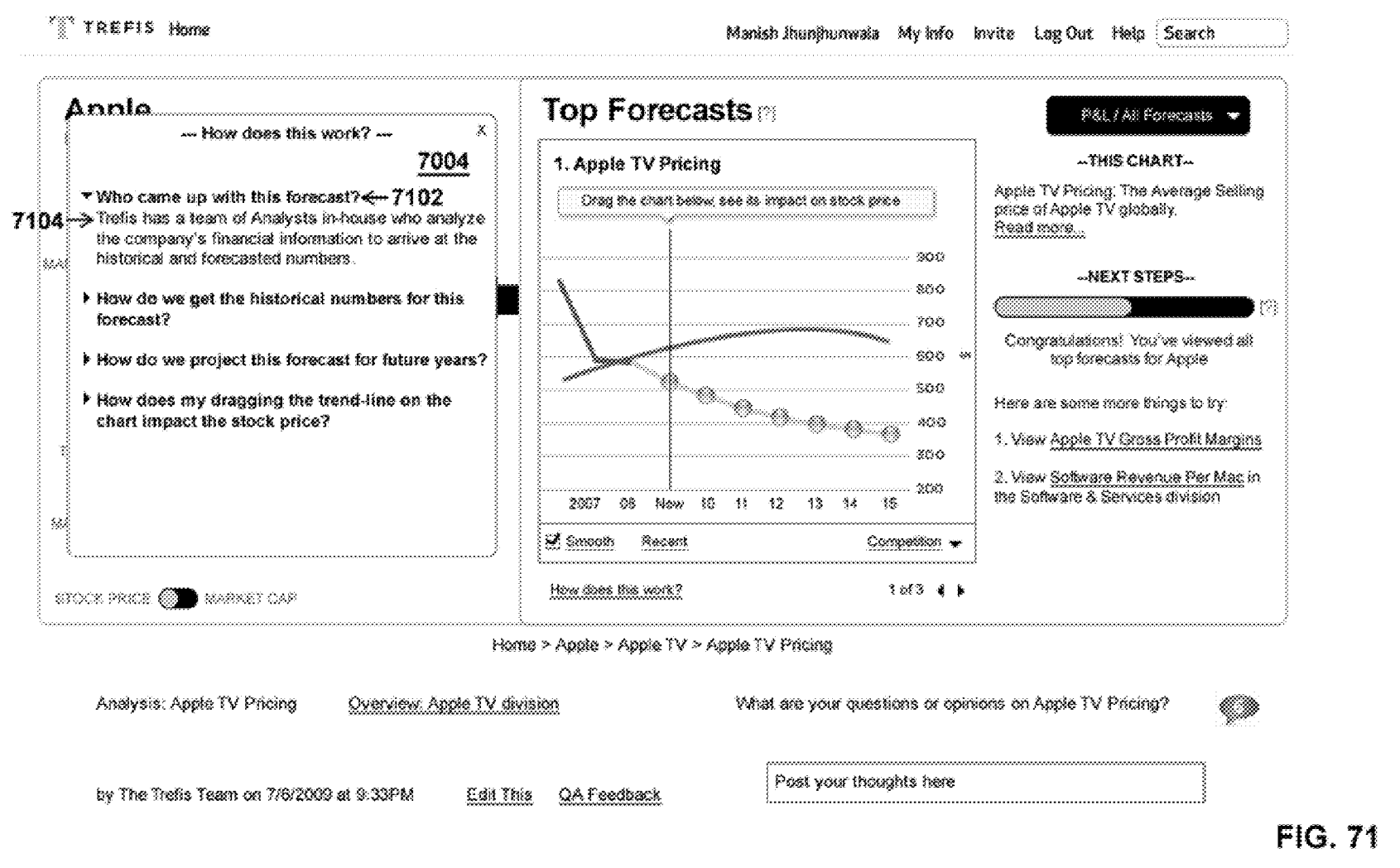

FIG. 71 shows a screen 7100 of a web site page with a "Who came up with the forecast?" link 7102 selected in the popup 7004. As a result, descriptive text 7104 is displayed that identifies the financial analysts and their processes. The text 7104 displayed corresponds to the link 7102. The user can re-click the link 7102 to hide or dismiss the descriptive text 7104.

Figure 72:
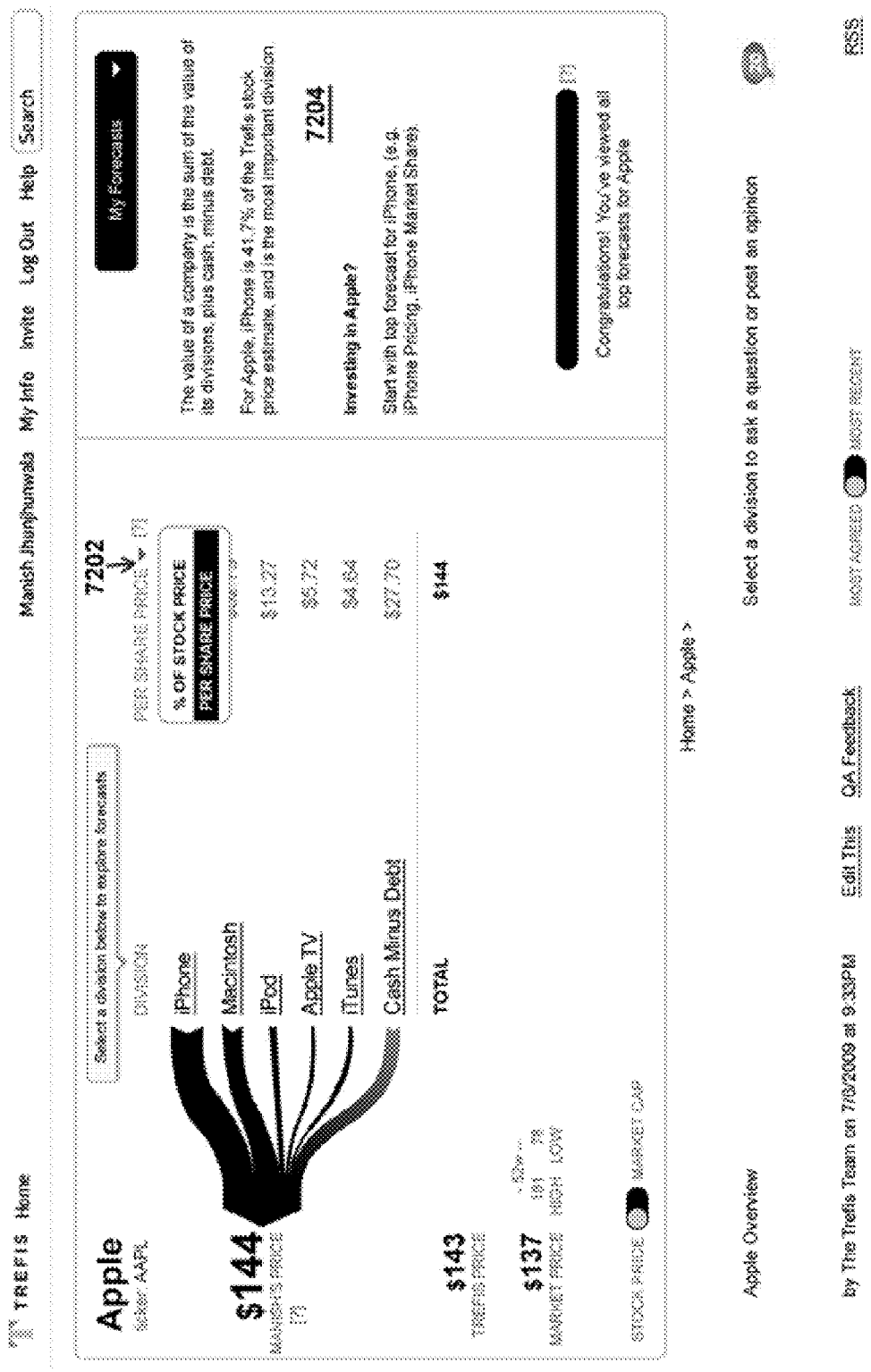

FIG. 72 shows a screen 7200 of a web site page with a per share price control 7202 selected. This is in contrast to displaying the percentage contribution of each product to the overall share price (described above) which is selectable here using "% OF STOCK PRICE." As a result of selecting the per share price control 7202, the values 7206 are dollar amounts instead of percentages. A descriptive text area 7204 provides the user with a general explanation of per share price values 7206.

Figure 73:
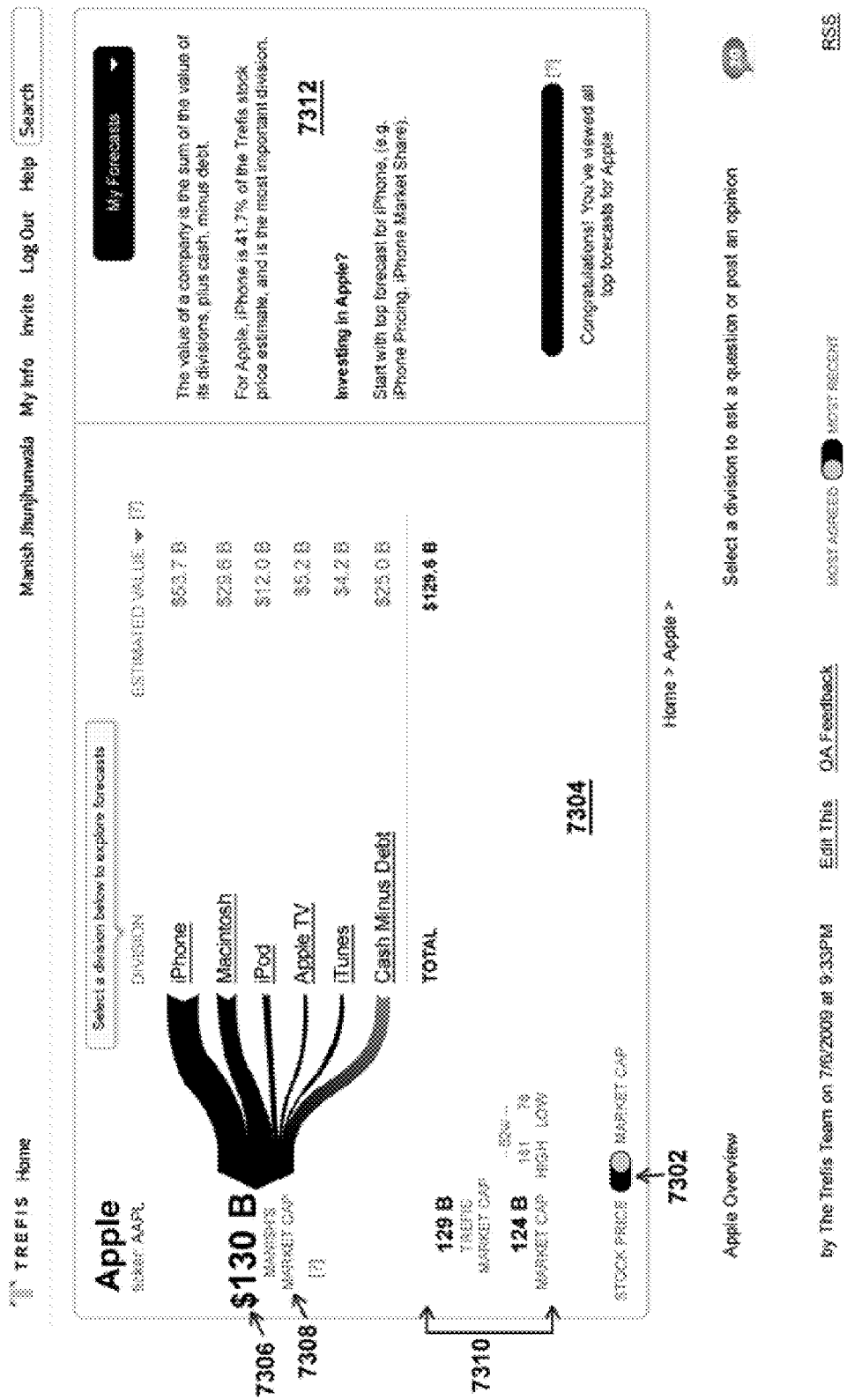

FIG. 73 shows a screen 7300 of a web site page in which a market cap control 7302 is selected. In previous examples, the user selection is stock price. With the market cap control 7302 selected, the values 7304 that are displayed are market cap values, displayed in billions of dollars. The values 7304 are totaled as a market cap valuation for the company 7306. A label 7308 further identifies the numbers as market cap numbers. The remaining displays 7310 are also presented as market cap numbers. A descriptive text box 7312 may provide the user with general information regarding market cap numbers, presented in ways similar to those described above for the stock price numbers.

Figure 74:
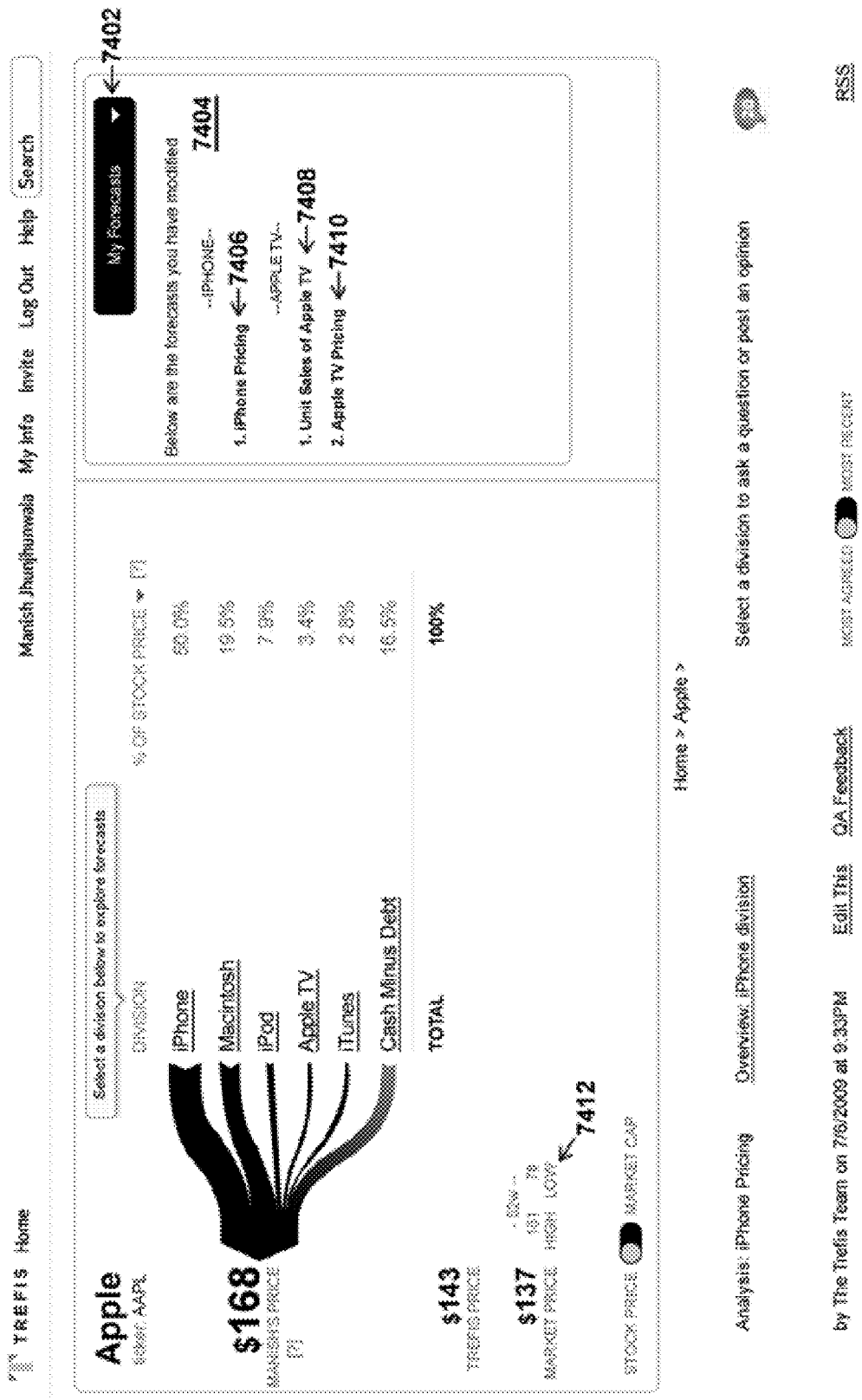

FIG. 74 shows a screen 7400 of a web site page with a "My Forecasts" control 7402 selected. As a result of selecting the control 7402, current user-defined forecasts are displayed in a forecasts area 7404. For instance, these forecasts can be the forecasts that the user has modified. For example, the user's current forecasts include an iPhone pricing forecast 7406, a unit sales of Apple TVs forecast 7408, and an Apple TV pricing forecast 7410.

Figure 75:
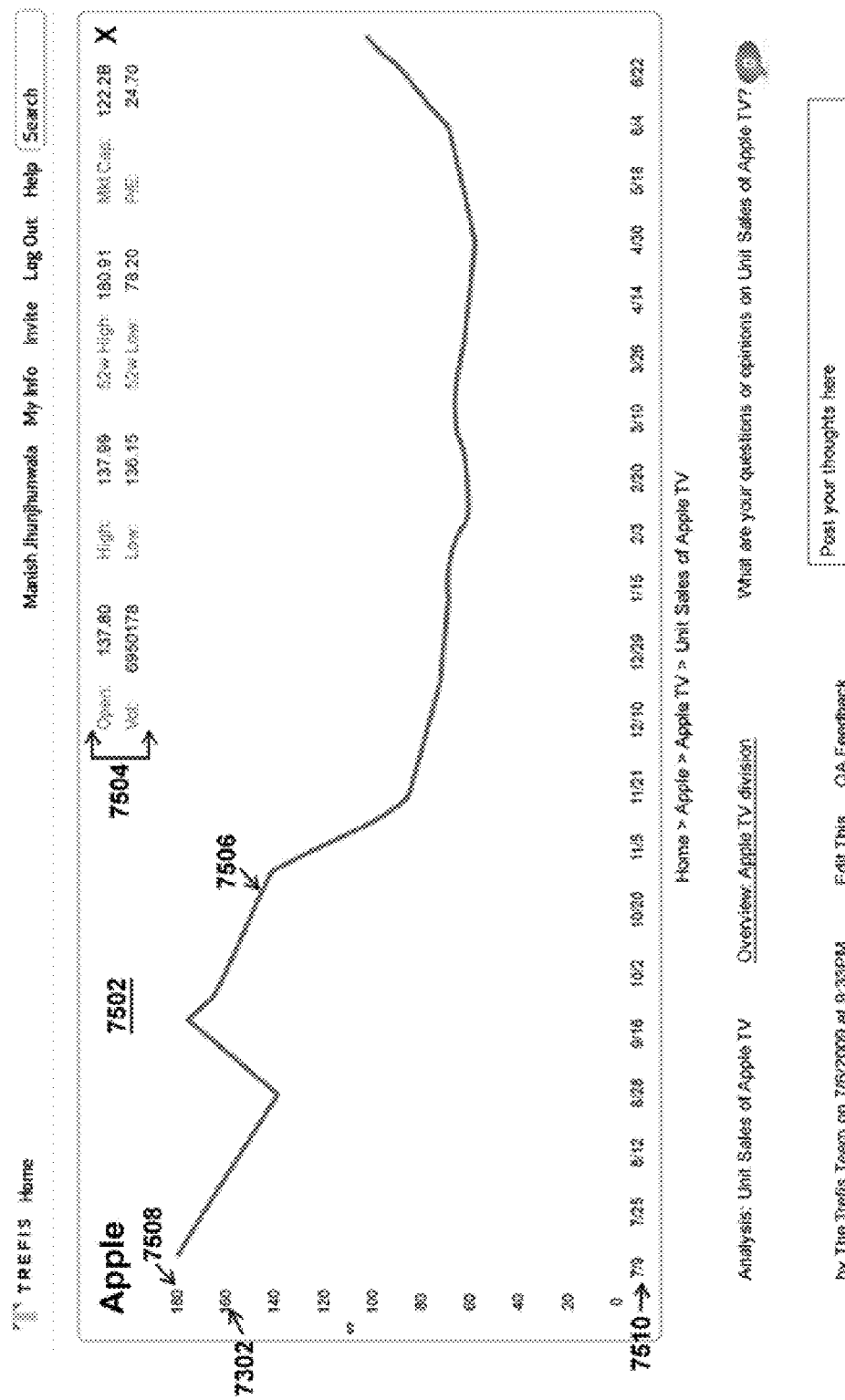

FIG. 75 shows a screen 7500 of a web site page with a 52-week high/low link 7412 selected, as shown in FIG. 74. The combined area including the market price 137 and the 52 wk high low can serve as a single link that can be used to invoke this market price chart. As a result, a high/low display 7502 appears. The display 7502 includes a graph 7506 showing that change in the stock price over time, as indicated by a vertical stock price axis 7508 and a horizontal time axis 7510. The high/low display 7502 also includes a stock summary area 7504 that lists the stock's opening price, trading volume, high and low prices for the day, 52-week high/low prices, market cap, and the price-to-earnings (PE) ratio.

The display 7502 feature that graphically shows the stock price over time is an improved version of what is described with respect to FIG. 16 above as 482. This version is better because it allows the user to see a pricing trend without having to focus on numbers or changes to numbers over time. In general, the graphical displays shown in FIGS. 34 through 84 provide the advantage of displaying information to the user in an easy-to-understand format.

Figure 76:
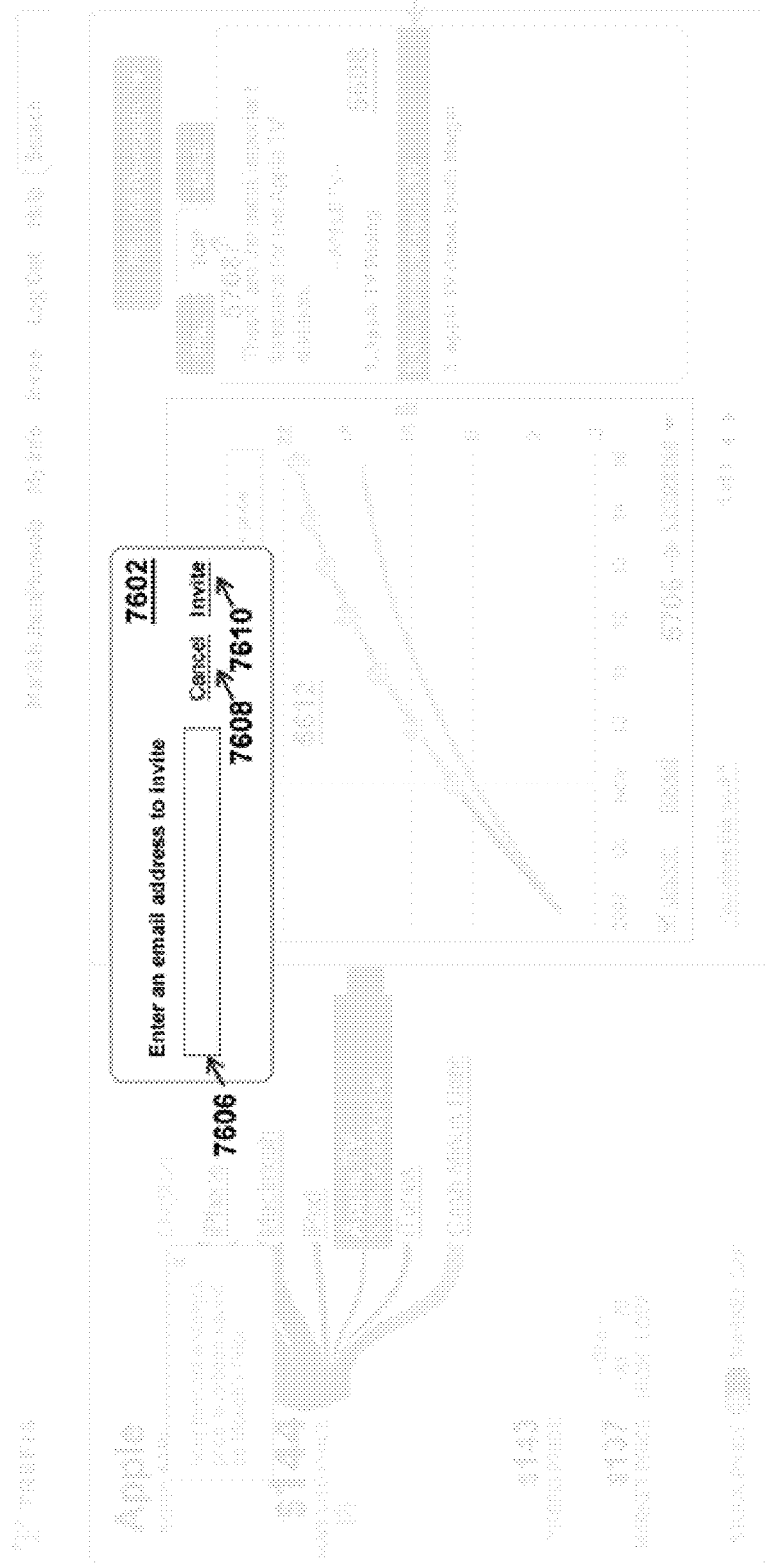

FIG. 76 shows a screen 7600 of a web site page with an invite link 7604 selected. As a result, an invite popup 7602 appears in which the user can type in an email address (e.g., the email address of a friend, etc.) in an email address field 7606. Upon specifying the email address, the user can select an invite control 7610 to submit the information, initiating an invitation to the person corresponding to the email address field 7606, or the user can select a cancel control 7608 to exit the popup 7602.

Figure 77:
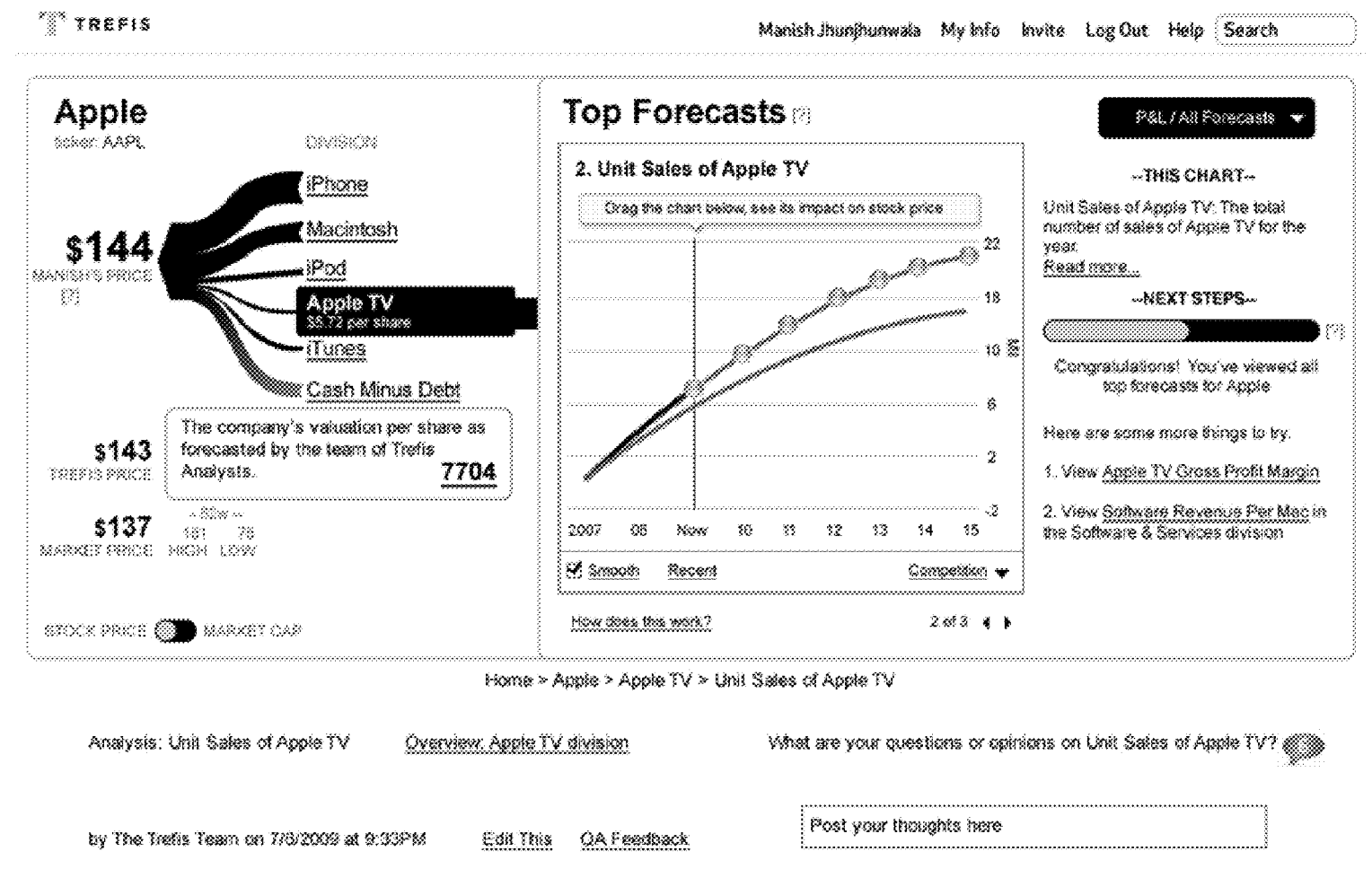

FIG. 77 shows a screen 7700 of a web site page in which the user has moused over a Trefis price 7702. As a result, a popup 7704 appears that explains the company's valuation per share as forecasted by the Trefis analysis team.

In some implementations, in the screen 7700 and other screens described herein, addition or drill-down data can be displayed in other ways in addition to mousing (or hovering) over the data. Other implementations of viewing additional information can include combinations of mouse-clicks (e.g., on links, options, etc.), right mouse-clicks, etc.

Figure 78:
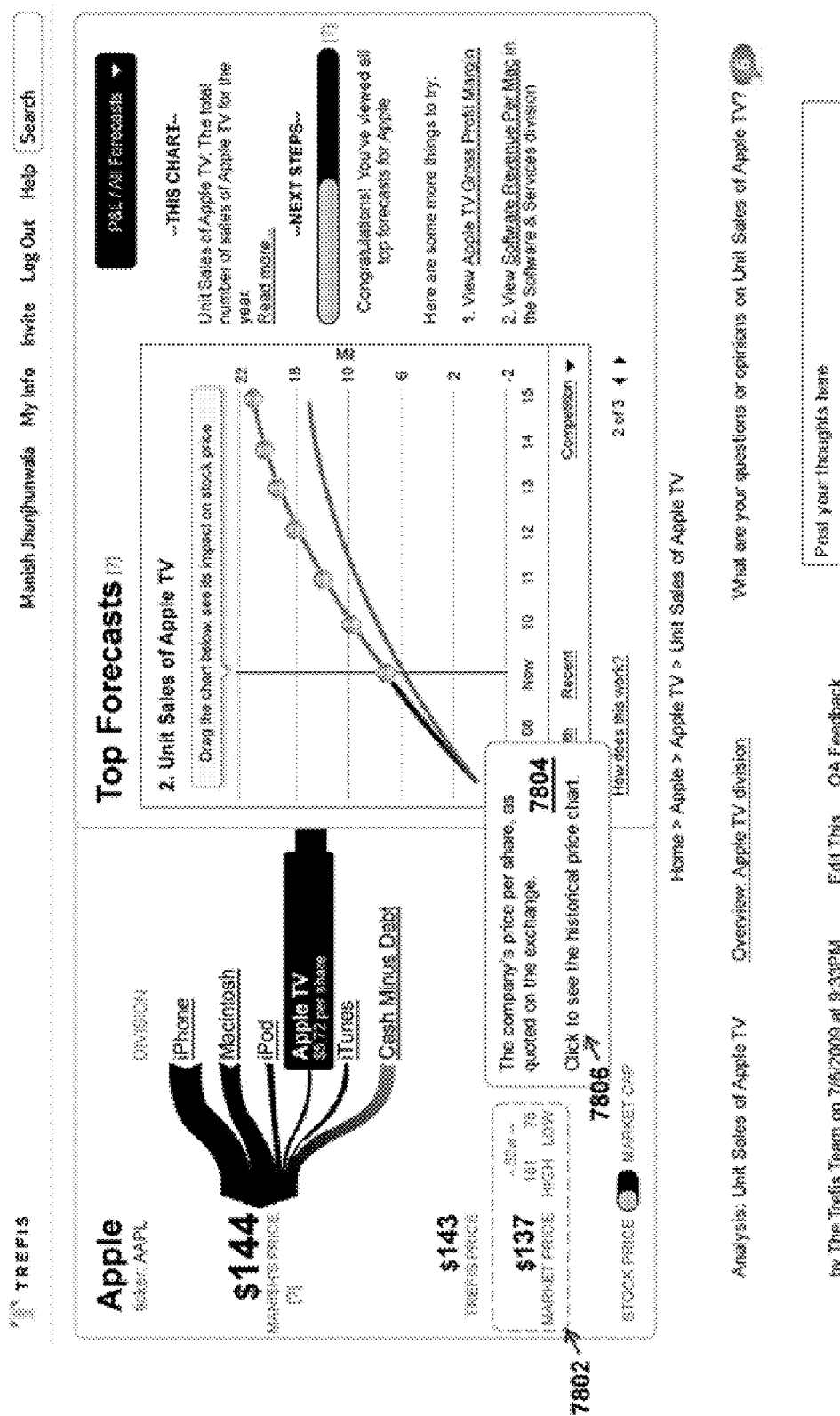

FIG. 78 shows a screen 7800 of a web site page in which the user has moused over a market price 7802. As a result, a popup 7804 appears that explains market price in general terms. The user can click on a 7806 to display a historical price chart (not shown in FIG. 78) related to market price, such as a line graph of market price over time (e.g., by years, months, etc.).

Figure 79:
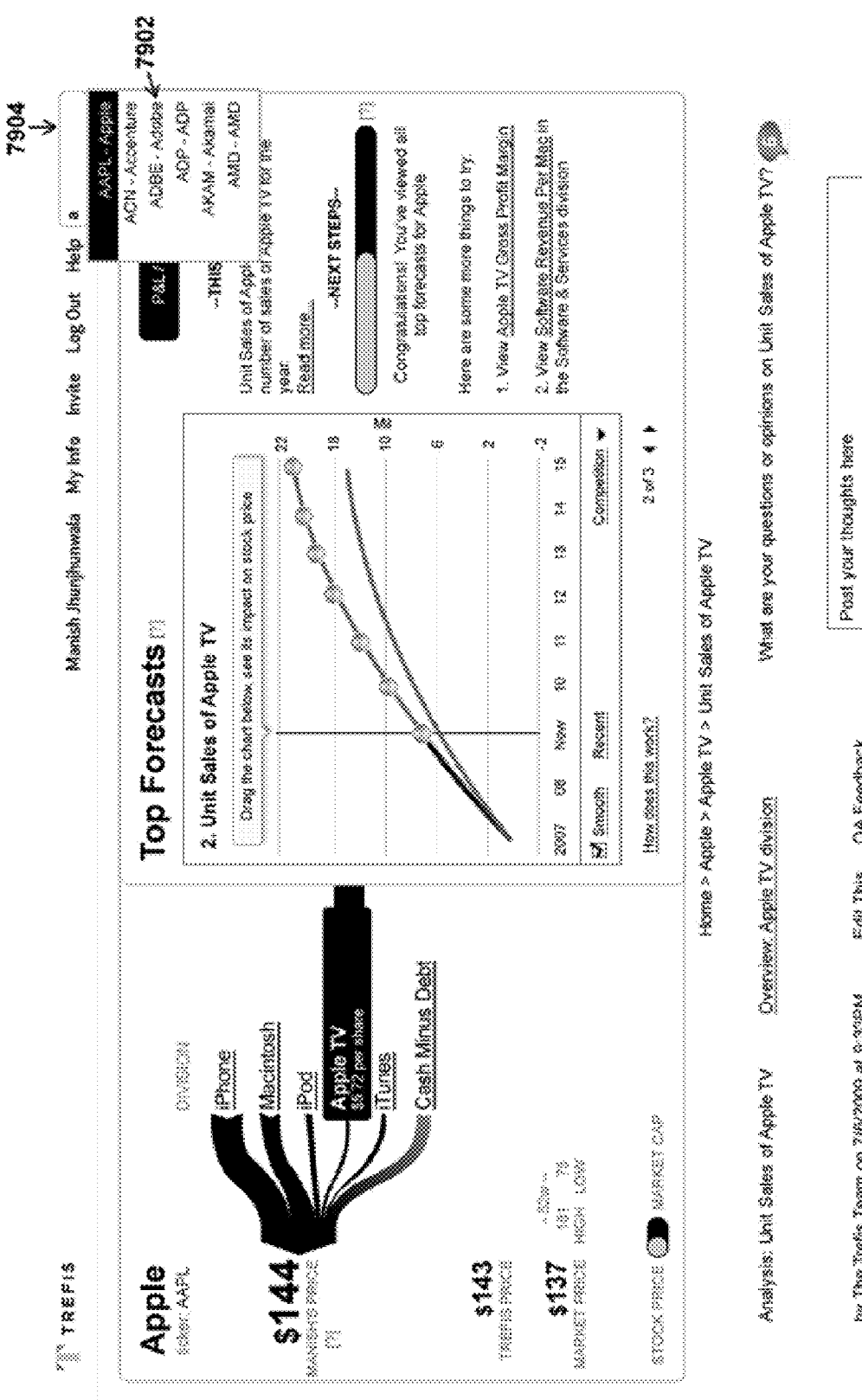

FIG. 79 shows a screen 7900 of a web site page in which the user has clicked into a search box 7904 to search for other companies. For example, the user can enter an "a" in the search box 7904 to display a list 7902 of companies staring with the letter "a" including a currently displayed company 7906 (e.g., Apple). The user can scroll through the list 7902 and use the mouse or keyboard controls to select the desired company.

Figure 80:
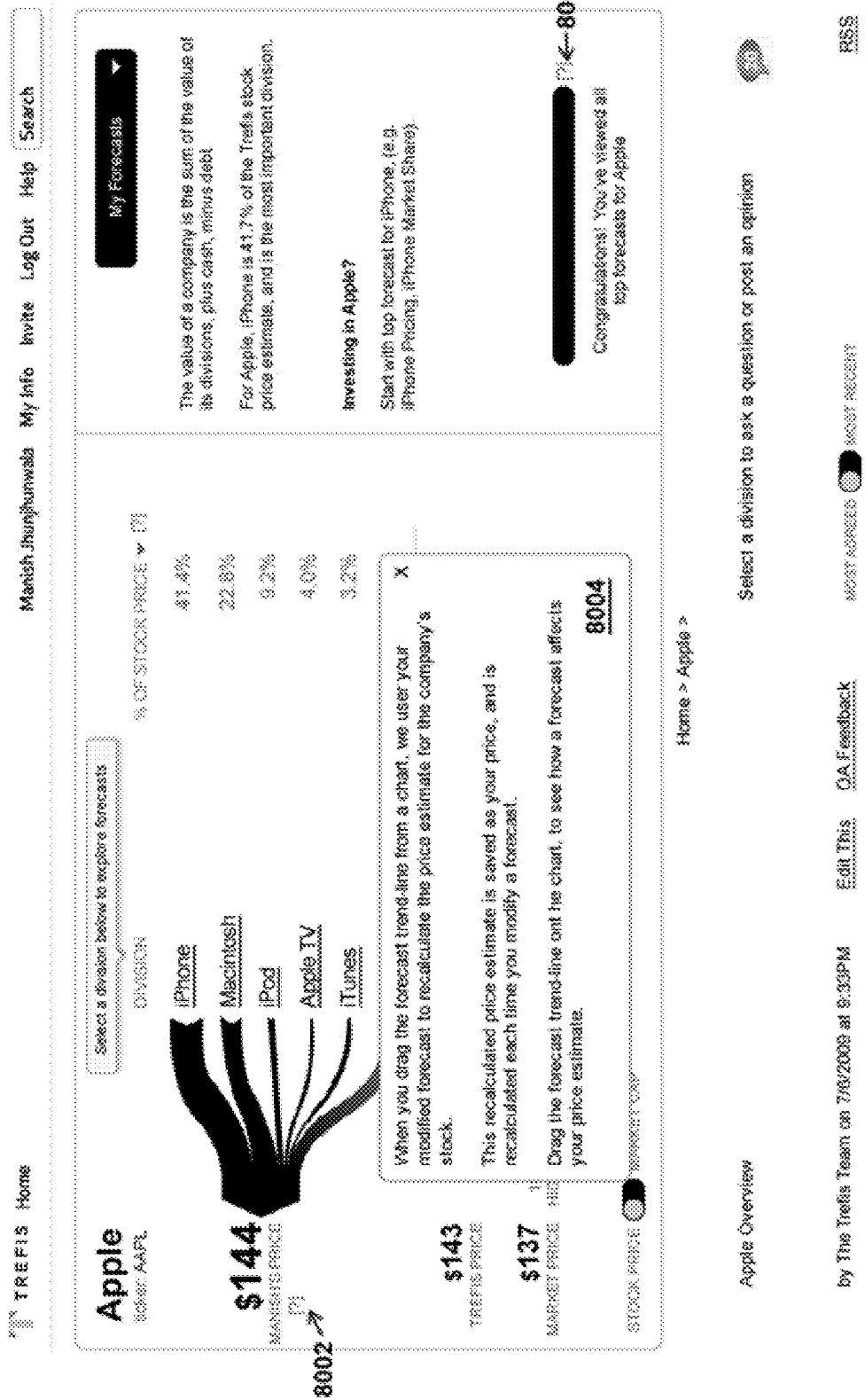

FIG. 80 shows a screen 8000 of a web site page in which the user has selected a contextual help control 8002. As a result, a popup 8004 can be displayed, explaining what happens, for example, when the user drags forecast lines (e.g., up and down), how estimated stock prices are recalculated, etc.

Figure 81:
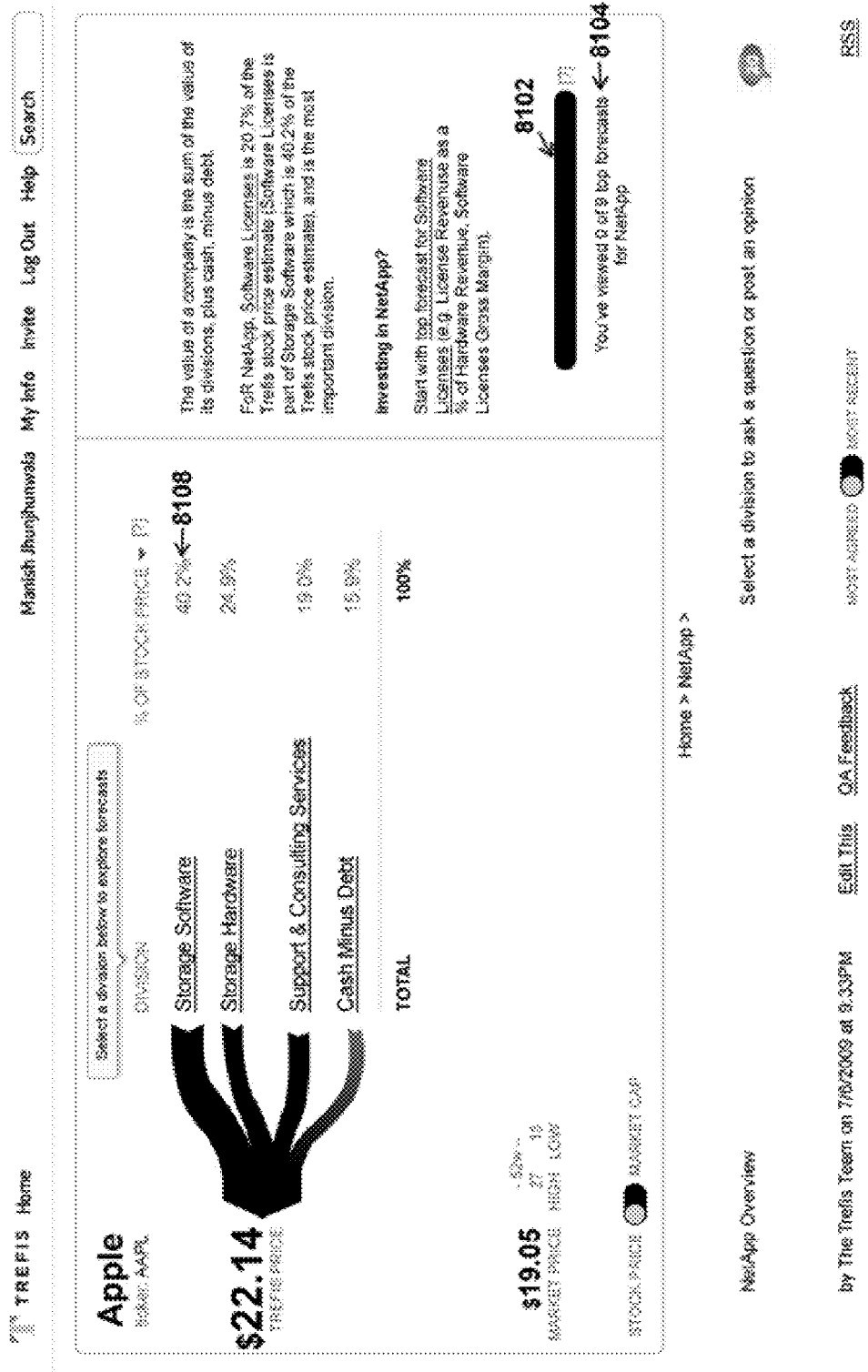

FIG. 81 shows a screen 8100 of a web site page that includes a progress bar 8102 indicating the user's progress in viewing forecasts related to a company. For example, the progress bar 8102 can be shaded in a left-to-right direction over time as the user completes forecasts. In this example, the progress bar 8102 is shown as entirely un-shaded, as further explained in a caption 8104 regarding the user's progress (e.g., "You've viewed 0 of 9 top forecasts for NetApp"). The progress described in the caption 8104 corresponds to the company indicated (e.g., "NetApp") in a company label 8106. By comparison, a caption 8006 (refer to FIG. 80) states "Congratulations. You've viewed all top forecasts for Apple."

Figure 82:
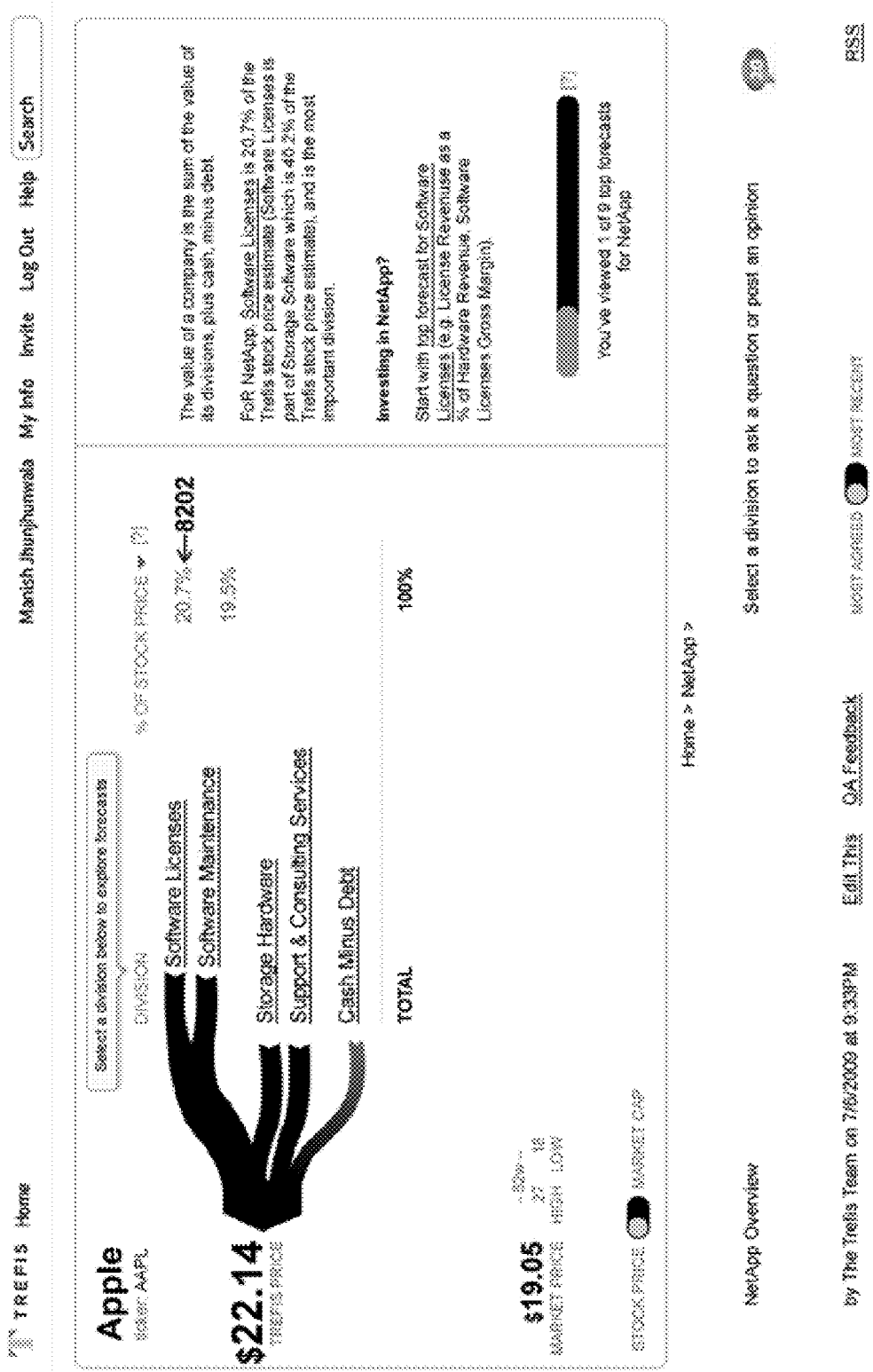

FIG. 82 shows a screen 8200 of a web site page showing division-level information broken down by sub-division. For example, subdivision information 8202 related to NetApp's Software Storage division 8108 (refer to FIG. 81) is shown in the screen 8200 as sub-divisions Software Licenses and Software Maintenance in the subdivision information 8202. The user can display this sub-division information, for example, by clicking on the division name. Moreover, the corresponding numerical data (e.g., percent of stock price) is also divided by sub-division. For instance, the percentages listed in the subdivision information 8202 (e.g., 20.7 and 19.5 percent) sum to the total displayed in the division 8108 (e.g., 40.2 percent).

Figure 83:
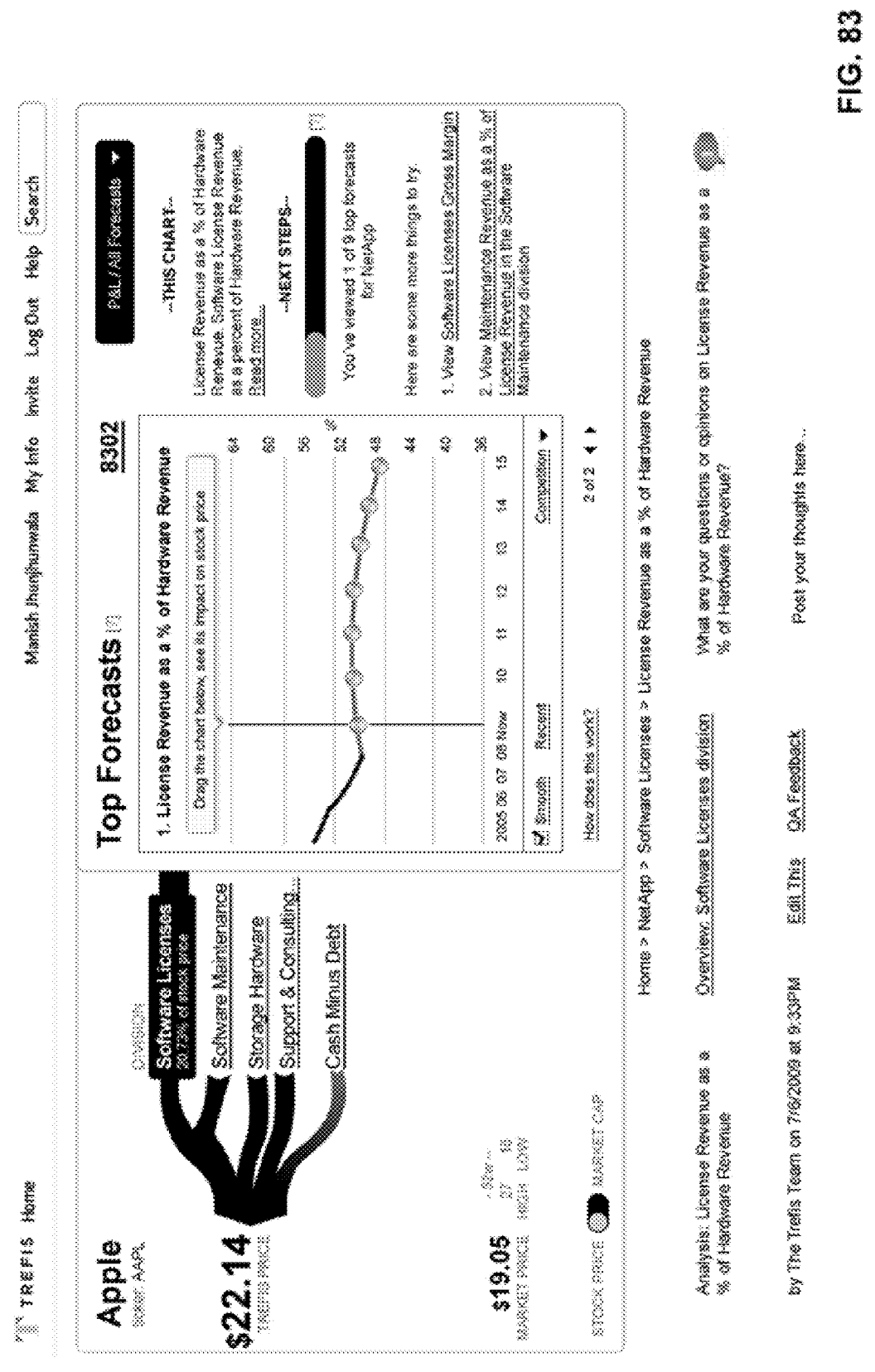

FIG. 83 shows a screen 8300 of a web site page that includes a top forecasts area 8302 for a selected subdivision 8304. The screen 8300 can operate in the same way as top forecast areas described above for previous screens, but did not exactly call out as top forecasts, such as in FIGS. 45, 51-55 and others. Basically when the user clicks on a division that is not divided into sub-divisions, or if the user clicks on a sub-division, the graphs shown are for a collection of top forecasts that the user can "next through" using controls such as 5410 in FIG. 54. These top forecasts are listed and can be navigated through in the P&L panel also, as shown in FIG. 57. FIG. 58 shows the forecasts that the user has modified, and FIG. 59 shows a P&L view in the P&L tab—where the revenue and expense streams can be clicked to reveal the underlying forecasts. This last view is the comprehensive view. Some of the forecasts from these underlying forecasts are selected and marked as top. The functionality and operation of the top forecasts area 8302 for the subdivision shown here can be similar to that described above for divisions (or products).

Figure 84:
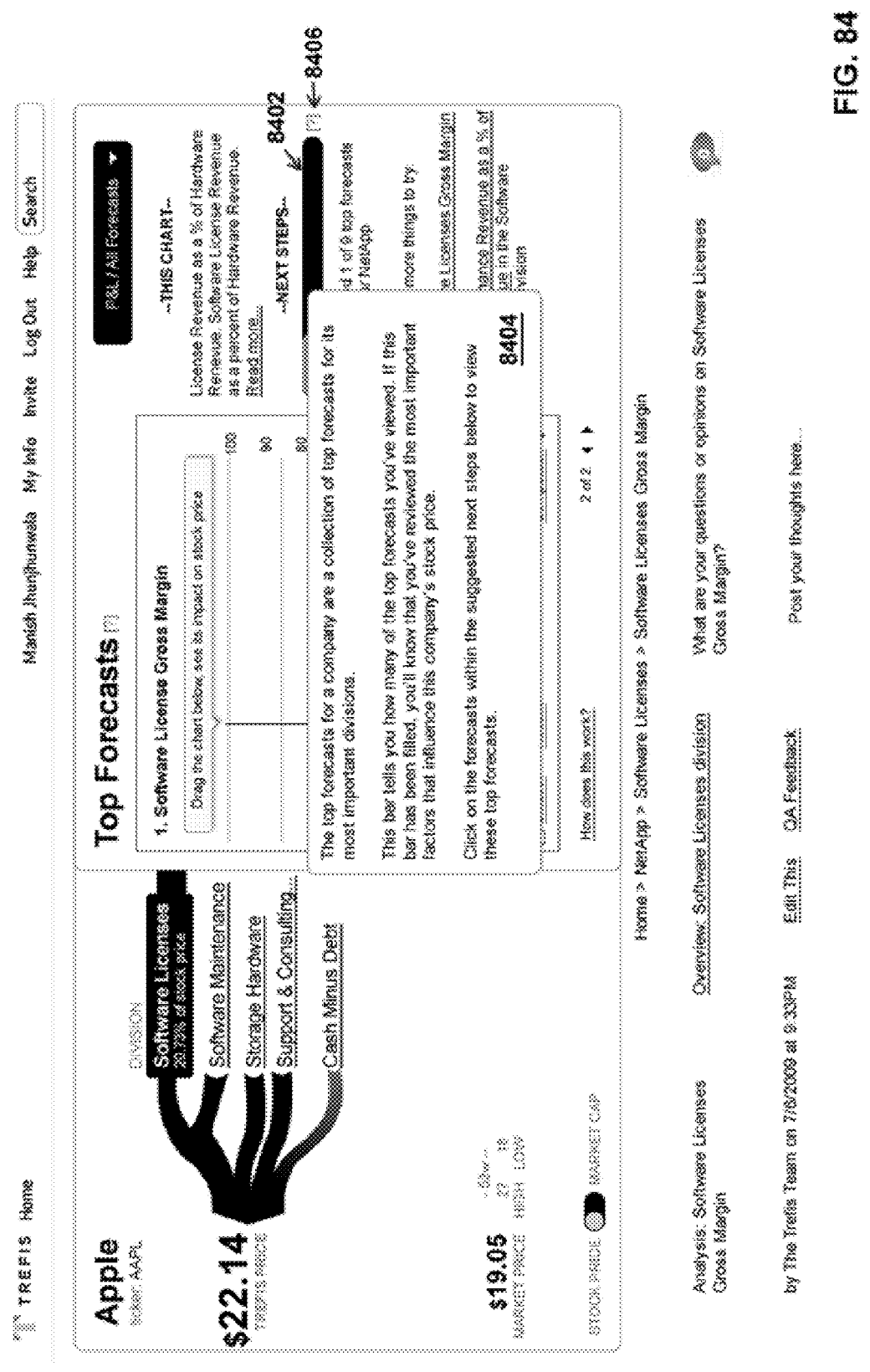

FIG. 84 shows a screen 8400 of a web site page that includes an explanatory text popup 8404 describing that user's progress in using forecasts for the current product. For instance, the popup 8404 can appear if the user clicks on the contextual help control 8406 next to a progress bar 8402 for the currently displayed product or division. The progress bar 8402 can show a user's progress relevant to the whole company.

A representative system architecture for use in practicing the disclosed techniques may be implemented in or across one or more Internet accessible data centers as a web site (typically, a set of web pages) together with associated applications running behind the site. End users operate Internet-accessible devices (e.g., desktop computers, notebook computers, Internet-enabled mobile devices, cellphones having rendering engines, or the like) that are capable of accessing and interacting with the site. An end user machine or device has a web browser or other rendering engine that, typically, is compatible with AJAX technologies (e.g., XHTML, XML, CSS, DOM, JSON, and the like). AJAX technologies include XHTML (Extensible HTML) and CSS (Cascading Style Sheets) for marking up and styling information, the use of DOM (Document Object Model) accessed with client-side scripting languages, the use of an XMLHttpRequest object (an API used by a scripting language) to transfer XML and other text data asynchronously to and from a server using HTTP), and use of XML or JSON (Javascript Object Notation, a lightweight data interchange format) as a format to transfer data between the server and the client. In a web environment, an end user accesses the site in the usual manner, i.e., by opening the browser to a URL associated with a service provider domain. The user may authenticate to the site (or some portion thereof) by entry of a username and password. The connection between the end user entity machine and the system may be private (e.g., via SSL). Although connectivity via the publicly-routed Internet is typical, the end user may connect to the system in any manner over any local area, wide area, wireless, wired, private or other dedicated network; thus, the techniques described herein are not limited to web-based applications. A "server side" of the system may comprise conventional hosting components, such as IP switches, web servers, application servers, administration servers, databases, and the like. Where AJAX is used on the client side, client side code (an AJAX shim) executes natively in the end user's web browser or other rendering engine. Typically, this code is served to the client machine when the end user accesses the site, although in the alternative it may be resident on the client machine persistently. Finally, while a web-based application over Internet Protocol (IP) is described, this is not a limitation, as the techniques and exposed user interface technologies may be provided by a standalone application in any runtime application, whether fixed line or mobile.

Other implementations are within the scope of the following claims and other claims to which the applicant may be entitled.

What is claimed is:

1. A computer-implemented method for estimating a value of an asset, associated with a publically traded financial instrument, using computer processes carried out by a server, the computer processes comprising
    storing at the server a model that estimates the value of the asset as a weighted sum of components;
    transmitting, from the server over a network, graphical content for display on a client computer of a user, the graphical content representing aspects of the model, such content including graphical representations of at least some of the components of the model, and weights associated with the graphically represented components;
    responsive to receipt by the client computer of a data input from the user to modify the value associated with a graphically represented component of the model or with a graphically represented weight:
        (i) updating the model stored at the server to reflect the data input,
        (ii) using the updated model at the server to calculate an update of the estimated value of the asset and to generate updated graphical content representing aspects of the updated model, and
        (iii) transmitting the updated estimated value and the updated graphical content, from the server over the network for display on the client computer; and
    transmitting, from the server over the network, at least a portion of the updated model to at least one other user to enable the other user to view the updated model.

2. The method as described in claim 1 wherein the graphical representations include a line graph showing a numerical trend over a time period and the modification by the user is an adjustment to a portion of the line graph.

3. The method as described in claim 1 further including saving, on the server, information associated with the updated model that includes the update to the estimated value of the asset, the information comprising a user-defined model.

4. The method as described in claim 1 wherein the asset is stock of a publicly traded company.

5. The method as described in claim 4 wherein a set of components of the model corresponds to one of: products, divisions or sub-divisions of the publicly traded company.

6. The method as described in claim 5 further comprising displaying on the client computer, with respect to a component in the set of components, one of: profit and loss forecasts, product forecasts, or profit and loss driver forecasts.

7. The method as described in claim 2 further including updating the graphical information displayed to include a line graph associated with a third party asset.

8. The method as described in claim 1 wherein the server is a web server and the content comprises a web page.

9. The method as described in claim 1 further including exposing, from the server, additional content that comprises a discussion forum by which users view user-defined models.

10. The method as described in claim 9 wherein the additional content includes a mechanism to manage comments associated with the discussion forum.

11. The method as described in claim 1 wherein the weight of a component is graphically represented as a line thickness.

12. The method as described in claim 1, wherein serving, over the network, content for display on the client computer includes providing a graphical representation of competitor data pertaining to at least one of the components.

13. A computer-implemented method for estimating a value of an asset, associated with a publically traded financial instrument, using processes carried out by a computer system, the method comprising:
    storing a model that estimates the value of the asset as a weighted sum of components;
    causing display of graphical content representing aspects of the model, such content including graphical representations of at least some of the components of the model, and weights associated with the graphically represented components;
    receiving, in the computer system, a data input from a user to modify the value associated with a graphically represented component of the model or with a graphically represented weight; and
    in response to receiving the data input:
        (i) updating the stored model to reflect the data input,
        (ii) using the updated model to calculate an update of the estimated value of the asset and to generate updated graphical content representing aspects of the updated model, and
        (iii) causing display of the updated estimated value of the asset and the updated graphical content; and
    transmitting, from a server over the network, at least a portion of the updated model to at least one other user to enable the other user to view the updated model.

14. The method as described in claim 13 wherein the graphical representations include a line graph showing a numerical trend over a time period and the modification by the user is an adjustment to a portion of the line graph.

15. The method as described in claim 14 further including updating the graphical information displayed to include a line graph associated with a third party asset.

16. The method as described in claim 14 wherein the asset is stock of a publicly traded company.

17. The method as described in claim 16 wherein a set of components of the model corresponds to one of: products, divisions and sub-divisions of the publicly traded company.

18. The method as described in claim 17 further comprising displaying on the computer system, with respect to a component in the set of components of the model, one of: profit and loss forecasts, product forecasts, and profit and loss driver forecasts.

19. The method as described in claim 13 wherein the content comprises a web page.

20. The method as described in claim 13 wherein the weight of a component is graphically represented as a line thickness.

21. The method as described in claim 14 further comprising providing a graphical representation of competitor data pertaining to at least one of the components.

* * * * *